(12) United States Patent
Moriya et al.

(10) Patent No.: US 8,692,220 B2
(45) Date of Patent: Apr. 8, 2014

(54) EXTREME ULTRAVIOLET LIGHT SOURCE DEVICE AND CONTROL METHOD FOR EXTREME ULTRAVIOLET LIGHT SOURCE DEVICE

(71) Applicant: Gigaphoton Inc., Oyama (JP)

(72) Inventors: Masato Moriya, Hiratsuka (JP); Osamu Wakabayashi, Hiratsuka (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 13/767,789

(22) Filed: Feb. 14, 2013

(65) Prior Publication Data

US 2013/0187065 A1 Jul. 25, 2013

Related U.S. Application Data

(63) Continuation of application No. 13/545,786, filed on Jul. 10, 2012, now Pat. No. 8,399,870, which is a continuation of application No. 12/612,861, filed on Nov. 5, 2009, now Pat. No. 8,242,472.

(30) Foreign Application Priority Data

Nov. 6, 2008 (JP) .................................. 2008-285911
Nov. 2, 2009 (JP) .................................. 2009-251632

(51) Int. Cl.
*H05G 2/00* (2006.01)

(52) U.S. Cl.
USPC .................. 250/504 R; 250/492.1; 250/493.1

(58) Field of Classification Search
USPC .......... 250/492.1, 492.2, 493.1, 494.1, 504 R
See application file for complete search history.

(56) References Cited

U.S. PATENT DOCUMENTS

| | | | |
|---|---|---|---|
| 2008/0179549 A1* | 7/2008 | Bykanov et al. | 250/504 R |
| 2008/0233719 A1* | 9/2008 | Omata | 438/487 |
| 2010/0078577 A1* | 4/2010 | Moriya et al. | 250/504 R |
| 2010/0140512 A1* | 6/2010 | Suganuma et al. | 250/504 R |
| 2010/0258750 A1* | 10/2010 | Partlo et al. | 250/504 R |
| 2010/0327192 A1* | 12/2010 | Fomenkov et al. | 250/504 R |
| 2011/0044069 A1* | 2/2011 | Sato et al. | 362/551 |
| 2011/0180734 A1* | 7/2011 | Moriya et al. | 250/504 R |
| 2011/0220816 A1* | 9/2011 | Kakizaki et al. | 250/504 R |

FOREIGN PATENT DOCUMENTS

| | | |
|---|---|---|
| JP | 2003-008124 A | 1/2003 |
| JP | 2003-270551 A | 9/2003 |
| JP | 2006-128157 A | 5/2006 |

\* cited by examiner

*Primary Examiner* — Michael Maskell
(74) *Attorney, Agent, or Firm* — McDermott Will & Emery LLP

(57) ABSTRACT

A guide laser beam that has an optical axis and a beam diameter substantially equivalent to those of a driver pulsed laser beam is introduced into an amplification system that amplifies a laser beam that is output from a driver laser oscillator. The guide laser beam is output from a laser device as a continuous light, and is introduced into a light path of the driver pulsed laser beam via a guide laser beam introduction mirror. A sensor detects an angle (a direction) of a laser beam and a variation of a curvature of a wave front. A wave front correction controller outputs a signal to a wave front correction part based on a measured result of a sensor. The wave front correction part corrects a wave front of a laser beam to be a predetermined wave front according to an instruction from the wave front correction controller.

11 Claims, 54 Drawing Sheets

FIG. 42
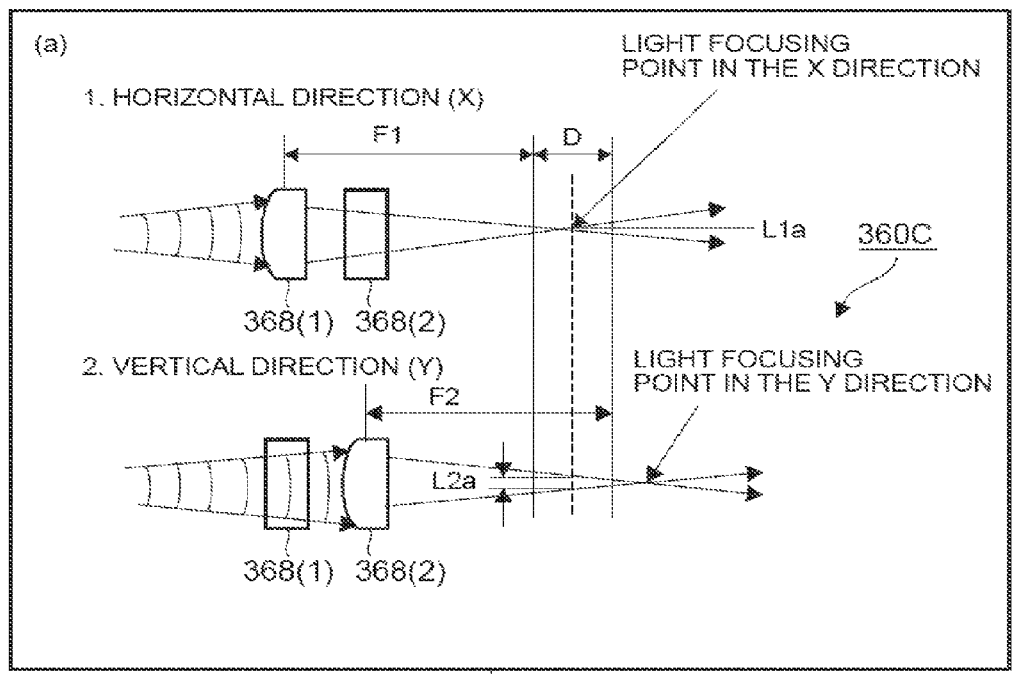
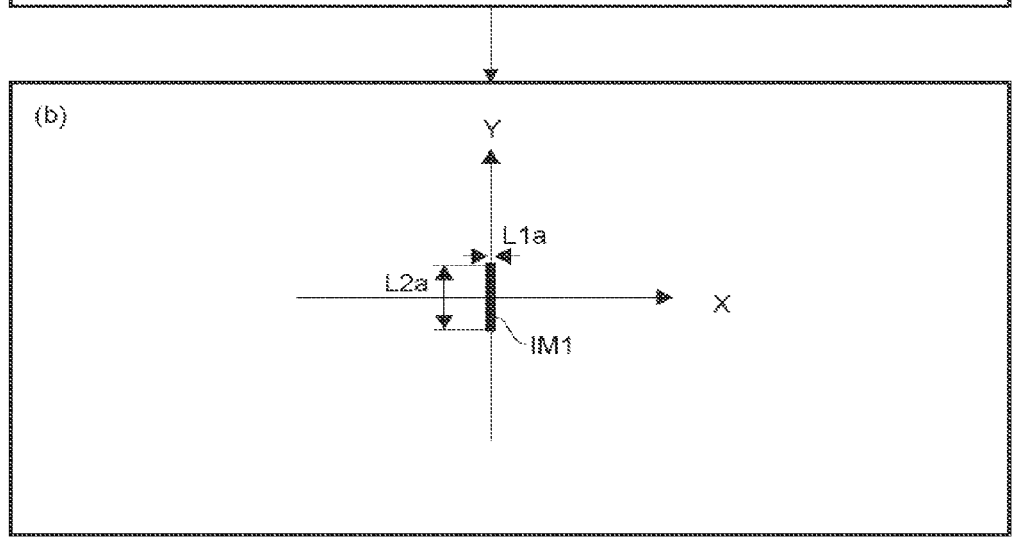

EXTREME ULTRAVIOLET LIGHT SOURCE DEVICE AND CONTROL METHOD FOR EXTREME ULTRAVIOLET LIGHT SOURCE DEVICE

This application is a Continuation of U.S. patent application Ser. No. 13/545,786 filed on Jul. 10, 2012 which is a Continuation of U.S. patent application Ser. No. 12/612,861, filed on Nov. 5, 2009 now U.S. Pat. No. 8,242,472, claiming priority of Japanese Patent Application No. 2008-285911, filed on Nov. 6, 2008, and Japanese Patent Application No. 2009-251632, filed on Nov. 2, 2009, the entire contents of each of which are hereby incorporated by reference.

TECHNICAL FIELD

The present invention relates to an extreme ultraviolet light source device and a control method for an extreme ultraviolet light source device.

BACKGROUND ART

A semiconductor chip may be created, for example, by a reduction projection of a mask on which a circuit pattern has been drawn onto a wafer having a resist applied thereon and by repeatedly performing processing such as an etching and a thin film formation. The progressive reduction of the scale of semiconductor processing demands the use of radiation of a further short wavelength.

Thus, a research is being made on a semiconductor exposure technique which uses a radiation of an extremely short wavelength of 13.5 nm or so and a reduction optics system. This type of technique is termed an EUVL (Extreme Ultra Violet Lithography). Hereafter, an extreme ultraviolet light will be abbreviated as "EUV light".

Three types of EUV light sources are known: an LPP (Laser Produced Plasma: plasma produced by a laser) type light source, a DPP (Discharge Produced Plasma) type light source, and an SR (Synchrotron Radiation) type light source. The LPP type light source is a light source which generates a plasma by irradiating a target material with a laser beam, and employs an EUV light that is emitted from this plasma. The DPP type light source is a light source which employs a plasma that is generated by an electrical discharge. The SR type light source is a light source which uses an orbital radiation. Of those three types of light sources, the LPP type light source is more likely to obtain an EUV light of a higher output power as compared to the other two types because the LPP type light source can provide an increased plasma density and can ensure a larger solid angle over which the light is collected.

A laser light source device that is configured based on the MOPA (master oscillator power amplifier) system has been proposed in order to obtain a driver pulsed laser beam of a high output power with a high repetition rate (see Patent Citation 1 and Patent Citation 2).

Moreover, a technique that uses a deformable mirror in which a variable control of a surface shape can be carried out without any inhibition to a certain extent and that arranges a wave front of a laser beam is known (see Patent Citation 3).

CITATION LIST

Patent Literature

[Patent Citation 1]
Japanese Patent Application Laid-Open Publication No. 2006-128157
[Patent Citation 2]
Japanese Patent Application Laid-Open Publication No. 2003-8124
[Patent Citation 3]
Japanese Patent Application Laid-Open Publication No. 2003-270551

DISCLOSURE OF INVENTION

Technical Problems

For instance, it is necessary that an output power of a carbon dioxide laser as a pulse laser beam is in the range of 10 to 20 kW in order to obtain an EUV light in the range of 100 to 200 W. In the case in which a laser beam of such a high output power is used, various optical elements in a light path absorb a light and become high temperature, thereby causing a shape or a direction of a wave front of a laser beam is varied. In the present specification, a wave front of a laser beam includes a shape and a direction of a wave front of a laser beam.

In the case in which a laser beam of a high output power passes through a lens or a window, a shape or an index of refraction of the lens or the window is varied by an increase in a temperature due to a heat generation, whereby a wave front of the laser beam that has passed through is varied. For instance, in the case in which a wave front of a laser beam is varied, a laser beam cannot be effectively incident to an amplification region in a laser amplifier, whereby a desired laser output cannot be obtained. Moreover, since a focal position of a laser beam that is incident into a chamber is varied corresponding to a variation of a wave front of a laser beam, a laser beam cannot be effectively irradiated to a target material, whereby an output power of an EUV light is reduced.

The present invention was made in consideration of the above problems, and an object of the present invention is to provide an extreme ultraviolet light source device and a control method for an extreme ultraviolet light source device in which a laser beam can be effectively corrected. Another object of the present invention is to provide an extreme ultraviolet light source device and a control method for an extreme ultraviolet light source device in which an optical performance of a driver pulsed laser beam can be stabilized by correcting an optical performance of a guide laser beam on a steady basis. Another object of the present invention is to provide an extreme ultraviolet light source device and a control method for an extreme ultraviolet light source device in which a reliability can be improved without a complexity of a device configuration by using a pre-pulsed laser beam together with a guide laser beam. Other objects of the present invention will be clarified by the explanation of the modes described later.

Solution of Problem

In order to solve the above problems of the conventional art, an extreme ultraviolet light source device in accordance with a first aspect of the present invention is an extreme ultraviolet light source device that generates an extreme ultraviolet light by irradiating a target material with a driver pulsed laser beam for turning the target material into plasma, comprising a target material supply part that supplies the target material into a chamber; a driver laser device that outputs the driver pulsed laser beam; an optical system that irradiates the target material in the chamber with the driver pulsed laser beam that is output from the driver laser device; a guide laser device that outputs a guide laser beam; a guide laser beam introduction part that introduces the guide laser beam into the optical system along a light path of the driver pulsed laser beam; a guide laser beam detection part that detects an optical performance of the guide laser beam that is introduced into the optical system; a correction part that is disposed in the optical system and that corrects the optical performance of the guide laser beam; and a correction control part that controls the correction part in such a manner that the optical performance that is detected by the guide laser beam detection part is in a predetermined value.

Viewed from a second aspect, in the first aspect, the guide laser device outputs the guide laser beam as a continuous light or a pseudo continuous light, and the correction control part controls the correction part in such a manner that the optical performance is in a predetermined value in both of a period when the driver pulsed laser beam is output and a period when the driver pulsed laser beam is not output.

Viewed from a third aspect, in the second aspect, the guide laser beam has a beam diameter substantially equivalent to that of the driver pulsed laser beam and passes through a light path substantially equivalent to that of the driver pulsed laser beam.

Viewed from a fourth aspect, in the third aspect, a wavelength of the guide laser beam is specified to be smaller than that of the driver pulsed laser beam.

Viewed from a fifth aspect, in the fourth aspect, the guide laser beam is output as a guide laser beam in a single transverse mode.

Viewed from a sixth aspect, in any one of the first aspect to the fifth aspect, the optical system is provided with a transmission type optical element and a reflection type optical element, the transmission type optical element makes the driver pulsed laser beam and the guide laser beam be transmitted, and the reflection type optical element makes the driver pulsed laser beam and the guide laser beam be reflected.

Viewed from a seventh aspect, in any one of the first aspect to the fifth aspect, the guide laser beam introduction part is configured as a first type guide laser beam introduction part that makes the guide laser beam be transmitted and that makes the driver pulsed laser beam be reflected.

Viewed from an eighth aspect, in any one of the first aspect to the fifth aspect, the guide laser beam introduction part is configured as a second type guide laser beam introduction part that makes the guide laser beam be reflected and that makes the driver pulsed laser beam be transmitted.

Viewed from a ninth aspect, in any one of the first aspect to the fifth aspect, the guide laser beam introduction part is configured as a first type guide laser beam introduction part that makes the guide laser beam be transmitted and that makes the driver pulsed laser beam be reflected, or the guide laser beam introduction part is configured as a second type guide laser beam introduction part that makes the guide laser beam be reflected and that makes the driver pulsed laser beam be transmitted, and any one of the first type guide laser beam introduction part and the second type guide laser beam introduction part is used depending on an installation position thereof in the optical system.

Viewed from a tenth aspect, in the ninth aspect, the optical system includes an amplifier that amplifies a laser beam, the second type guide laser beam introduction part is used in the case in which the guide laser beam introduction part is disposed on an input side of the amplifier, and the first type guide laser beam introduction part is used in the case in which the guide laser beam introduction part is disposed on an output side of the amplifier.

Viewed from an eleventh aspect, in any one of the first aspect to the fifth aspect, the guide laser beam introduction part is configured by a diamond substrate made of a diamond and a coating that is formed on the diamond substrate, and the coating is configured as any one of a first type coating that makes the guide laser beam be transmitted and that makes the driver pulsed laser beam be reflected and a second type coating that makes the guide laser beam be reflected and that makes the driver pulsed laser beam be transmitted.

Viewed from a twelfth aspect, in any one of the first aspect to the fifth aspect, the guide laser beam introduction part is configured to include a rear mirror that configures a part of the driver laser pulsed oscillator, and the rear mirror is configured to make the driver pulsed laser beam be reflected and to make the guide laser beam be transmitted.

Viewed from a thirteenth aspect, in any one of the first aspect to the fifth aspect, all of part which the guide laser beam passes through in the optical system is made of a reflection type optical element except for a laser window that is disposed in the chamber.

Viewed from a fourteenth aspect, in any one of the first aspect to the fifth aspect, the correction part corrects at least one of a wave front shape and a direction of the guide laser beam.

Viewed from a fifteenth aspect, in any one of the first aspect to the fifth aspect, the correction part can be disposed on any one or both of an output side and an input side for an amplifier or a saturable absorber that are included in the optical system.

Viewed from a sixteenth aspect, in the first aspect, the extreme ultraviolet light source device that generates an extreme ultraviolet light by irradiating a target material with a main pulsed laser beam after with a pre-pulsed laser beam, further comprises a pre-pulsed laser device that outputs the pre-pulsed laser beam;

a pre-pulsed guide laser device that outputs the pre-pulsed guide laser beam; a pre-pulsed optical system that irradiates the target material with the pre-pulsed laser beam; a pre-pulsed guide laser beam introduction part that introduces the pre-pulsed guide laser beam into the pre-pulsed optical system along a light path of the pre-pulsed laser beam; a pre-pulsed guide laser beam detection part that detects an optical performance of the pre-pulsed guide laser beam; a pre-pulsed correction part that is disposed in the pre-pulsed optical system and that corrects the optical performance of the pre-pulsed guide laser beam; and a pre-pulsed correction control part that controls the pre-pulsed correction part in such a manner that the optical performance that is detected by the pre-pulsed guide laser beam detection part is in a predetermined value. The target material that has been irradiated with the pre-pulsed laser beam is turned into, for example, any one of a vapor state, a mixed state of plasma and a vapor, a weak plasma state, and a fine particle state.

An extreme ultraviolet light source device in accordance with a seventeenth aspect of the present invention is an extreme ultraviolet light source device that generates an extreme ultraviolet light by irradiating a target material with a main pulsed laser beam after with a pre-pulsed laser beam, comprising a pre-pulsed laser device that outputs the pre-pulsed laser beam; a pre-pulsed guide laser device that outputs the pre-pulsed guide laser beam; a pre-pulsed optical system that irradiates the target material with the pre-pulsed laser beam; a pre-pulsed guide laser beam introduction part that introduces the pre-pulsed guide laser beam into the pre-pulsed optical system along a light path of the pre-pulsed laser beam; a pre-pulsed guide laser beam detection part that detects an optical performance of the pre-pulsed guide laser beam; a pre-pulsed correction part that is disposed in the pre-pulsed optical system and that corrects the optical performance of the pre-pulsed guide laser beam; and a pre-pulsed correction control part that controls the pre-pulsed correction part in such a manner that the optical performance that is detected by the pre-pulsed guide laser beam detection part is in a predetermined value.

Viewed from an eighteenth aspect, in the seventeenth aspect, the pre-pulsed guide laser device outputs the pre-pulsed guide laser beam as a continuous light or a pseudo continuous light, and the pre-pulsed correction control part can control the pre-pulsed correction part in such a manner that the optical performance is in a predetermined value in both of a period when the pre-pulsed laser beam is output and a period when the pre-pulsed laser beam is not output.

Viewed from a nineteenth aspect, in the first aspect, the guide laser device can also be used as a pre-pulsed laser device that irradiates the target material with the pre-pulsed laser beam prior to with the driver pulsed laser beam.

Viewed from a twentieth aspect, in the nineteenth aspect, the pre-pulsed laser beam that is used together with the guide laser beam is output from the pre-pulsed laser device in a period when the driver pulsed laser beam is not output, and the pre-pulsed laser beam is specified to have a beam diameter smaller than that of the driver pulsed laser beam and have an axis the same as that of the driver pulsed laser beam.

Viewed from a twenty-first aspect, in the nineteenth aspect, in the case in which the optical performance is corrected, the pre-pulsed laser device irradiates the target material with the pre-pulsed laser beam at a first output power that is specified in advance in such a manner that the target material is not physically varied even in the case in which the target material is irradiated with the pre-pulsed laser beam, and in the case in which the target material is turned into plasma by the driver pulsed laser beam, the pre-pulsed laser device irradiates the target material with the pre-pulsed laser beam at a second output power larger than the first output power, the second output power being specified in advance in such a manner that the target material is expanded by a heat from the pre-pulsed laser beam.

Viewed from a twenty-second aspect, in the nineteenth aspect, in the case in which the optical performance is corrected, the pre-pulsed laser device outputs the pre-pulsed laser beam at a timing when the target material is not irradiated, and in the case in which the target material is turned into plasma by the driver pulsed laser beam, the pre-pulsed laser device irradiates the target material with the pre-pulsed laser beam.

Viewed from a twenty-third aspect, in the nineteenth aspect, the pre-pulsed laser beam is introduced to the optical system on a downstream side in a direction of travel of the laser beam for an amplification system that is disposed in the optical system by the guide laser beam introduction part in such a manner that the pre-pulsed laser beam has an axis the same as that of the driver pulsed laser beam.

Viewed from a twenty-fourth aspect, in the nineteenth aspect, a downstream side of an amplification system that is disposed in the optical system is a light focusing optical system for focusing the driver pulsed laser beam and the pre-pulsed laser beam into a predetermined position, the guide laser beam introduction part is configured to be provided with: a first beam splitter that is disposed at an inlet of the light focusing optical system, that makes the pre-pulsed laser beam be transmitted, and that makes the driver pulsed laser beam be reflected; and a second beam splitter that is disposed between the first beam splitter and the pre-pulsed laser device, that makes the pre-pulsed laser beam be transmitted, and that makes a return light of the pre-pulsed laser beam that is reflected by the target material and that returns in the light focusing optical system be reflected, and a light focusing optical system control part is disposed for controlling the light focusing optical system based on a signal transmitted from a return light detection part that detects the return light.

A control method in accordance with a twenty-fifth aspect of the present invention is a control method for controlling an optical performance of a laser beam that is used for an extreme ultraviolet light source device, comprising the steps of continuously outputting a guide laser beam that travels along a light path of a driver pulsed laser beam that is irradiated to a target material to turn the target material into plasma in both of a period when the driver pulsed laser beam is output and a period when the driver pulsed laser beam is not output; detecting an optical performance of the guide laser beam; and correcting the detected optical performance of the guide laser beam to be a predetermined value.

A control method in accordance with a twenty-sixth aspect of the present invention is a control method for controlling an optical performance of a laser beam that is used for an extreme ultraviolet light source device, comprising the steps of outputting a pre-pulsed laser beam that is irradiated to a target material prior to a driver pulsed laser beam along a light path of the driver pulsed laser beam; detecting an optical performance of the pre-pulsed laser beam; correcting the detected optical performance of the pre-pulsed laser beam to be a predetermined value; irradiating the target material with the pre-pulsed laser beam to expand the target material; and generating an extreme ultraviolet light by irradiating the expanded target material with the driver pulsed laser beam to turn the target material into plasma.

A pulsed laser device in accordance with a twenty-seventh aspect of the present invention is a laser pulsed device that oscillates a pulsed laser beam and a pulsed laser device that amplifies the pulsed laser beam that is output from the laser pulsed device to output the pulsed laser beam, the pulsed laser device comprising a guide laser device that outputs a guide laser beam; a guide laser beam introduction part that introduces the guide laser beam into the optical system along a light path of the pulsed laser beam; a guide laser beam detection part that detects an optical performance of the guide laser beam that is introduced into the optical system; a correction part that is disposed in the optical system and that corrects the optical performance of the guide laser beam; and a correction control part that controls the correction part in such a manner that the optical performance that is detected by the guide laser beam detection part is in a predetermined value.

Viewed from a twenty-eighth aspect, in the twenty-seventh aspect, the guide laser device can also be used as a pre-pulsed laser device that irradiates a pre-pulsed laser beam that is irradiated to the target material prior to the driver pulsed laser beam.

A combination other than the combinations that have been explicitly shown in the above descriptions can also be included in the scope of the present invention.

Advantageous Effects of Invention

By the present invention, a guide laser beam is introduced into the optical system along a light path of a driver pulsed laser beam, and the guide laser beam is corrected in such a manner that an optical performance of the guide laser beam is in a predetermined value. Consequently, even in the case in which an optical performance is varied due to a heat load or a mechanical vibration, the correction can be carried out immediately, and the driver pulsed laser beam can be stabilized to be irradiated to a target material. By this configuration, a reliability of an extreme ultraviolet light source device can be improved.

By the present invention, since a guide laser beam is output as a continuous light or a pseudo continuous light, the guide laser beam can be corrected in both of a period when the driver pulsed laser beam is output and a period when the driver pulsed laser beam is not output. A feedback control for an optical performance of the guide laser beam can be carried out on a steady basis. Consequently, in the case in which a heat caused by the driver pulsed laser beam is varied on a grand scale or in the case in which the driver pulsed laser beam is output after a stoppage over a long period of time for instance, an optical performance of the driver pulsed laser beam can be stabilized by an immediate follow-up.

By the present invention, a pre-pulsed laser beam that is used for expanding a target material can also be used as a guide laser beam. Consequently, a reliability of an extreme ultraviolet light source device can be improved without complicating the configuration of the extreme ultraviolet light source device.

BRIEF DESCRIPTION OF THE DRAWINGS

FIG. 42 is a block diagram that follows FIG. 41.

BEST MODE FOR CARRYING OUT THE INVENTION

A mode for the present invention will be described below in detail with reference to the drawings. In the mode for the present invention, an optical performance of a guide laser beam is corrected by supplying a guide laser beam at a predetermined timing on a light path substantially equivalent to that of a driver pulsed laser beam as described in the following. The optical performance means any one or both of a wave front shape and a direction of travel for a laser beam.

Embodiment 1

Figure 1:
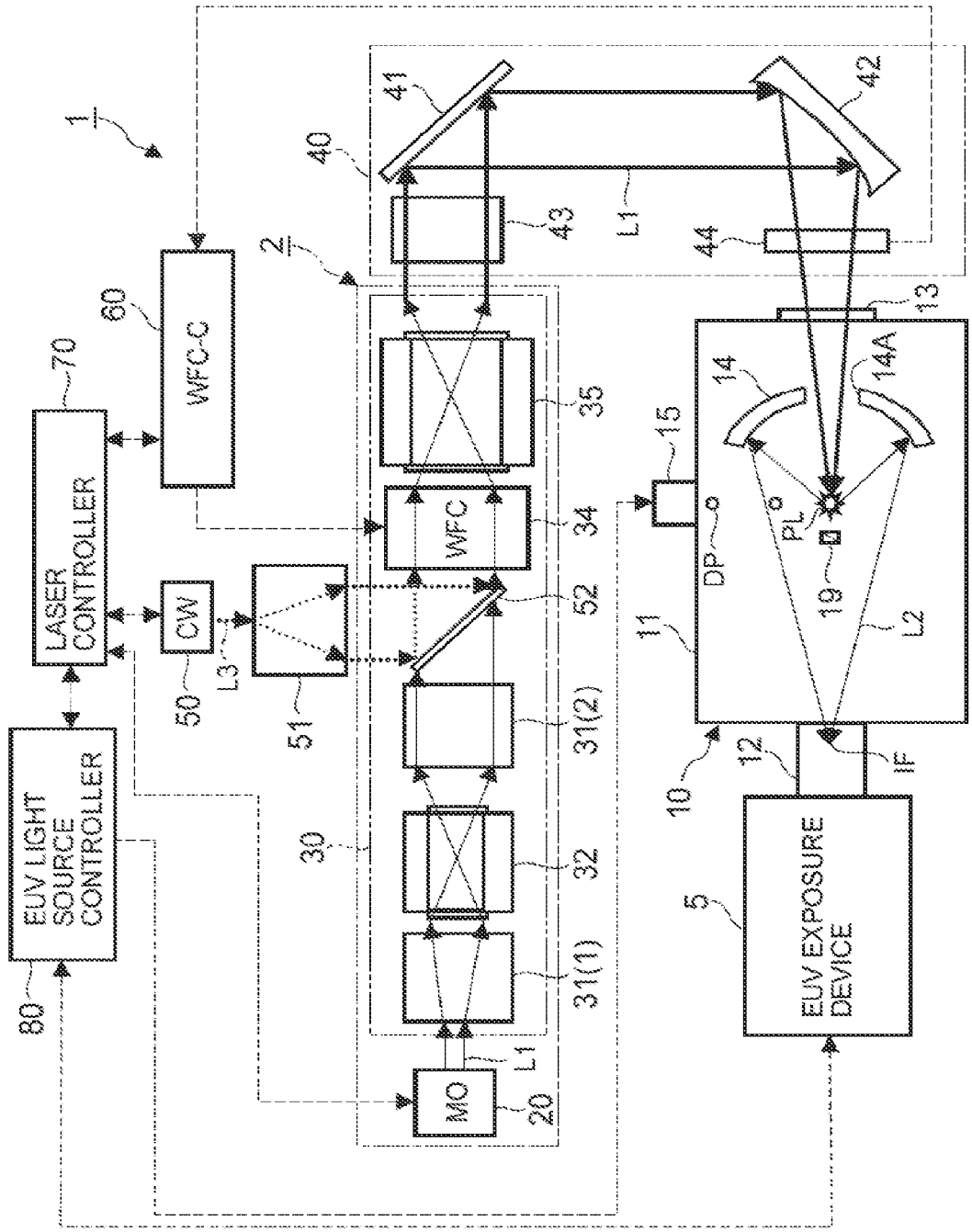
FIG. 1 is a block diagram showing an extreme ultraviolet light source device in accordance with a first embodiment of the present invention.

A first embodiment of the present invention will be described in the following with reference to FIGS. 1 to 4. FIG. 1 is an explanatory diagram showing a general configuration of an extreme ultraviolet light source device 1.

An extreme ultraviolet light source device 1 can be configured to be provided with, for example, a chamber 10 that generates an EUV light, a driver pulse laser light source device 2 that supplies a driver pulse laser light to the chamber 10, and an EUV light source controller 80.

The driver pulse laser light source device 2 can be configured to be provided with, for example, a driver laser oscillator (Master Oscillator) 20 that decides a time waveform and a repetition rate of a laser pulse, an amplification system 30, a light focusing system 40, a wave front correction controller 60, and a laser controller 70. The extreme ultraviolet light source device 1 supplies an EUV light to an EUV exposure device 5. In the figure, the driver laser oscillator 20 and the wave front correction controller 60 are described as MO and WFC-C, respectively.

The outline of the chamber 10 will be described at first. The chamber 10 can be configured to be provided with, for example, a chamber body 11, a connection part 12 with the EUV exposure device 5, a window 13, an EUV light collector mirror 14, and a target material supply unit 15.

The chamber body 11 is kept to be in a vacuum state by a vacuum pump that is not shown in the figure. The chamber body 11 can be configured to be provided with, for example, a mechanism that collects debris that is not shown.

The connection part 12 is configured to connect between the chamber 10 and the EUV exposure device 5. An EUV light that is generated in the chamber body 11 is supplied to the EUV exposure device 5 via the connection part 12.

The window 13 is disposed on the chamber body 11. A driver pulsed laser beam that is emitted from the driver pulse laser light source device 2 is incident to the chamber body 11 through the light focusing system 40 via the window 13.

The EUV light collector mirror 14 is a mirror that reflects an EUV light and collects the EUV light into an intermediate focus (IF). The intermediate focus (IF) is set in the connection part 12. The EUV light collector mirror 14 is configured, for instance, as a concave face like a spheroid that does not ideally generate an aberration in order to carry out a transcription and an image formation for an image of a plasma luminous point into the IF. For instance, a multilayer coating composed of a molybdenum coating and a silicon coating is formed on the surface of the EUV light collector mirror 14. By this configuration, an EUV light having a wavelength of approximately 13.5 nm can be reflected.

The target material supply part 15 supplies a target material such as tin in a state of liquid, solid, or gas. A tin compound such as stannane ($SnH_4$) can also be used. In the case in which tin is supplied in a state of liquid, it is possible to adopt a method for supplying a solution that includes tin or for supplying a colloid solution that includes tin or a tin compound as well as a method for heating pure tin to a melting point to liquefy the tin. In the present embodiment, a droplet DP of tin is described for example as a target material. However, a target material of the present invention is not limited to a tin droplet, and other materials such as lithium (Li) and xenon (Xe) can also be used.

A behavior in the chamber 10 will be briefly described at first. A driver pulsed laser beam L1 is configured to be focused on the predetermined point in the chamber body 11 via the window 13 for incidence. The target material supply part 15 drops a tin droplet DP toward the predetermined point. At the timing when the tin droplet DP reaches the predetermined point, the driver pulsed laser beam L1 of a predetermined output power is output from the driver pulse laser light source device 2. The tin droplet DP is irradiated with the driver pulsed laser beam L1 to be plasma PLZ. The plasma PLZ emits an EUV light L2. The EUV light L2 is collected into the intermediate focus IF in the connection part 12 by the EUV light collector mirror 14 and is supplied to the EUV exposure device 5.

In the next place, the configuration of the driver pulse laser light source device 2 will be described. The driver pulse laser light source device 2 is configured as a carbon dioxide pulse laser light source device, and carries out a pulsed output of the driver pulsed laser beam L1 having the specifications of a wavelength of 10.6 μm, a single transverse mode, a repetition rate of 100 kHz, 100 to 200 mJ, and 10 kW to 20 kW.

A laser beam that is output from the driver laser oscillator 20 is amplified by the amplification system 30 and is transmitted to the light focusing system 40. The light focusing system 40 supplies the driver pulsed laser beam L1 into the chamber 10. The light focusing system 40 is configured to be provided with, for example, a reflecting mirror 41, an off-axis parabolic concave mirror 42, and a relay optical system 43. It is preferable that the relay optical system 43 and a relay optical system 31 described later are configured as a reflection type optical system. In the following descriptions, using a direction of travel for a laser beam as a standard, a side of the driver laser oscillator 20 is referred to as an upstream side, and a side of the chamber 10 is referred to as a downstream side in some cases.

The amplification system 30 is configured to be provided with, for example, relay optical systems 31 (1) and 31 (2), a preamplifier 32, a wave front correction part 34, a main amplifier 35, and a guide laser beam introduction mirror (a guide laser beam introduction part) 52.

The relay optical systems 31 (1) and 31 (2) are optical systems that adjust a spread angle of a beam and a size of a beam for a laser beam that is output from the driver laser oscillator 20 to efficiently fill an amplification region in the preamplifier 32 with a laser beam that is emitted from the driver laser oscillator 20. In the case in which it is not required to distinguish the relay optical systems 31 (1) and 31 (2) in particular, the relay optical systems 31 (1) and 31 (2) are referred to as a relay optical system 31. The relay optical system 31 expands a beam diameter of a laser beam that is output from the driver laser oscillator 20, and converts the laser beam into a predetermined beam light flux.

The preamplifier 32 amplifies an incident laser beam and emits the amplified laser beam. The laser beam that has been amplified by the preamplifier 32 is input to the wave front correction part 34 via the relay optical system 31 (2).

For the relay optical system 31 and the preamplifier 32, an optical axis of a laser beam may be out of alignment or a wave front shape of a laser beam may be varied due to a heat, a vibration or the like in some cases. In the case in which a laser beam of which an optical performance is out of the predetermined expected value is input to the main amplifier 35, an expected amplification operation cannot be obtained.

Consequently, in the present embodiment, the wave front correction part 34 as a "correction port" is disposed on the input side of the main amplifier 35. In the figure, the wave front correction port is indicated as a WFC (Wave Front Compensator). The principle of the wave front correction part 34 will be described in FIG. 9.

A laser beam that has been corrected by the wave front correction part 34 is input into the main amplifier 35 for being amplified, and is transmitted to the light focusing system 40. The light focusing system 40 makes a laser beam to be irradiated toward the predetermined position in the chamber 10.

The present embodiment is provided with a configuration for introducing a guide laser beam for a correction on a light path substantially equivalent to that of a driver pulsed laser beam. The configuration includes, for example, a guide laser device 50 for outputting a guide laser beam, a laser collimator 51, and a guide laser beam introduction mirror 52.

A guide laser beam L3 is a laser beam that is used for correcting the optical system, and plays a leading role. The guide laser device 50 outputs, for example, a helium neon laser in a single transverse mode as a guide laser beam. In the figure, the guide laser device is indicated as CW.

A guide laser beam can be configured as a laser beam of a continuous light or a pseudo continuous light, or as a pulsed laser beam that carries out a pulse light emission with a high repetition rate such as a YAG (Yttrium Aluminum Garnet laser). Moreover, a visible light laser of a continuous oscillation can also be used as a guide laser beam.

A guide laser beam in accordance with the present embodiment is configured to travel on a light path substantially equivalent to that of a driver pulsed laser beam, and is configured to have a beam diameter substantially equivalent to that of a driver pulsed laser beam. The guide laser beam that has been output from the guide laser device 50 is incident to the guide laser beam introduction mirror 52 via the laser collimator 51.

The guide laser beam introduction mirror 52 is configured as a "second type" guide laser beam introduction mirror that makes the guide laser beam be reflected and that makes the driver pulsed laser beam be transmitted. A guide laser beam that has been reflected by the guide laser beam introduction mirror 52 travels in an optical system at an optical axis equivalent to that of a driver pulsed laser beam, and is incident to the main amplifier 35 via the wave front correction part 34.

The guide laser beam L3 passes through the main amplifier 35, and is then incident to the chamber 10 via the relay optical system 43, the mirrors 41 and 42, the sensor 44, and the window 13 to be absorbed into a dumper 19.

The sensor 44 detects a wave front shape and a direction of travel for a guide laser beam, and outputs them to the wave front correction controller 60. An example of the sensor 44 (or the sensor 36 (see FIG. 5)) will be described in another embodiment.

Figure 2:
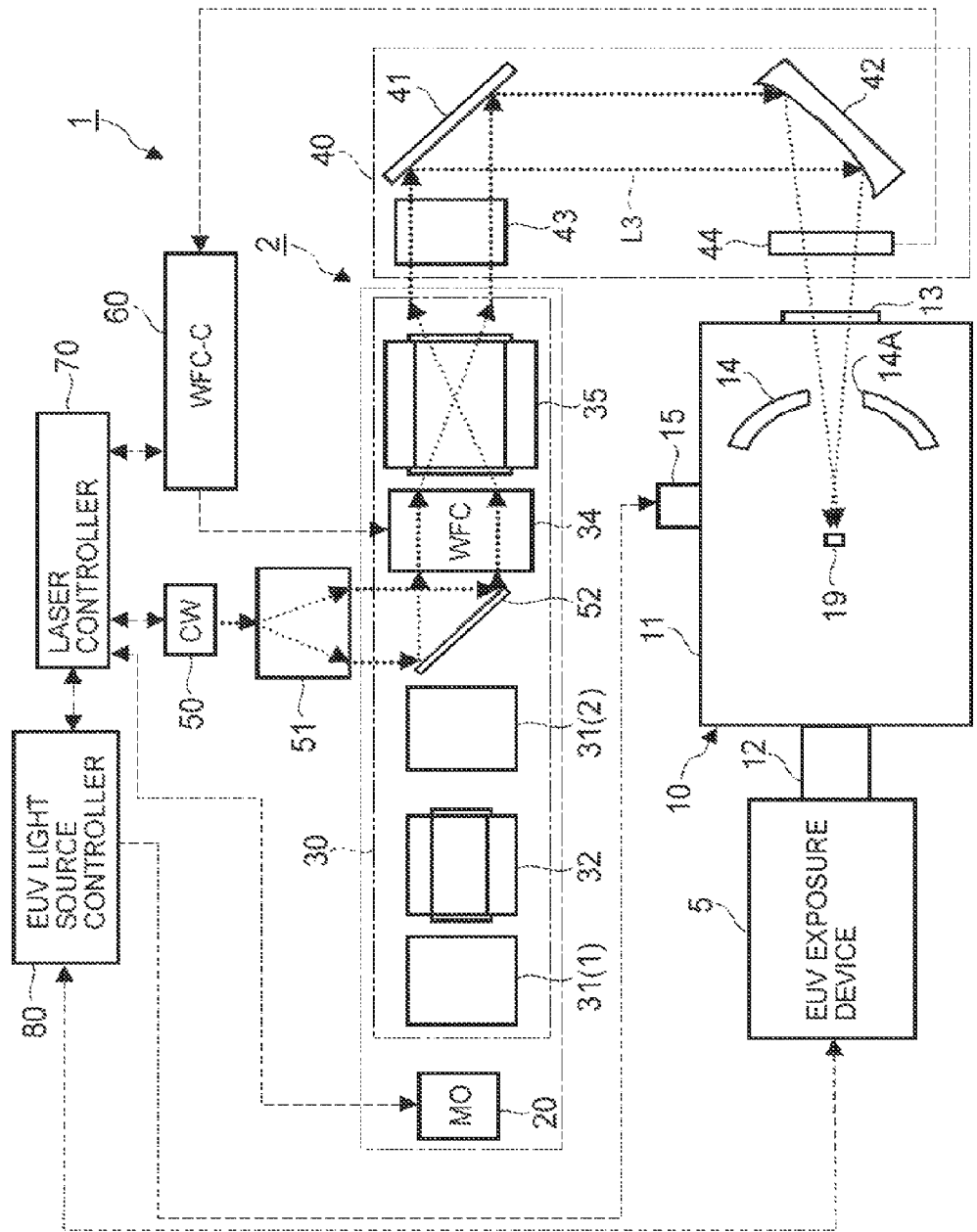
FIG. 2 is an explanatory diagram showing the state in which only a guide laser beam is output.

FIG. 2 is an explanatory diagram showing the state in which only a guide laser beam is output. As described above, a pulsed output is carried out for a driver pulsed laser beam, and a continuous output is carried out for a guide laser beam. Consequently, a guide laser beam is output even in the period when a driver pulsed laser beam is not output.

A guide laser beam L3 is affected by an error that occurs in optical systems (34, 35, and 40) by traveling on a light path substantially equivalent to that of a driver pulsed laser beam. An adverse affect that is applied to a guide laser beam is detected by a sensor 44 that is disposed at the final exit of a laser beam. The wave front correction controller 60 controls the wave front correction part 34 based on the detection signal transmitted from the sensor 44, and corrects a direction of travel and a wave front shape for a guide laser beam.

Consequently, a driver pulsed laser beam is supplied into the chamber 10 and irradiated to a target material while having a stable optical performance with less adverse affect caused by a heat load by passing through the wave front correction part 34 that has been corrected by a guide laser beam.

The control system will be described in the following. As shown in FIG. 1, an extreme ultraviolet light source device 1 is configured to be provided with the wave front correction controller 60, the laser controller 70, and the EUV light source controller 80.

Figure 3:
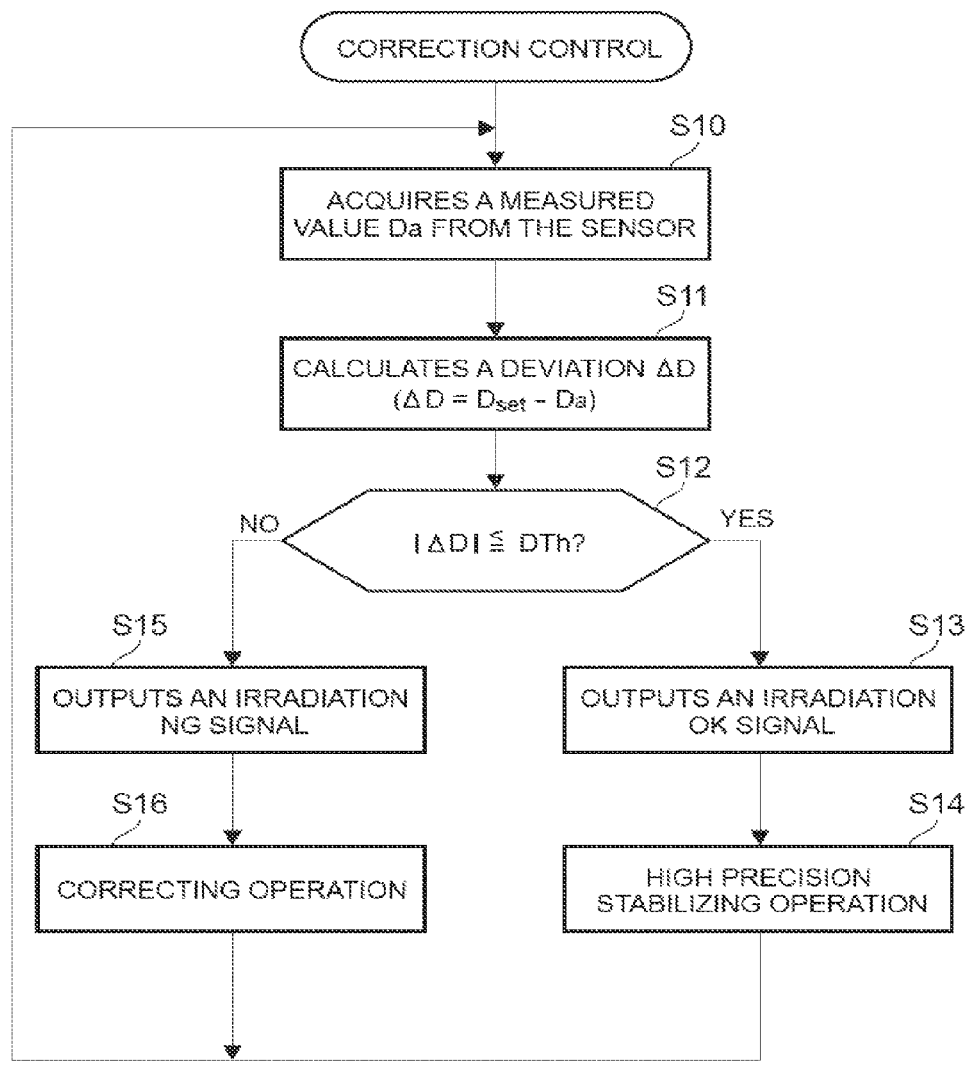
FIG. 3 is a flowchart of a wave front correction processing.

FIG. 3 is a flowchart showing a correction processing that is carried out by the wave front correction controller 60. The present processing is carried out in at least one of a period before a driver pulsed laser beam is output (on an activation of the extreme ultraviolet light source device 1), a period when a driver pulsed laser beam is output, and an interval period when an output of a driver pulsed laser beam is stopped. In the present embodiment, the processing can be carried out in the above periods since a guide laser beam is configured as a continuous light or a pseudo continuous light. In other words, a continuous feedback control for an optical performance of a laser beam can be carried out during an operation of the extreme ultraviolet light source device 1.

Each flowchart that will be described in the following shows the summary of each processing, and may be different from an actual computer program in some cases. Moreover, those skilled in the art can modify or delete a step that is shown in the figure, and can add a new step. A direction of a laser beam is referred to as an "angle" in some cases in the following.

The wave front correction controller 60 acquires a measured value Da from the sensor 44 (S10), and calculates a deviation ΔD that is a difference between a target value Dset and a measured value Da (S11). The wave front correction controller 60 judges whether or not an absolute value of the deviation AD is equivalent to or less than a predetermined permissible value Dth (S12). For instance, a permissible value Dth is specified as a value that does not affect an amplification characteristic of a laser beam.

In the case in which a difference ΔD between a target value and a measured value is equivalent to or less than a permissible value Dth (S12: YES), the wave front correction controller 60 outputs an irradiation OK signal to the laser controller 70 (S13). The irradiation OK signal is an adjustment completion signal that means a wave front of a laser beam has been adjusted to be a predetermined wave front (a curvature and a direction). The wave front correction controller 60 then transits to the step S14, and carries out a high precision stabilizing operation. The high precision stabilizing operation is an operation for carrying out a correction for clearing a difference ΔD with a target value with a high degree of accuracy. By the step S14, the irradiation OK signal can be maintained in an output enabled state on a constant basis unless a large disturbance occurs once the irradiation OK signal is output in the step 13.

On the other hand, in the case in which an absolute value of ΔD exceeds a permissible value Dth (S12: NO), the wave front correction controller 60 outputs an irradiation NG signal to the laser controller 70 (S15). The wave front correction controller 60 then makes the wave front correction part 34 to carry out a correcting operation (S16). The irradiation NG signal is an adjustment incomplete signal that means a wave front of a laser beam has not been adjusted to be a predetermined wave front. The wave front correction part 34 operates an angle correction part 100 and a wave front curvature correction part 200 according to a drive signal transmitted from the wave front correction controller 60 (see FIG. 9). By carrying out a correcting operation once or a plurality of times, a wave front of a laser beam conforms to a predetermined wave front.

Figure 4:
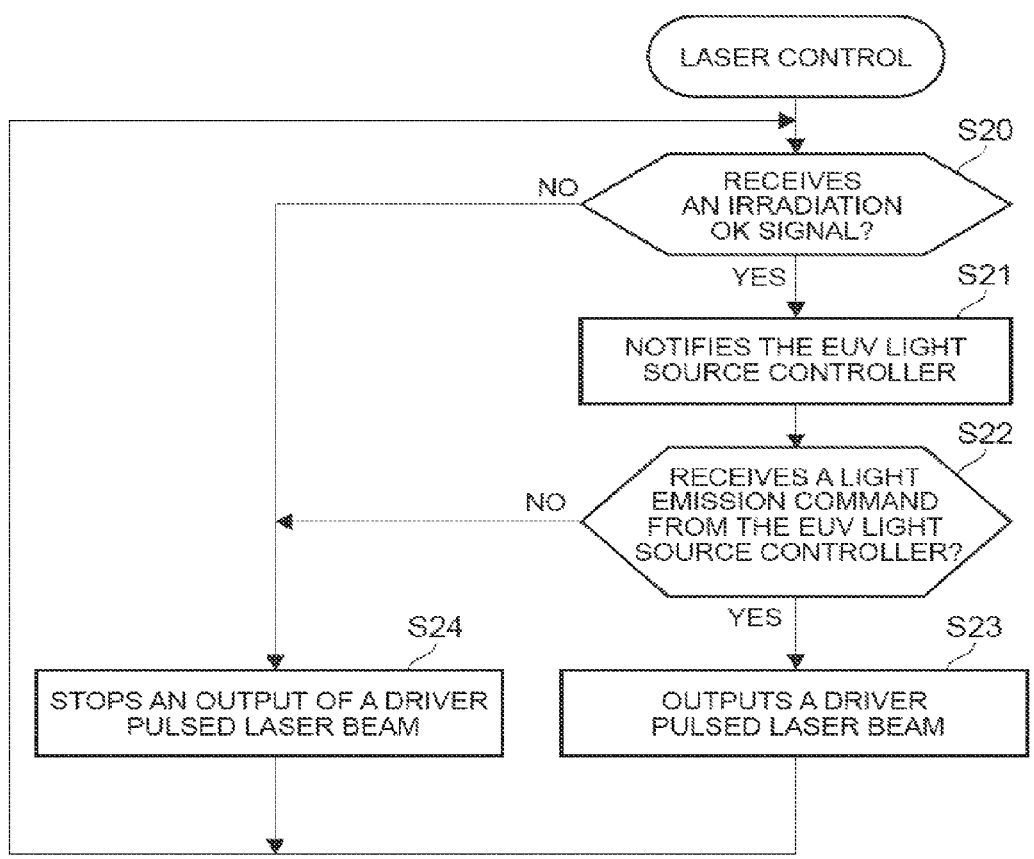
FIG. 4 is a flowchart of a processing in which a laser controller notifies an EUV controller of an adjustment completion.

FIG. 4 is a flowchart showing an operation of the laser controller 70 and an operation of the EUV light source controller 80. In the case in which the laser controller 70 receives an irradiation OK signal from the wave front correction controller 60 (S20: YES), the laser controller 70 notifies the EUV light source controller 80 of that an adjustment of the driver pulse laser light source device 2 has been completed (S21).

In the case in which the EUV light source controller 80 receives an adjustment completion notice from the laser controller 70, the EUV light source controller 80 outputs a light emission command to the laser controller 70. The light emission command is a command or an electrical signal that instructs to output a driver pulsed laser beam.

The laser controller 70 stops an output of a driver pulsed laser beam and stands by until a light emission command is output from the EUV light source controller 80 (S22: NO, S24). In the case in which the laser controller 70 receives a light emission command (S22: YES), the laser controller 70 outputs a driver pulsed laser beam L1 from the driver laser oscillator 20.

The driver pulsed laser beam L1 is amplified by the amplification system 30, and is then incident to the chamber 10 via the light focusing system 40. The droplet DP is irradiated with the driver pulsed laser beam L1 to be the plasma PLZ. The EUV light L2 that is emitted from the plasma PLZ is collected into the intermediate focus IF by the EUV light collector mirror 14 and is transmitted to the EUV exposure device 5.

In the present embodiment as described above, the guide laser beam L3 of a continuous light is introduced to a light path of the driver pulsed laser beam L1, and an operation of the wave front correction part 34 is controlled based on a measured result of an optical performance of a guide laser beam. Consequently, even in the case in which the characteristics of the optical system are varied due to a heat, a vibration or the like, the variation can be corrected in a rapid manner, and an expected driver pulsed laser beam can be stably irradiated to a target material. As a result, a reliability of the extreme ultraviolet light source device 1 can be improved.

In the present embodiment, a guide laser beam is oscillated on a steady basis, and a direction of travel and a wave front shape of a laser beam can be adjusted on a steady basis. Consequently, even in the case in which an output of the driver pulsed laser beam varies or even in the case in which the driver pulsed laser beam is output immediately after an output of the driver pulsed laser beam is stopped for an extended period of time for instance, the driver pulsed laser beam having a stable output and a focusing performance can be obtained.

It is preferable that the guide laser beam introduction mirror 52 is fabricated by using a substrate made of a diamond having an excellent thermal conductivity. However, for a region in which a heat load is relatively small such as an upstream side of the driver pulsed laser beam (for instance, a region between the oscillator 20 and the preamplifier 32), a substrate made of alkali halide such as BaF2, KCl, and NaCl, or a substrate made of a crystal of alkali earth halide can also be used.

Embodiment 2

A second embodiment of the present invention will be described in the following with reference to FIGS. 5 and 6. Each embodiment that will be described in the following corresponds to a modified example of the first embodiment. Consequently, points different from the first embodiment will be described mainly. In the present embodiment, the configurations that correct a laser beam (34, 36, and 44, 45) are disposed for both of a mechanism 30 that amplifies the driver pulsed laser beam and a mechanism 40 that focuses the driver pulsed laser beam into a predetermined position.

Figure 5:
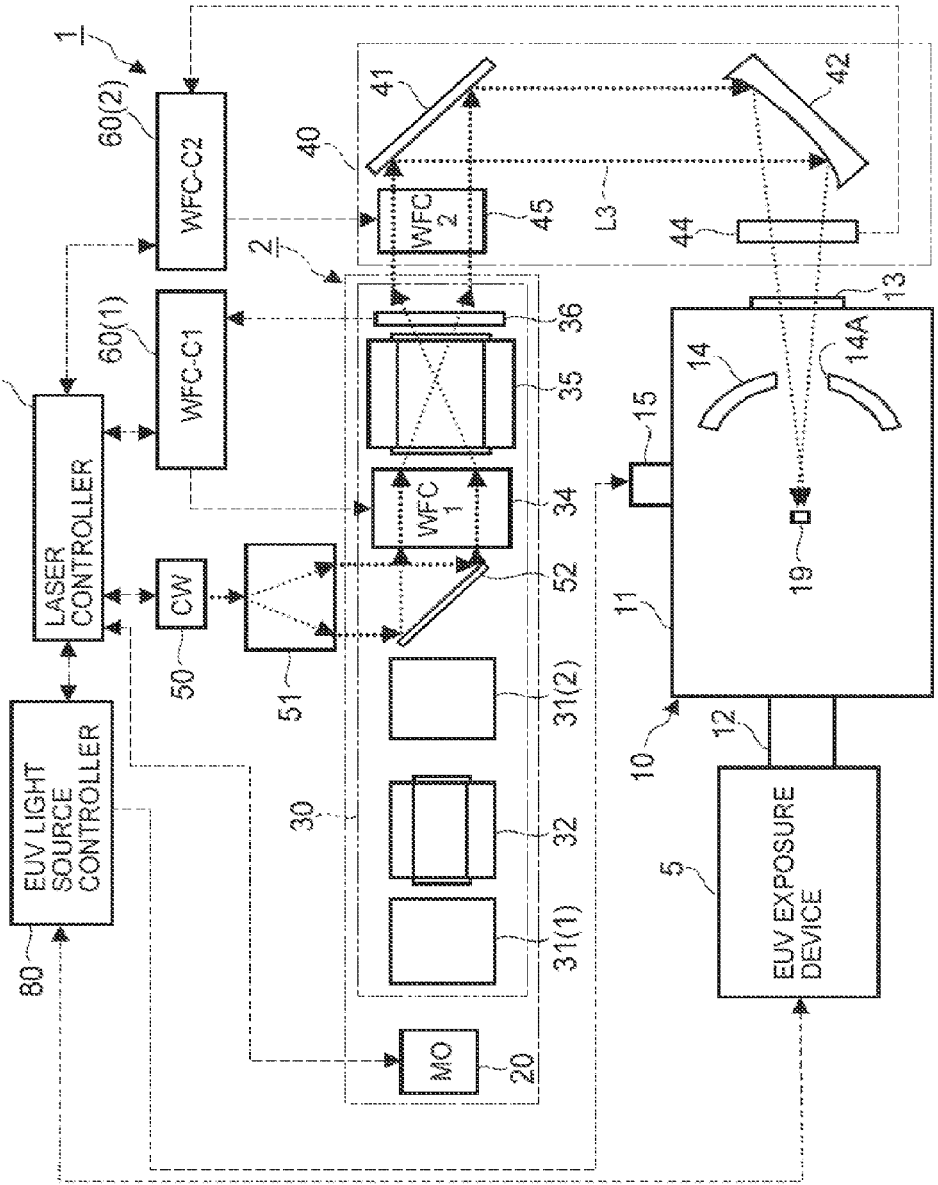
FIG. 5 is a block diagram showing an extreme ultraviolet light source device in accordance with a second embodiment of the present invention.

FIG. 5 is an explanatory diagram showing a general configuration of an extreme ultraviolet light source device 1 in accordance with the second embodiment of the present invention. In the present embodiment, a wave front correction part 34 and a sensor 36 are disposed in the amplification system 30, and another wave front correction part 45 and another sensor 44 are disposed in the light focusing system 40.

A first wave front correction controller 60 (1) controls a correction in the amplification system 30, and a second wave front correction controller 60 (2) controls a correction in the light focusing system 40.

Figure 6:
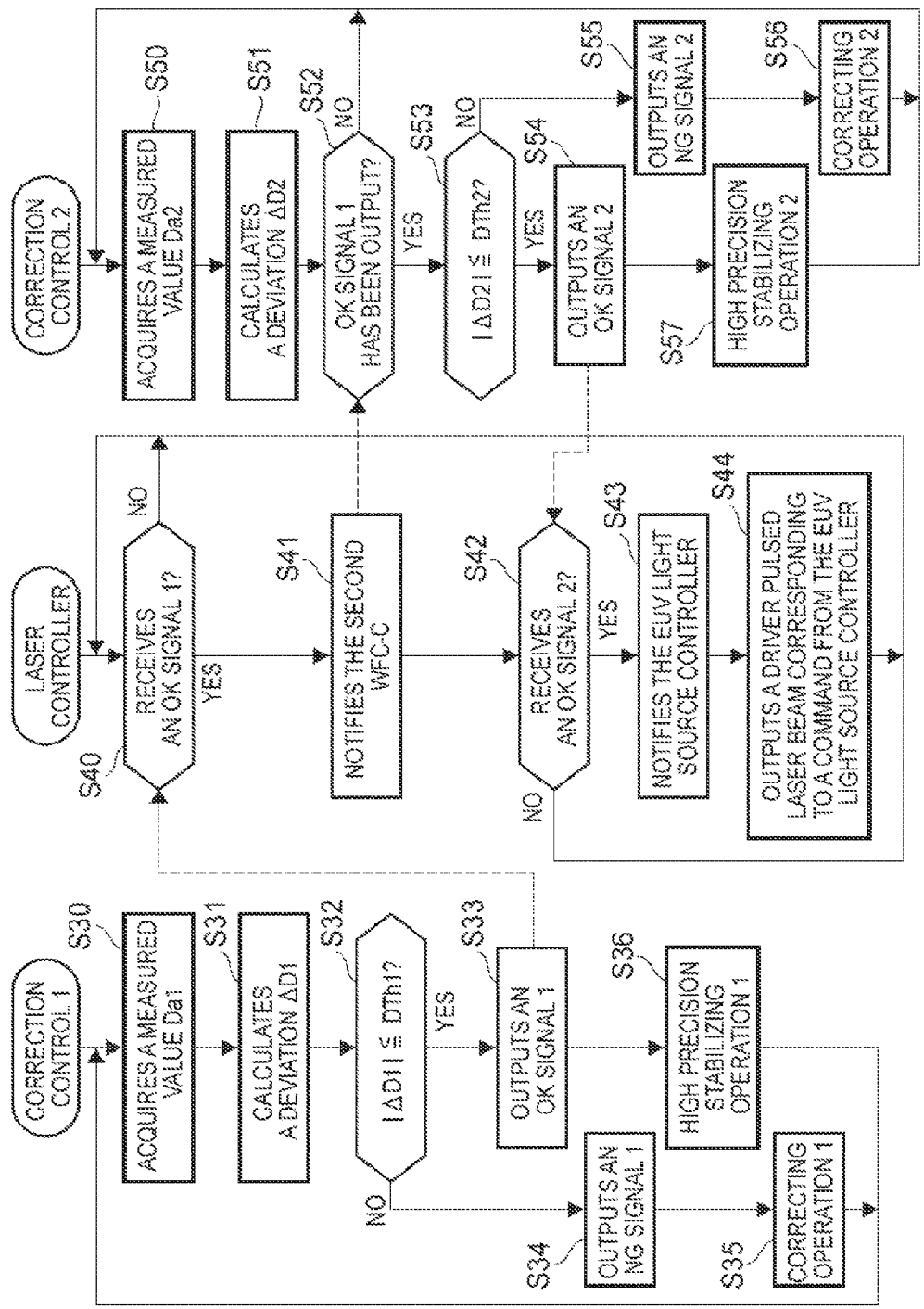
FIG. 6 is a flowchart of a wave front correction processing.

FIG. 6 is a flowchart showing an operation in accordance with the present embodiment. In the present embodiment, a curvature and a direction of a wave front of a laser beam is corrected in order from an upstream side. At first, the wave front correction controller 60 (1) that controls the wave front correction part 34 in the amplification system 30 acquires a measured value Da1 from the sensor 36 (S30), and calculates a deviation ΔD1 (S31).

The wave front correction controller 60 (1) judges whether or not an absolute value of the deviation ΔD1 is equivalent to or less than a permissible value DTh1 (S32). In the case in which an absolute value of the deviation ΔD1 is equivalent to or less than the permissible value DTh1 (S32: YES), the wave front correction controller 60 (1) outputs an OK signal 1 to the laser controller 70 (S33). The wave front correction controller 60 (1) then carries out a high precision stabilizing operation in the step S36, and returns to the step S30.

On the other hand, in the case in which an absolute value of the deviation ΔD1 exceeds a permissible value DTh1 (S32: NO), the wave front correction controller 60 (1) outputs an NG signal 1 to the laser controller 70 (S35). The wave front correction controller 60 (1) then directs an execution of a correcting operation to the wave front correction part 34 in such a manner that a difference ΔD1 between a target value Dset1 and a measured value Da1 is reduced (S35). The wave front correction controller 60 (1) then returns to the first step S30.

In the case in which the laser controller 70 receives the OK signal 1 from the wave front correction controller 60 (1) (S40: YES), the laser controller 70 notifies the wave front correction controller 60 (2) that manages the wave front correction part 45 of that the wave front correction of the former step has been completed (S41). The notification is indicated as the "OK signal 1" in FIG. 6.

The wave front correction controller 60 (2) acquires a measured value Da2 from the sensor 44 (S50), and calculates a deviation ΔD2 that is a difference between a target value Dset2 and a measured value Da2 (S51). The wave front correction controller 60 (2) judges whether or not the notification of that the correcting operation of the former step has been completed is received from the laser controller (S52).

Until the wave front correction of the former step that is carried out by the wave front correction controller 60 (1) is completed (S52), the execution of the above steps S50 and S51 is repeated. In the case in which the wave front correction of the former step that is carried out by the wave front correction controller 60 (1) is completed (S52: YES), the wave front correction controller 60 (2) judges whether or not an absolute value of the deviation ΔD2 that has been calculated in the step S51 is equivalent to or less than a permissible value DTh2 (S53).

In the case in which an absolute value of the deviation ΔD2 is equivalent to or less than the permissible value DTh2 (S53: YES), the wave front correction controller 60 (2) outputs an OK signal 2 to the laser controller 70 (S54). The wave front correction controller 60 (2) then carries out a high precision stabilizing operation in the next step S57, and returns to the step S50. On the other hand, in the case in which an absolute value of the deviation ΔD2 exceeds a permissible value DTh2 (S53: NO), the wave front correction controller 60 (2) outputs a drive signal to the wave front correction part 45 to make the wave front correction part 45 to correct a curvature and a direction of a wave front of a laser beam (S56). The wave front correction controller 60 (2) then returns to the first step S50.

In the case in which the laser controller 70 receives the OK signal 2 from the second wave front correction controller 60 (2) (S42: YES), the laser controller 70 notifies the EUV light source controller 80 of that an adjustment of the driver pulse laser light source device 2 has been completed (S43).

In the case in which the laser controller 70 receives a light emission command from the EUV light source controller 80, the laser controller 70 makes the driver laser oscillator 20 to output a driver pulsed laser beam (S44).

The present embodiment that is configured as described above outputs a guide laser beam regardless of whether a driver pulsed laser beam is output or not, that is, in an asynchronous manner with a driver pulsed laser beam, and carries out a feedback control in such a manner that an optical performance of a laser beam is in the predetermined value. Consequently, the present embodiment has an operation effect equivalent to that of the first embodiment.

Moreover, in the present embodiment, since an optical performance of a laser beam is corrected individually for both of the amplification system 30 and the light focusing system 40, both of an amplifying performance and a light focusing performance can be stabilized, whereby a reliability can be further improved as compared with the first embodiment.

Moreover, in the present embodiment, after it is confirmed that a wave front correction processing is completed on an upstream side (in the amplification system), a wave front correction processing is carried out on a downstream side (in the light focusing system). Consequently, a wave front correction that is carried out by the wave front correction controller 60 (1) and a wave front correction that is carried out by the wave front correction controller 60 (2) can be prevented from competing against each other before it occurs.

Embodiment 3

A third embodiment of the present invention will be described in the following with reference to FIGS. 7 to 12. In the present embodiment, a guide laser beam is introduced on an input side of the first amplifier 32 (1). Moreover, in the present embodiment, the wave front correction parts 34 (1), 34 (2), 34 (3), and 34 (4) are corresponded to the amplifiers 32 (1), 32 (2), 35 (1), and 35 (2), respectively, and a wave front correction of a laser beam is carried out every when a laser beam is amplified.

Figure 7:
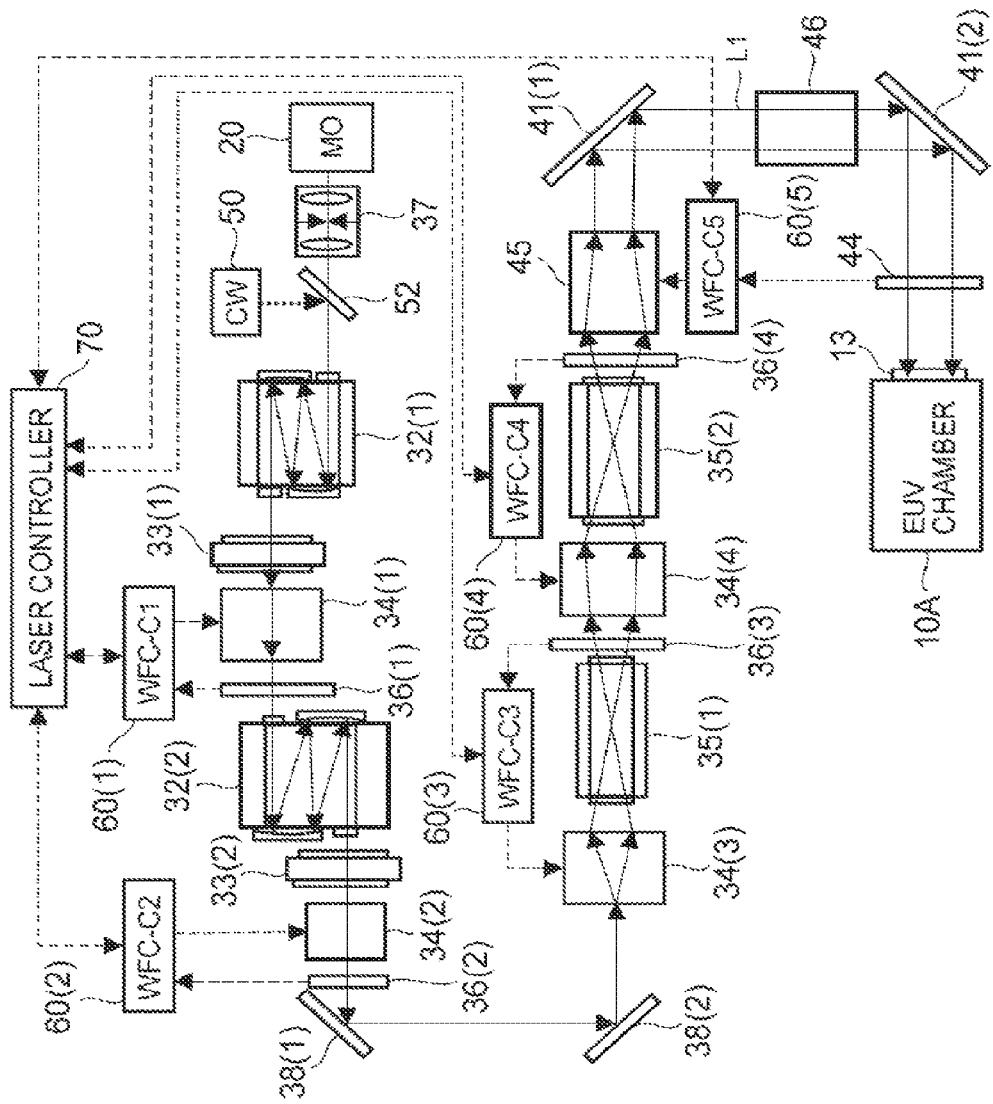
FIG. 7 is a block diagram showing an extreme ultraviolet light source device in accordance with a third embodiment of the present invention.

FIG. 7 is a general block diagram showing an extreme ultraviolet light source device 1 in accordance with the third embodiment of the present invention. In the present embodiment, two slab type preamplifiers 32 (1) and 32 (2) are used as a preamplifier. A laser beam travels on a zigzag light path included in the slab type preamplifiers 32 (1) and 32 (2) to be amplified. Moreover, in the present embodiment, a plurality of main amplifiers 35 (1) and 35 (2) are also disposed.

The saturable absorbers 33 (1) and 33 (2) are disposed on an output side of the preamplifiers 32 (1) and 32 (2), respectively. The saturable absorber is referred to as SA (Saturable Absorber) in the following. The SAs 33 (1) and 33 (2) are elements that have a function in which a laser beam having a light intensity equivalent to or larger than a predetermined threshold value can pass through the SA and a laser beam having a light intensity less than a predetermined threshold value cannot pass through the SA.

The SAs 33 (1) and 33 (2) absorb a laser beam that returns from the chamber 10 (a return light) and a parasitic oscillation light and a self oscillation light that are generated by the main amplifiers 35 (1) and 35 (2). By the above configuration, the preamplifier 32 and the driver laser oscillator 20 can be prevented from being damaged. Moreover, the SAs 33 (1) and 33 (2) play a role of suppressing a pedestal to improve a quality of a pulse waveform of a laser beam. The pedestal is a small pulse that is generated temporally close to a main pulse.

A spatial filter 37 for improving a spatial transverse mode is disposed on an output side of the driver laser oscillator 20. The SA 33 (1) is disposed at the exit of the preamplifier 32 (1), and the SA 33 (2) is disposed at the exit of the next preamplifier 32 (2).

The wave front correction part 34 (1) and a sensor 36 (1) are disposed on a downstream side (an outgoing side of a laser beam) of the first SA 33 (1). The wave front correction part 34 (2) and a sensor 36 (2) are disposed on a downstream side of the second SA 33 (2).

A laser beam that has passed through the sensor 36 (2) is reflected by the reflecting mirrors 38 (1) and 38 (2), and is incident to the wave front correction part 34 (3). The wave front correction part 34 (3) is disposed on an upstream side (an incident side of a laser beam) of the main amplifier 35 (1). A sensor 36 (3) corresponded to the wave front correction part 34 (3) is disposed on a downstream side of the main amplifier 35 (1).

The wave front correction part 34 (4) is disposed on an upstream side of the last main amplifier 35 (2). A sensor 36 (4) is disposed on a downstream side of the main amplifier 35 (2).

Similarly to the second embodiment, a mechanism that focuses the driver pulsed laser beam is provided with a wave front correction part 45 and a sensor 44. Moreover, in the present embodiment, a polarization split type isolator 46 is disposed between the reflecting mirrors 41 (1) and 41 (2). The isolator 46 will be described later in FIG. 11.

A flow of a laser beam will be briefly described in the following. At first, a laser beam that has been output from the driver laser oscillator 20 is transmitted to the spatial filter 37 to improve a spatial transverse mode. The laser beam in which a spatial transverse mode has been improved passes through the guide laser beam introduction mirror 52, and is incident to an incident window of the slab type preamplifier 32 (1). The laser beam passes in a zigzag manner between two concave mirrors 42 to be amplified, and is emitted from an outgoing window.

The laser beam that has been amplified by the preamplifier 32 (1) passes through the SA 33 (1). By this configuration, a laser beam having a light intensity equivalent to or less than a predetermined threshold value is eliminated. Due to the passing through the SA 33 (1), a wave front shape of a laser beam is affected and may be out of an expected value in some cases. Consequently, an optical performance (a wave front shape and a direction) of a laser beam is corrected by the wave front correction part 34 (1). The wave front correction controller 60 (1) detects a state of a laser beam that has been corrected based on a measured value transmitted from the sensor 36 (1), and controls the wave front correction part 34 (1) in such a manner that an optical performance of a laser beam is in a predetermined value.

The laser beam that has been corrected by the wave front correction part 34 (1) is input to the second preamplifier 32 (2) to be amplified, and passes through the SA 33 (2). The laser beam that has passes through the SA 33 (2) is corrected for a wave front by the wave front correction part 34 (2) similarly to the above. The wave front correction controller 60 (2) outputs a drive signal to the wave front correction part 34 (2) in such a manner that a curvature and an angle of a wave front of a laser beam are in a predetermined value based on a measured value transmitted from the sensor 36 (2).

The laser beam that has been corrected by the wave front correction part 34 (2) is incident to the wave front correction part 34 (3) via the two reflecting mirrors 38 (1) and 38 (2). The wave front correction controller 60 (3) controls the wave front correction part 34 (3) based on a measured value transmitted from the sensor 36 (3) that is disposed on the exit side of the main amplifier 35 (1). The wave front correction controller 60 (3) operates the wave front correction part 34 (3) in such a manner that a wave front that can efficiently fill a laser amplification region in the main amplifier 35 (1) with a laser beam can be obtained.

The laser beam that has been corrected by the wave front correction part 34 (3) is incident to the wave front correction part 34 (4) after passing through the main amplifier 35 (1) and the sensor 36 (3). Similarly to the descriptions related to the wave front correction part 34 (3), the wave front correction controller 60 (4) controls the wave front correction part 34 (4) based on a measured value transmitted from the sensor 36 (4) that is disposed on the exit side of the main amplifier 35 (2) in such a manner that an optical performance of a laser beam that is incident to the main amplifier 35 (2) is in a predetermined value.

As described above, in the present embodiment, a laser beam is amplified four times and an optical performance of the laser beam is corrected four times in the process for amplifying a laser beam. By this configuration, a laser beam of a high output power that is emitted from the main amplifier 35 (2) of the final stage can be stabilized.

The laser beam that has been amplified is transmitted to the light focusing process, and is input to the wave front correction part 45. The wave front correction controller 60 (5) makes the wave front correction part 45 to carry out a wave front correction based on a signal transmitted from the sensor 44 that is disposed immediately before the window 13 of the chamber 10A. By this configuration, a laser beam having a predetermined plane wave can be obtained.

The laser beam that has been corrected by the wave front correction part 45 is incident to the reflecting mirror 41 (1) to be reflected, and is incident to the polarization split type isolator 46. The laser beam passes through the isolator 46 and is incident to the reflecting mirror 41 (2). The laser beam that has been reflected by the reflecting mirror 41 (2) is incident to the window 13 of the chamber 10A via the sensor 44.

Figure 8:
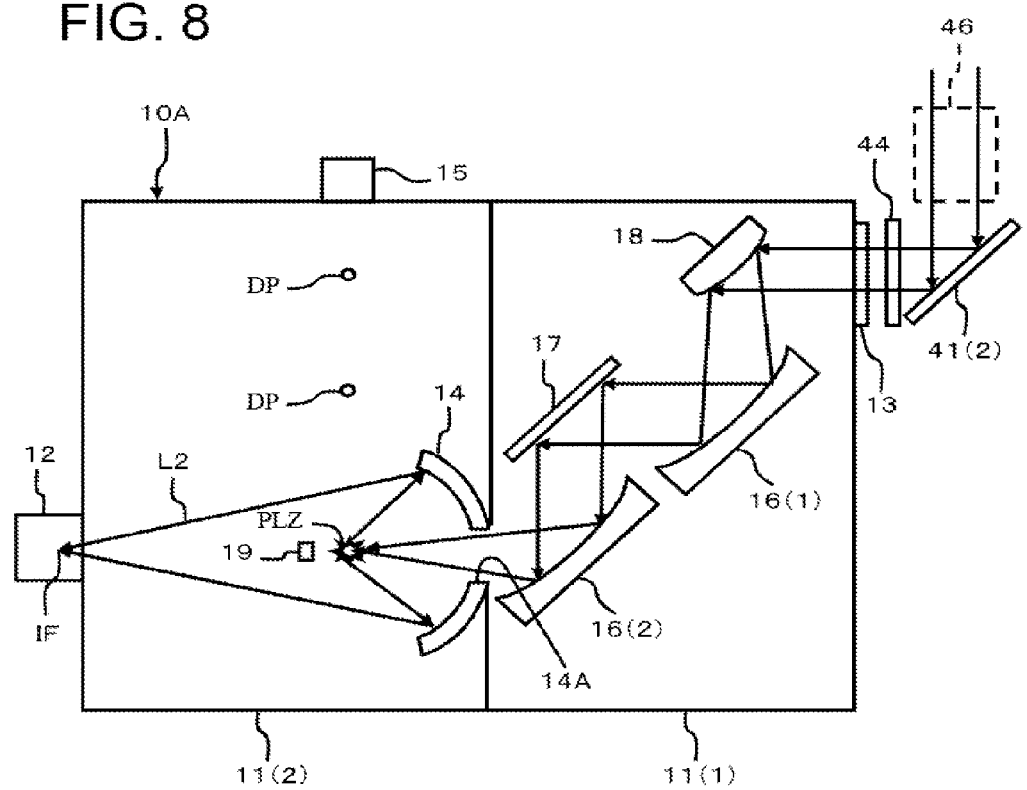
FIG. 8 is a block diagram showing an EUV chamber.

FIG. 8 is an explanatory diagram showing a configuration of the chamber 10A in accordance with the present embodiment. The chamber 10A is classified roughly into two regions 11 (1) and 11 (2). One region 11 (1) is a light focusing region for arranging a laser beam that is incident from the driver pulse laser light source device 2. The other region 11 (2) is an EUV light emission region for generating an EUV light by irradiating a droplet DP with a laser beam.

The two regions 11 (1) and 11 (2) are partitioned by a wall. The light focusing region 11 (1) and the EUV light emission region 11 (2) are communicated with each other via a small hole that has been formed in the partition wall that partitions the regions 11 (1) and 11 (2). A pressure in the light focusing region 11 (1) can be specified to be extremely higher than that in the EUV light emission region 11 (2). By this configuration, debris that has been generated in the EUV light emission region 11 (2) can be prevented from intruding into the light focusing region 11 (1).

The laser beam that has been incident to the light focusing region 11 (1) from the window 13 is reflected by an off-axis parabolic concave mirror 18, and is incident to an off-axis parabolic convex mirror 16 (1). The laser beam is provided with a predetermined beam diameter by being reflected by the mirrors 18 and 16 (1).

The laser beam that has been specified to have a predetermined beam diameter is incident to a reflecting mirror 17 to be reflected, and is incident to an off-axis parabolic convex mirror 16 (2). The laser beam that has been reflected by the off-axis parabolic convex mirror 16 (2) enters the EUV light emission region 11 (2), and irradiates a droplet DP via a hole part 14A of the EUV light collector mirror 14.

A window that a laser beam pass through, such as windows that the amplifiers 32 (1), 32 (2), 35 (1), and 35 (2) are provided with, windows that the SAs 33 (1) and 33 (2) are provided with, and the window 13 of the chamber 10A, is preferably formed by a material having characteristics similar to those of a diamond.

A diamond has permeability to a wavelength of 10.6 μm of a CO2 laser and has a high coefficient of thermal conductivity. Consequently, even in the case in which a large heat load is applied to a diamond, a distribution of temperature is hard to occur, whereby a shape and an index of refraction are hard to vary. As a result, for a laser beam that passes through a window made of a diamond, a curvature or an angle of a wave front of the laser beam are hard to vary.

However, since a diamond is high-priced in general, it may be difficult that all windows are made of a diamond in the regard of a cost. In the case in which a cost phase is considered, a window that is used for an element that a relatively large heat load is applied to is made of a diamond. In the present laser system, a larger heat load is applied to an element that is disposed on a more downstream side. For instance, since a relatively large heat load is applied to the both windows of the main amplifier 35 and the window of the EUV chamber 10A, the windows should be made of a diamond. Moreover, since the SA 33 absorbs a CO2 laser beam, a large heat load is applied to the SA 33. Consequently, the SA 33 should be made of a diamond regardless of whether the SA 33 is disposed on an upstream side of a beam or on a downstream side.

Figure 12:
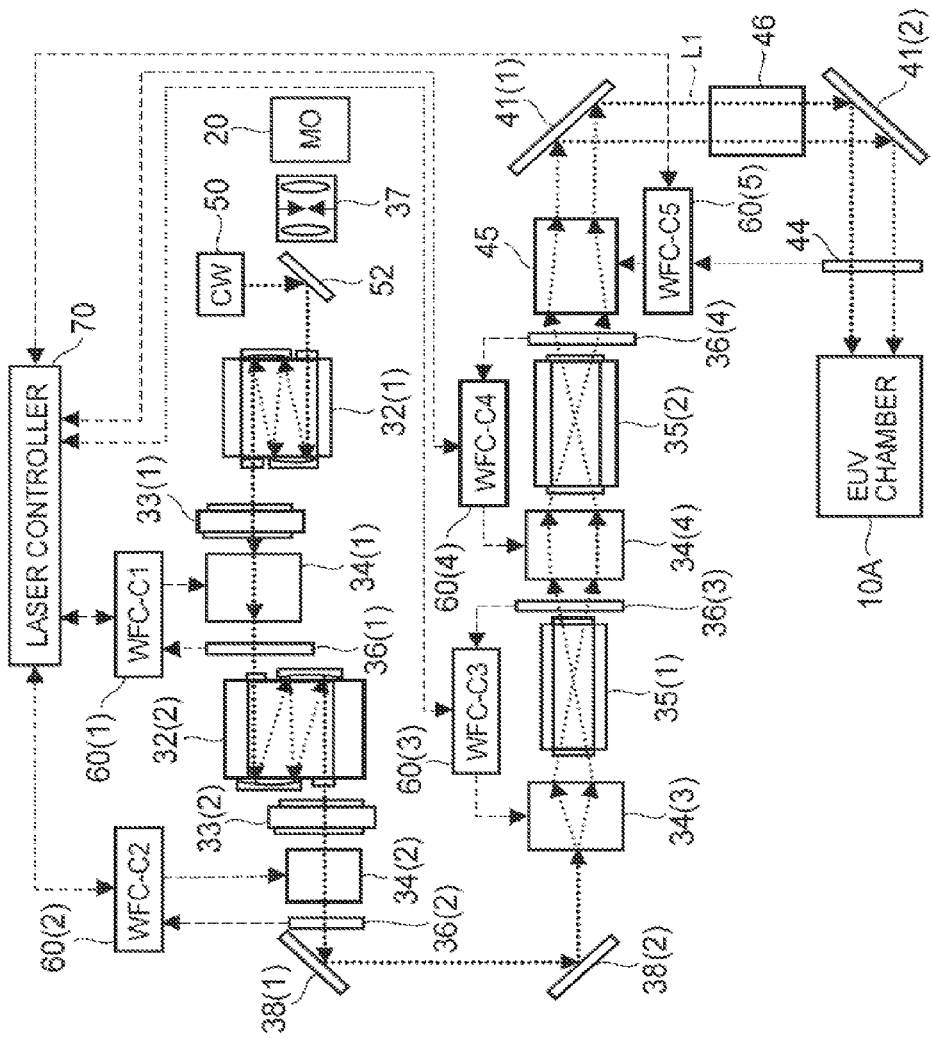
FIG. 12 is an explanatory diagram showing the state in which only a guide laser beam is output.

A flow of a guide laser beam will be described in the following. As shown in FIG. 12, the guide laser beam introduction mirror 52 is disposed between an exit side of the spatial filter 37 and an inlet side of the first preamplifier 32 (1). The guide laser beam is transmitted to a light path substantially equivalent to that of a driver pulsed laser beam via the guide laser beam introduction mirror 52.

Figure 9:
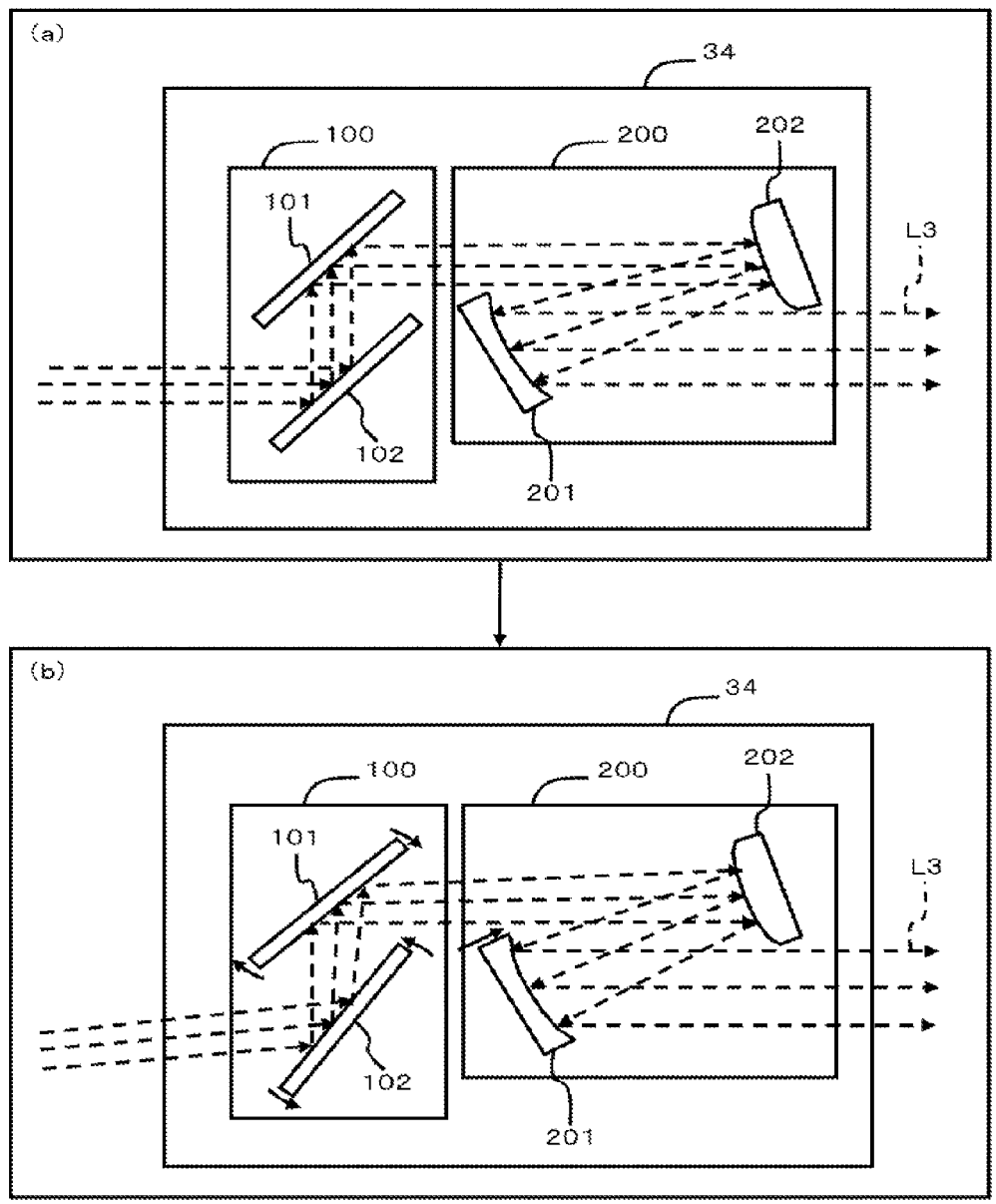
FIG. 9 is a block diagram showing a wave front correction part.

FIG. 9 is an explanatory diagram schematically showing a principle of the wave front correction part 34. FIG. 9(a) shows a case in which a heat load is less, and FIG. 9(b) shows a case in which a heat load is large. The point of focus in the descriptions of each optical element in the following is a guide laser beam L3. However, each optical element also gives an operation equivalent to that of the guide laser beam to a driver pulsed laser beam.

The wave front correction part 34 is provided with an angle correction part 100 and a wave front curvature correction part 200. The angle correction part 100 is an optical system that adjusts an angle (a direction of travel) of a laser beam. The wave front curvature correction part 200 is an optical system that adjusts a curvature of a wave front of a laser beam (a spread of a beam). The detailed configuration example will be described later in another embodiment.

The angle correction part 100 is configured to be provided with, for example, two reflecting mirrors 101 and 102 that are disposed face to face in parallel. As shown in FIG. 9(b), each of the two reflecting mirrors 101 and 102 is disposed in a rotatable manner around an X axis (an axis perpendicular to FIG. 9) and a Y axis (an axis being at right angles to the X axis in the same plane) of the reflecting mirror as the center of rotation. In other words, each of the two reflecting mirrors 101 and 102 is attached in such a manner that a tilt and a rolling can be carried out.

In the case in which a heat load is less (FIG. 9(a)), since the guide laser beam L3 travels in accordance with a standard optical axis, it is not necessary to change an orientation of each of the two reflecting mirrors 101 and 102. In the case in which a heat load is large (FIG. 9(b)), the guide laser beam L3 is incident out of a standard optical axis. Consequently, an orientation of each of the two reflecting mirrors 101 and 102 is varied as needed, and an emitting direction of the guide laser beam L3 is adjusted to correspond to a standard optical axis.

The wave front curvature correction part 200 is configured to be provided with, for example, a concave mirror 201 and a convex mirror 202. By adjusting a relative positional relationship of each of the mirrors 201 and 202, a convex face wave and a concave face wave can be modified to be a plane wave.

Figure 10:
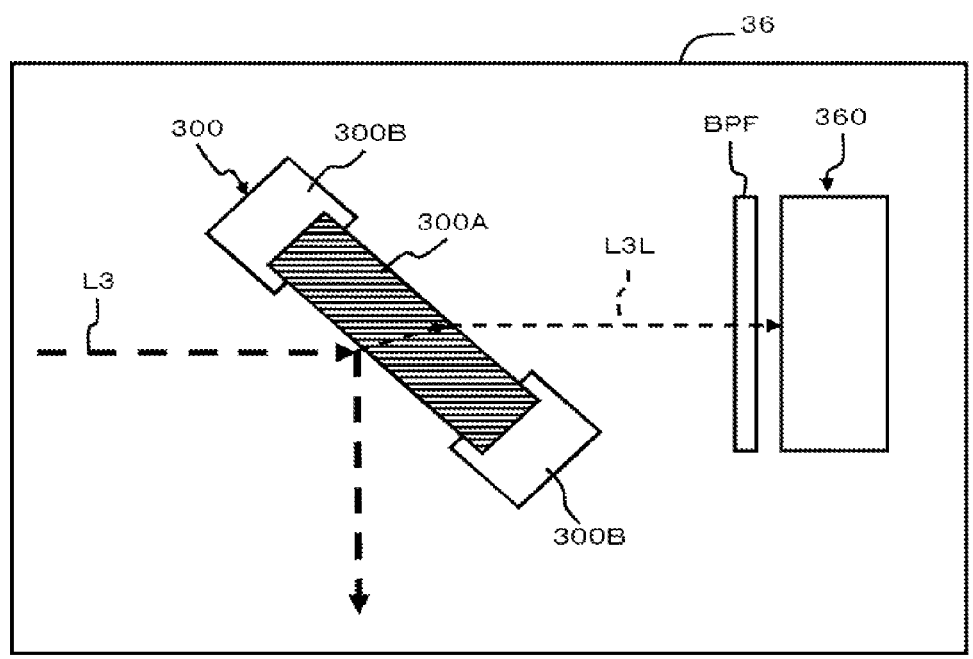
FIG. 10 is a block diagram showing a sensor.

FIG. 10 is a block diagram showing an example of a sensor 36. A reflecting mirror 300 on which a coating that reflects the driver pulsed laser beam L1 and the guide laser beam L3 at a high degree of reflection is coated is configured to be provided with a beam splitter substrate 300A and a holder 300B with a water-cooling jacket for holding the beam splitter substrate 300A. A reflecting coating that is coated on the reflecting mirror 300 is configured to reflect the driver pulsed laser beam at a high degree of reflection and to partially reflect the guide laser beam.

The beam splitter substrate 300A is made of, for example, a material such as silicon (Si), zinc selenide (ZnSe), gallium arsenide (GaAs), and a diamond. Although many of the guide laser beams L3 is reflected by a reflecting coating of the beam splitter substrate 300A, a part L3L of the guide laser beams L3 is transmitted to the beam splitter substrate 300A.

The guide laser beam L3L that has been transmitted to the beam splitter substrate 300A becomes a sample beam and passes through a band-pass filter BPF to be incident to an optical sensor part 360. The band-pass filter BPF makes a guide laser beam to be transmitted and blocks a transmission of other beams.

As the optical sensor part 360, a sensor such as a beam profiler that measures an intensity distribution of a laser beam, a power sensor that measures a laser duty and a load of an optical element (for instance, a calorimeter and a pyroelectric sensor), and a wave front sensor that can simultaneously measure a wave front state and a direction of a laser beam can be used for instance.

Figure 11:
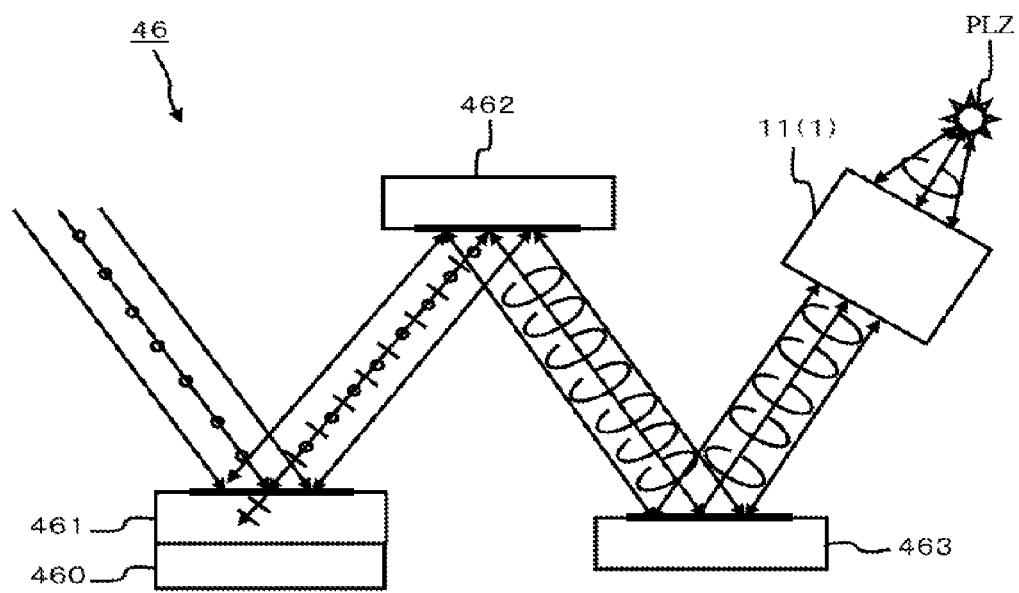
FIG. 11 is a block diagram showing an isolator.

FIG. 11 is an explanatory diagram showing a configuration example of an isolator 46. The isolator 46 is configured to be provided with, for example, a first mirror 461 provided with a heat sink 460, a second mirror 462, and a third mirror 463. A laser beam that has been reflected by the third mirror 463 is incident to the light focusing region 11 (1) in which a light focusing optical system is disposed for focusing a laser beam in the chamber 10A via the reflecting mirror 41 (2) and the window 13 (see FIG. 8).

The first mirror 461 makes a P polarized light to be transmitted and only an S polarized light to be reflected by a dielectric multilayer that has been formed on the surface of the first mirror. For the first mirror 461, a P polarized light is absorbed into a substrate to be cooled by the heat sink 460. A laser beam is incident to the first mirror 461 as an S polarized light.

A laser beam of an S polarized light that has been reflected by the first mirror 461 is incident to the second mirror 462 that is disposed facing to the first mirror 461 in a diagonal direction. A $\lambda/4$ coating that generates a phase difference of $n/2$ is formed on a surface of the second mirror 462. Consequently, a laser beam is converted into a circularly polarized light by being reflected by the second mirror 462.

A laser beam of a circularly polarized light is incident to the third mirror 463. A coating that reflects a P polarized light and an S polarized light at a high degree of reflection is coated on the third mirror 463. A laser beam that has been reflected by the third mirror 463 is focused and irradiated to a droplet DP to generate the plasma PLZ via the light focusing region 11 (1) in which a light focusing optical system is disposed for focusing a laser beam.

A laser beam that has been reflected by the plasma PLZ returns to a light path equivalent to a light path during an irradiation as a circularly polarized light of a reverse rotation. A return light of a circularly polarized light is reflected by the third mirror 463 and is incident to the second mirror 462. The return light is converted into a P polarized light by being reflected by the $\lambda/4$ coating of the second mirror 462.

A laser light of a P polarized light is incident to the first mirror 461. The laser light of a P polarized light that has been incident to the first mirror 461 is transmitted to the coating of the first mirror 461, and is absorbed into a mirror substrate to be converted into a heat. The heat is released by the heat sink 460. Consequently, a laser beam that is reflected by the plasma PLZ and is returned can be prevented from returning to an inlet side of the isolator 46. By this configuration, a self oscillation caused by a return light of a laser beam can be prevented.

By using the isolator 46 of the reflecting optical system as shown in FIG. 11, a distortion of a wave front, which occurs for a laser beam that is transmitted to the isolator 46, can be less as compared with the case in which an isolator of a transmitting optical system is used.

Figure 13:
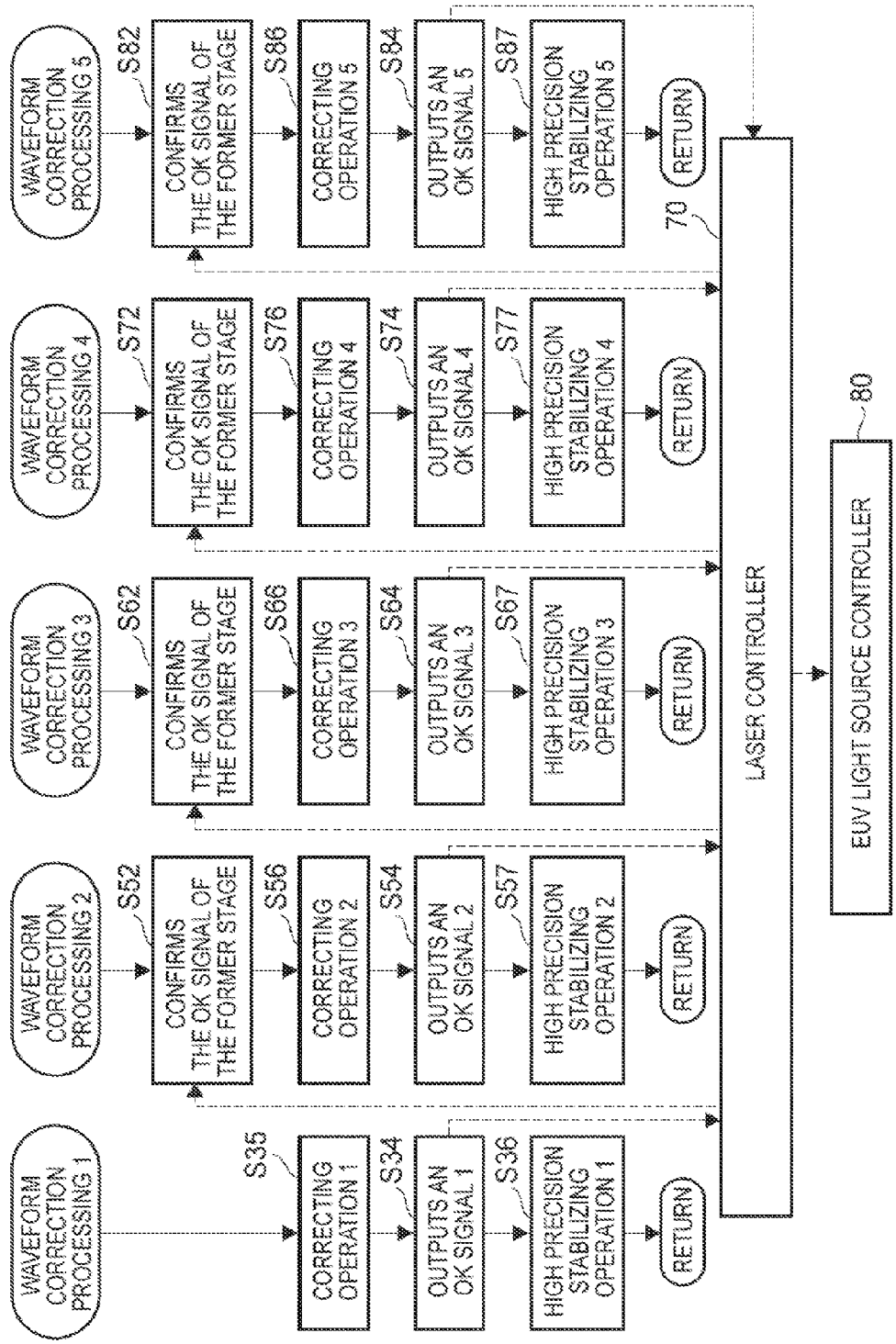
FIG. 13 is a flowchart of a wave front correction processing.

FIG. 13 is a flowchart of a summary of an operation in accordance with the present embodiment. As shown in the second embodiment, in the case in which a plurality of wave front correction parts 34 (1) to 34 (4) and 45 are disposed, a wave front is corrected in order from a wave front correction part on an upstream side.

At first, the wave front correction controller 60 (1) carries out a first wave front correction by using the wave front correction part 34 (1) that is positioned on the most upstream side (S34), and notifies the laser controller 70 of that the wave front correction has been completed (S32).

In the next place, after the wave front correction controller 60 (2) confirms that a completion notice has been output from the wave front correction controller 60 (1) of the former stage (S52), the wave front correction controller 60 (2) carries out a second wave front correction by using the wave front correction part 34 (2) (S56). The wave front correction controller 60 (2) notifies the laser controller 70 of that the wave front correction has been completed (S54).

Similarly, after the next wave front correction controller 60 (3) confirms that a completion notice has been sent from the wave front correction controller 60 (2) of the former stage (S62), the wave front correction controller 60 (3) carries out a third wave front correction by using the wave front correction part 34 (3) (S66). The wave front correction controller 60 (3) notifies the laser controller 70 of that the wave front correction has been completed (S64).

Similarly, after the next wave front correction controller 60 (4) confirms that a completion notice has been sent from the wave front correction controller 60 (3) of the former stage (S72), the wave front correction controller 60 (4) carries out a fourth wave front correction by using the wave front correction part 34 (4) (S76). The wave front correction controller 60 (4) notifies the laser controller 70 of that the wave front correction has been completed (S74).

Similarly, after the last wave front correction controller 60 (5) confirms that a completion notice has been sent from the wave front correction controller 60 (4) of the former stage (S82), the wave front correction controller 60 (5) carries out the last wave front correction by using the wave front correction part 45 (S86). The wave front correction controller 60 (5) notifies the laser controller 70 of that the wave front correction has been completed (S84).

The laser controller 70 receives a completion notice for notifying of that the wave front correction has been completed in order from each of the wave front correction controllers 60 (1) to 60 (5). In the case in which the laser controller 70 receives all the completion notices, the laser controller 70 notifies the EUV light source controller 80 of that an adjustment of the driver pulse laser light source device 2 has been completed.

The present embodiment that is configured as described above has an operation effect equivalent to that of the first and second embodiments. Moreover, in the present embodiment, the wave front correction parts 34 (1) to 34 (4) are corresponded to the amplifiers 32 (1), 32 (2), 35 (1), and 35 (2), respectively, and a laser beam is incident to each amplifier at a suitable curvature and a suitable angle of a wave front. Consequently, a laser beam can be amplified in a more stable manner as compared with the first and second embodiments.

Embodiment 4

Figure 14:
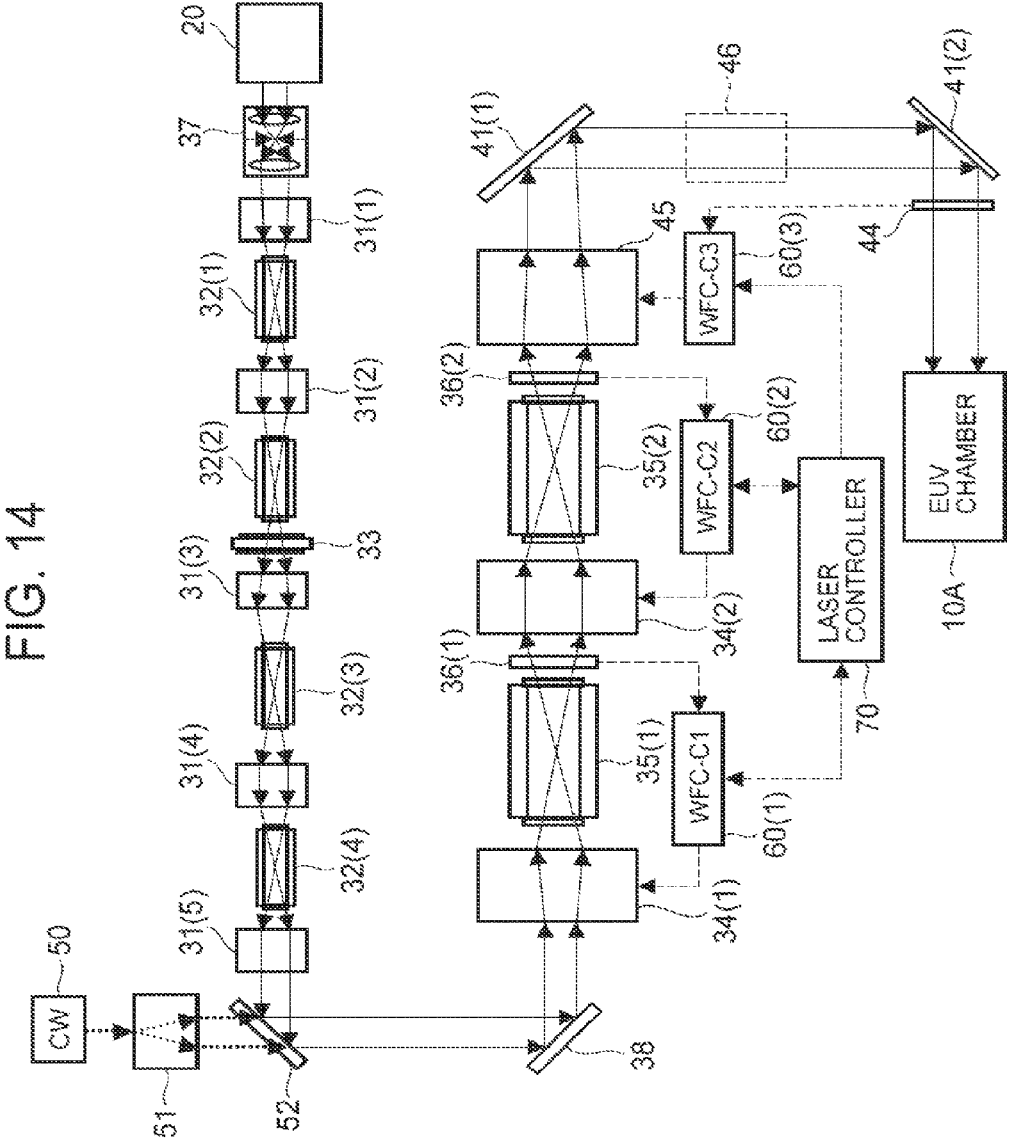
FIG. 14 is a block diagram showing an extreme ultraviolet light source device in accordance with a fourth embodiment of the present invention.
Figure 15:
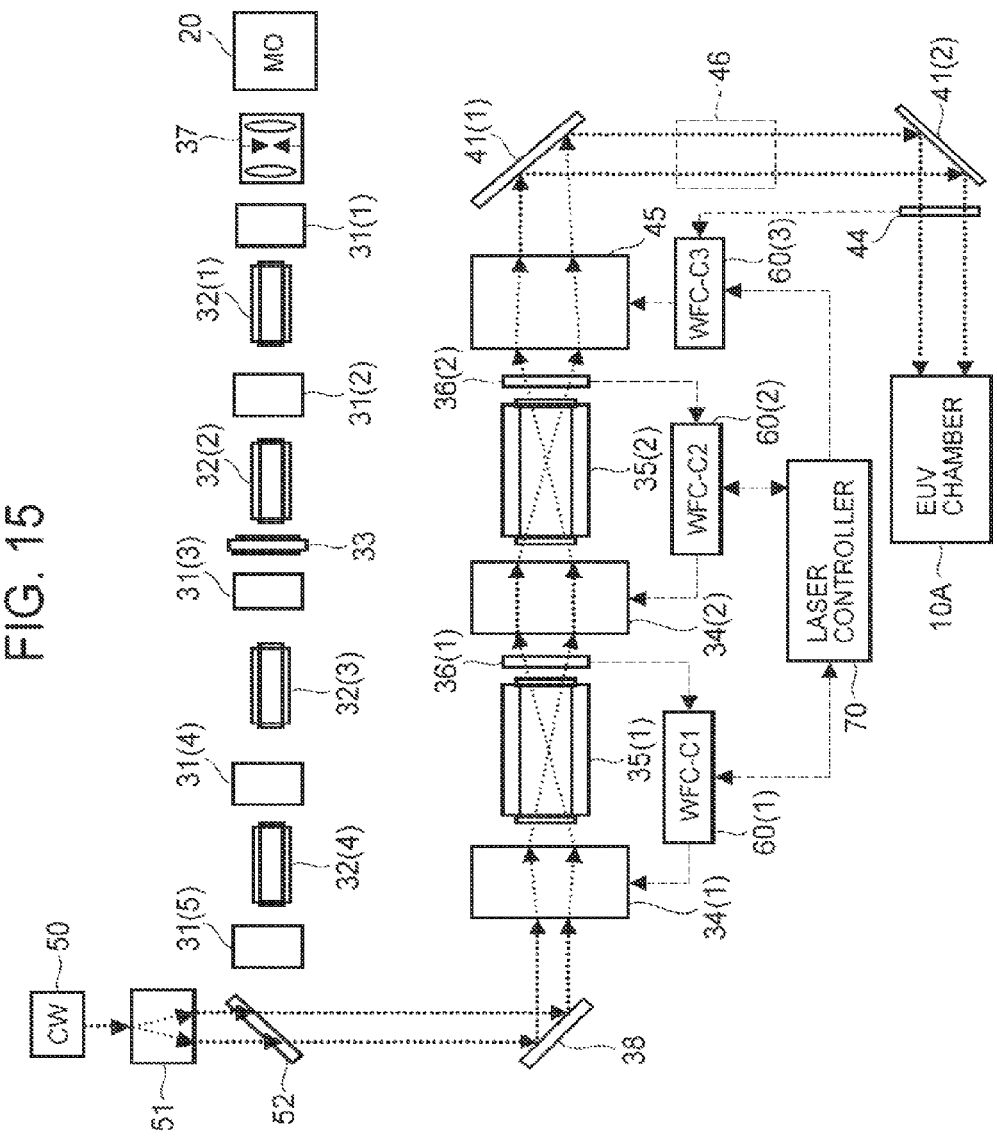
FIG. 15 is an explanatory diagram showing the state in which only a guide laser beam is output.

A fourth embodiment of the present invention will be described in the following with reference to FIGS. 14 and 15. In the present embodiment, total four preamplifiers 32 (1) to 32 (4) and total two main amplifiers 35 (1) and 35 (2) are included. Moreover, in the present embodiment, only one SA 33 is disposed as compared with the third embodiment. FIG. 14 shows the case in which a driver pulsed laser beam and a guide laser beam are output. FIG. 15 shows the case in which only a guide laser beam is output.

The present embodiment is configured to be provided with a spatial filter 37, a relay optical system 31 (1), a preamplifier 32 (1), a relay optical system 31 (2), a preamplifier 32 (2), an SA 33, a relay optical system 31 (3), a preamplifier 32 (3), a relay optical system 31 (4), a preamplifier 32 (4), a relay optical system 31 (5), a guide laser beam introduction mirror 52, a reflecting mirror 38, a wave front correction part 34 (1), a main amplifier 35 (1), a sensor 36 (1), a wave front correction part 34 (2), a main amplifier 35 (2), a sensor 36 (2), a wave front correction part 45, a reflecting mirror 41 (1), an isolator 46 (also possible to be removed), a reflecting mirror 41 (2), and a sensor 44 in order from the upstream side.

The guide laser beam introduction mirror 52 is disposed at a turn-around section of a light path between the preamplifier 34 (4) and the main amplifier 35 (1). It should be noted that the guide laser beam introduction mirror 52 shown in FIGS. 14 and 15 is configured as a first type guide laser beam introduction mirror that makes the guide laser beam be transmitted and that makes the driver pulsed laser beam be reflected.

The driver pulsed laser beam is transmitted to the total four preamplifiers 32 (1) to 32 (4) to be amplified to a value of a certain degree. If a driver pulsed laser beam having a relatively high output power is transmitted to the guide laser beam introduction mirror 52, a heat load that is applied to the guide laser beam introduction mirror 52 is large, whereby a distortion or the like occurs in the guide laser beam introduction mirror 52. On the other hand, in the case in which a guide laser beam introduction mirror is configured in such a manner that a driver pulsed laser beam is reflected and a guide laser beam is transmitted like the present embodiment, a heat load that is applied to the guide laser beam introduction mirror 52 can be suppressed.

The wave front correction part 34 (1) corrects a laser beam that passes through the main amplifier 35 (1). The wave front correction part 34 (2) corrects a laser beam that passes through the main amplifier 35 (2). FIG. 15 is a block diagram showing the state in which only a guide laser beam is output.

In the present embodiment that is configured as described above, an optical performance of a laser beam is corrected in order from a wave front correction part on an upstream side like the third embodiment. The present embodiment also has an operation effect equivalent to that of the third embodiment.

Embodiment 5

Figure 16:
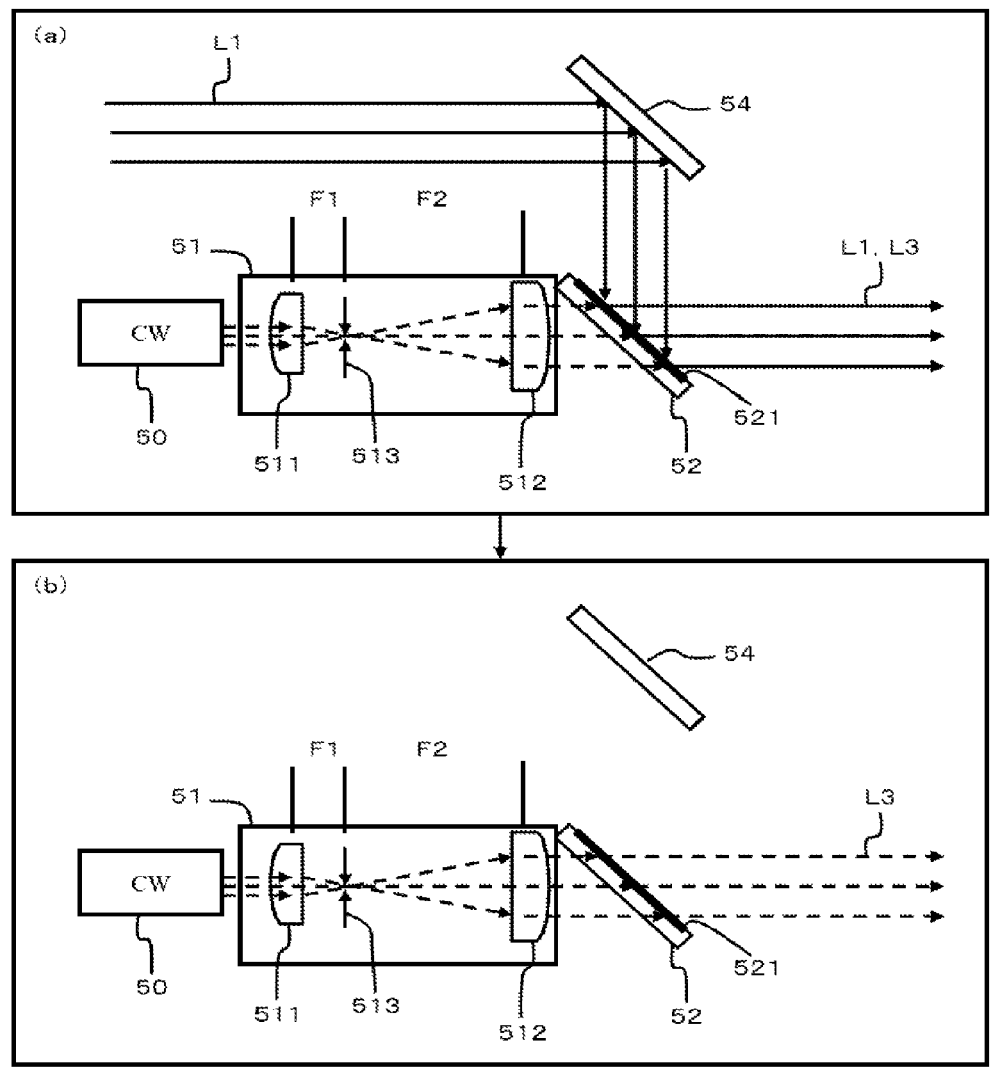
FIG. 16 is an explanatory diagram showing a configuration example for introducing a guide laser beam in accordance with a fifth embodiment of the present invention.

A fifth embodiment of the present invention will be described in the following with reference to FIGS. 16 to 18. In the present embodiment, some examples that introduce a guide laser beam to a light path of a driver pulsed laser beam will be described.

A coating 521 that transmits a guide laser beam L3 and that reflects a driver pulsed laser beam L1 is coated on the surface of the guide laser beam introduction mirror 52 shown in FIG. 16(a). The driver pulsed laser beam L1 that has been reflected by a reflecting mirror 54 is also reflected by the coating 521 of the guide laser beam introduction mirror 52, and travels toward the right side in the figure.

For instance, the guide laser beam L3 that has been output from the guide laser device 50 that is configured as a helium neon laser light source that oscillates in a single transverse mode is incident to a laser collimator 51, whereby a beam diameter and a wave front shape of the guide laser beam L3 are adjusted.

The laser collimator 51 is configured to be provided with, for example, two convex lenses 511 and 512 and a spatial filter 513 that is disposed between the convex lenses. A rear side focus F1 of the first convex lens 511 and a front side focus F2 of the second convex lens 512 are corresponded to each other, and the spatial filter 513 is disposed at the corresponded position of F1 and F2.

By the above configuration, as shown in FIG. 16(b), only the guide laser beam in a single transverse mode is transmitted to the spatial filter 513 and is incident to the second convex lens 512. By the second convex lens 512, a beam diameter of the guide laser beam is expanded to be substantially equivalent to a beam diameter of a driver pulsed laser beam. The guide laser beam having a beam diameter substantially equivalent to that of a driver pulsed laser beam travels on a light path substantially equivalent to that of a driver pulsed laser beam. In other words, the guide laser beam introduction mirror 52 plays a role of superimposing the guide laser beam to the driver pulsed laser beam.

Figure 17:
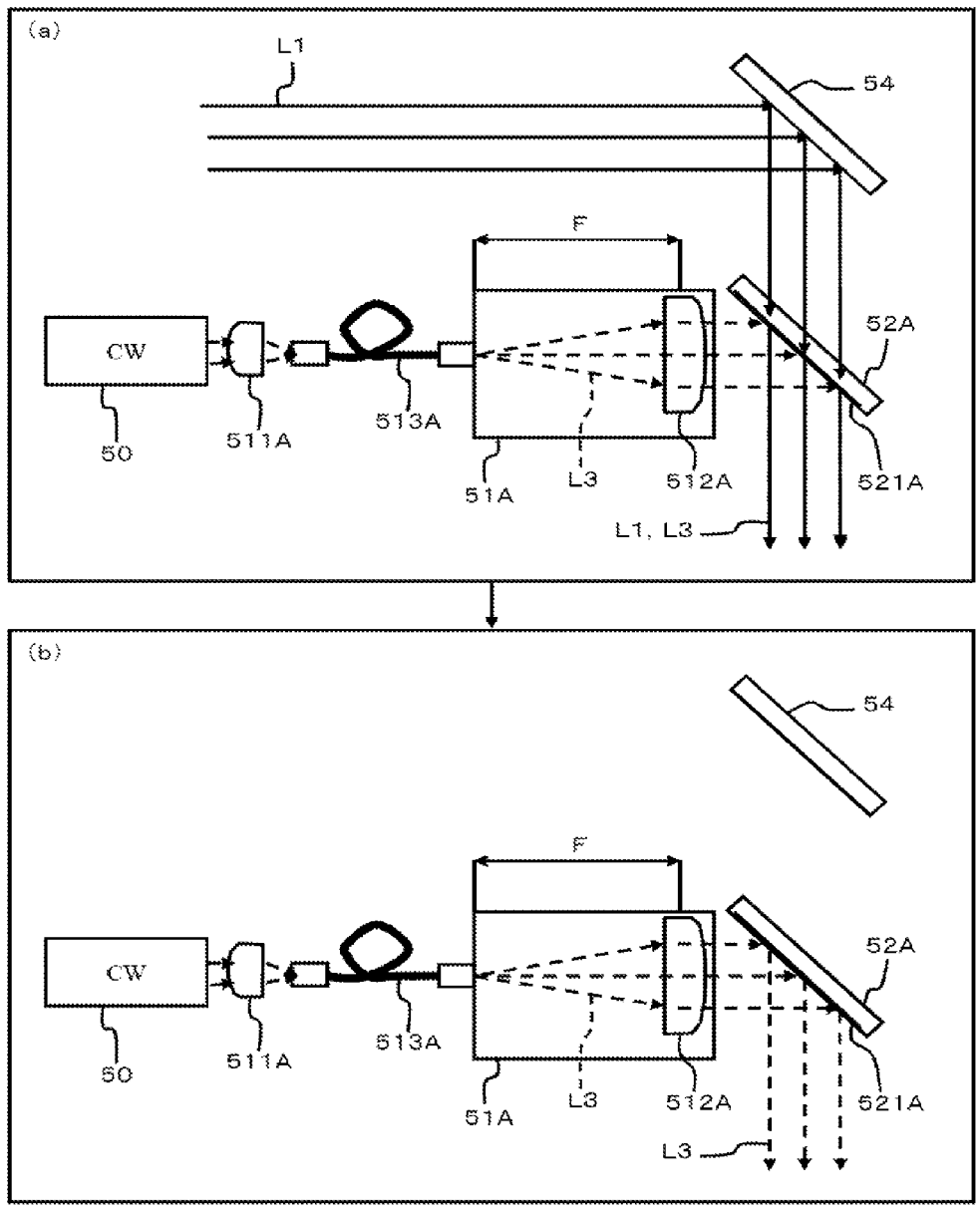
FIG. 17 is an explanatory diagram showing another example for introducing a guide laser beam.

FIG. 17 is an explanatory diagram showing another example for introducing a guide laser beam. A coating 521A that transmits a driver pulsed laser beam L1 and that reflects a guide laser beam L3 is coated on the surface of the guide laser beam introduction mirror 52A shown in FIG. 17.

The guide laser beam L3 that has been output from a guide laser device 50 is focused by a light focusing lens 511A, and is incident to a single mode fiber 513A. The output part of the single mode fiber 513A is disposed at a front side focus position of a collimator lens 512A as shown in FIG. 17(b).

A guide laser beam that has been transmitted to the single mode fiber 513A spreads at a predetermined angle and is incident to the collimator lens 512A to be converted into a plane wave by the collimator lens 512A. The guide laser beam that has been converted into a plane wave is highly reflected by the coating 521A of the guide laser beam introduction mirror 52A. By this configuration, the driver pulsed laser beam and the guide laser beam are provided with an almost equivalent beam and an almost equivalent optical axis. In the case of an example shown in FIG. 17, since the single mode optical fiber 513A is used, an alignment is easy to be carried out.

Figure 18:
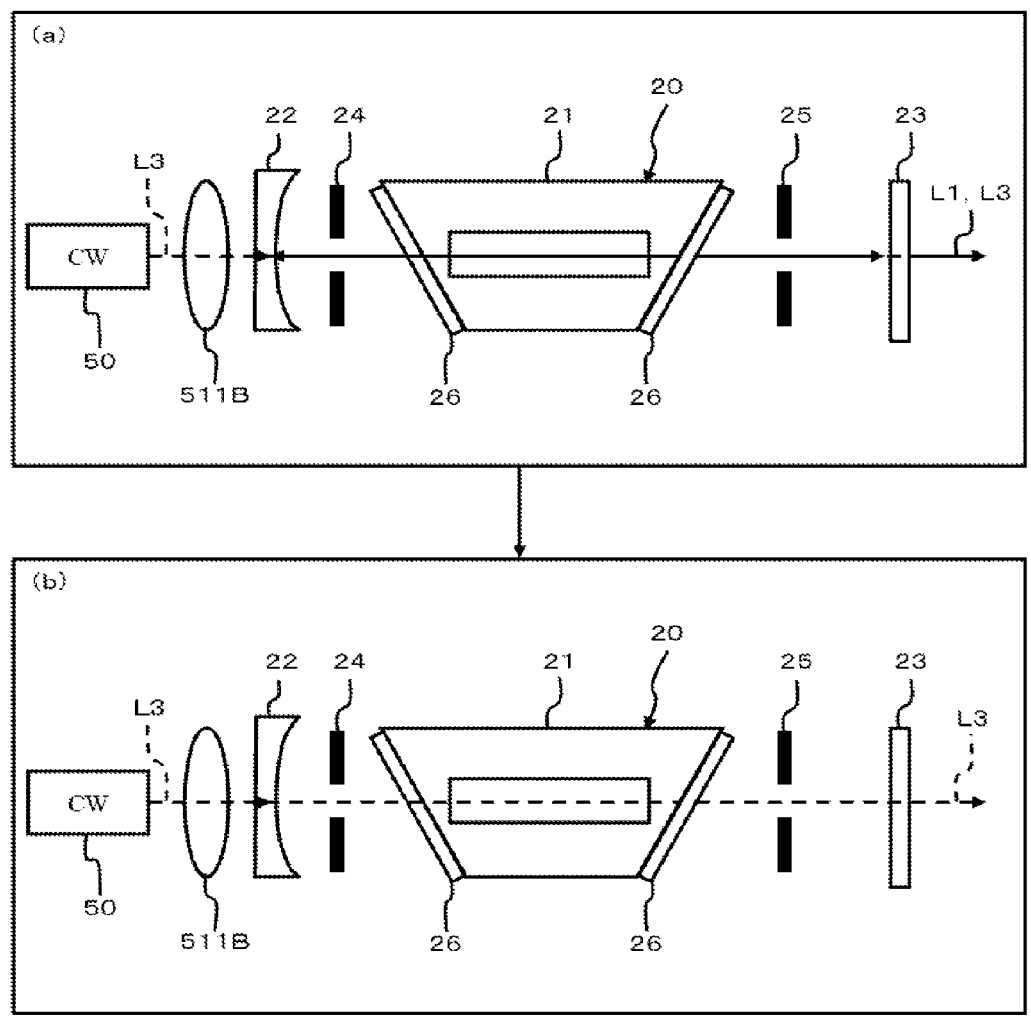
FIG. 18 is an explanatory diagram showing furthermore another example for introducing a guide laser beam.

FIG. 18 is an explanatory diagram showing furthermore another example for introducing a guide laser beam. In an example shown in FIG. 18, a configuration that outputs a driver pulsed laser beam and a configuration that introduces a guide laser beam into a light path of a driver pulsed laser beam are coupled with each other.

The driver laser oscillator 20 is configured to be provided with, for example, a laser chamber 21 provided with a window 26, a rear mirror 22 disposed on one side of the laser chamber 21 and apart from the laser chamber 21, a plane output mirror 23 disposed on the other side of the laser chamber 21 and apart from the laser chamber 21, and pinholes 24 and 25 disposed between the window 26 and the mirrors 22 and 23, respectively. The pinhole 24 restricts a spatial transverse mode of a driver pulsed laser beam.

A guide laser device 50 is disposed on one side of the rear mirror 22. A correction lens 511B is disposed between the guide laser device 50 and the rear mirror 22. After a guide laser beam is focused by the correction lens 511B, the guide laser beam is incident to the rear mirror 22 that has been formed in a concave face shape.

A coating that is configured to reflect the driver pulsed laser beam at a high degree of reflection and to transmit the guide laser beam is formed on the rear mirror 22. Consequently, as shown in FIG. 18(b), the guide laser beam is transmitted to the rear mirror 22, and in incident to the laser chamber 21 via the pinhole 24 and the window 26. Here, the rear mirror 22 is operated as a concave lens to convert the guide laser beam into a plane wave.

The guide laser beam passes through the pinhole 24, the window 26 on the rear side, the laser chamber 21, the window 26 on the front side, and the pinhole 25, and is incident to the plane output mirror (OC) 23. A coating that is configured to reflect a part of the driver pulsed laser beam and to transmit the guide laser beam is formed on the plane output mirror 23.

The guide laser beam that has been transmitted to the plane output mirror 23 travels on a light path equivalent to that of the driver pulsed laser beam. By configuring each optical element disposed on the downstream side of the driver laser oscillator 20 as a reflection type optical element, an optical axis of the driver pulsed laser beam and an optical axis of the guide laser beam can be prevented from being out of alignment from each other. This is because a chromatic aberration does not occur for the reflecting optical system. Consequently, it is preferable for instance that a spatial filter (a combination of two off-axis parabolic mirrors), a relay optical system, a wave front correction part and others are configured as a reflection type device. Since the windows 13 and 26 cannot be configured in a reflection type, the windows 13 and 26 are configured in a transmission type.

As an optical element for introducing a guide laser beam, an optical element made of a diamond is preferably used. This is because a diamond has an excellent thermal conductivity and can suppress a distribution of temperature from occurring. Consequently, the rear mirror 22 and the plane output mirror 23 should be fabricated by using a diamond substrate.

Embodiment 6

Figure 19:
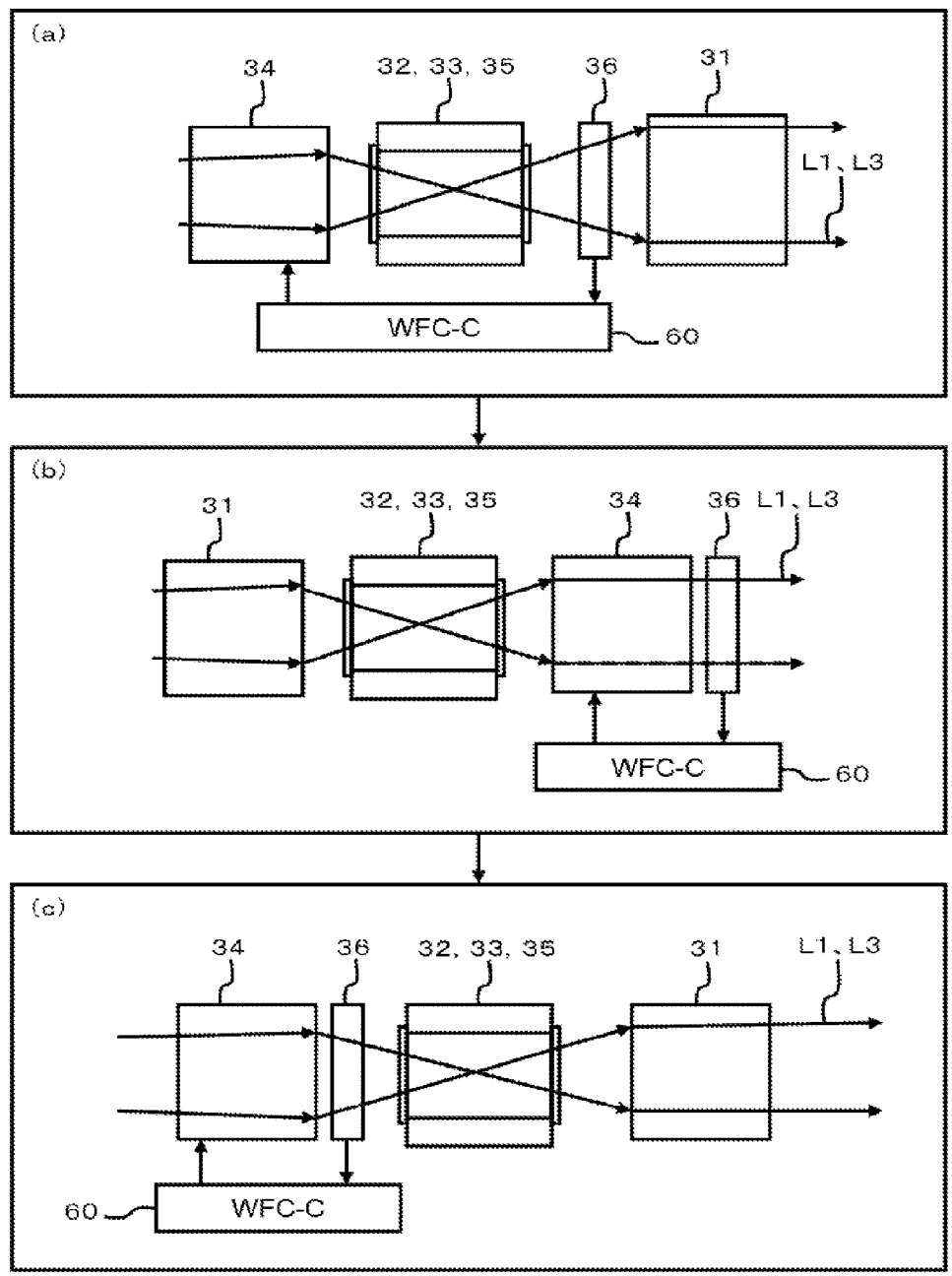
FIG. 19 is an explanatory diagram showing an example of an arrangement for a wave front correction part and a sensor in accordance with a sixth embodiment of the present invention.

A sixth embodiment of the present invention will be described in the following with reference to FIGS. 19 to 20. In the present embodiment, a modification example of a positional relationship of a wave front correction part 34, a sensor 36, and the wave front variation generating parts (32, 33, and 35) will be described. A wave front correction part includes a wave front correction part 34 in an amplifying process and a wave front correction part 45 in a light focusing process. The wave front correction part 34 will be described as a representative in the following explanation.

As a wave front variation generating part that can generate a variation in a wave front due to a heat load, there can be mentioned for instance a preamplifier 32, a main amplifier 35, an SA 33, a relay optical system 31, a reflecting mirror, a polarization element, a retarder, and other optical elements of many kinds. Here, as a matter of practical convenience for an explanation, a preamplifier 32, a main amplifier 35, and an SA 33 will be described in large part as an example for a wave front variation generating part.

FIG. 19(a) shows a configuration in which a wave front correction part 34 is disposed on the upstream side of the wave front variation generating parts 32, 33, and 35 and a sensor 36 is disposed on the downstream side of the wave front variation generating parts 32, 33, and 35. After the laser beam L1 and the guide laser beam L3 are corrected by the wave front correction part 34, the laser beam L1 and the guide laser beam L3 are input to the sensor 36. The wave front correction controller 60 controls the wave front correction part 34 in such a manner that an optical performance of a laser beam (a curvature or an angle of a wave front) that is measured by the sensor 36 is in a predetermined value.

FIG. 19(b) shows a configuration in which a wave front correction part 34 and a sensor 36 are disposed on the downstream side of the wave front variation generating parts 32, 33, and 35. The wave front correction part 34 is disposed between the wave front variation generating parts 32, 33, and 35 and the sensor 36.

After the laser beam L1 and the guide laser beam L3 pass through a relay optical system 31 and the wave front variation generating parts 32, 33, and 35, the laser beam L1 and the guide laser beam L3 are incident to the wave front correction part 34. The wave front correction controller 60 controls the wave front correction part 34 in such a manner that an optical performance that is detected by the sensor 36 is in a predetermined value.

FIG. 19(c) shows a configuration in which a sensor 36 and the wave front variation generating parts 32, 33, and 35 are disposed on the downstream side of a wave front correction part 34. The sensor 36 is disposed between the wave front correction part 34 and the wave front variation generating parts 32, 33, and 35. The wave front correction controller 60 controls the wave front correction part 34 in such a manner that an optical performance of a laser beam that is detected by the sensor 36 is in a predetermined value.

In FIG. 19(c), the wave front correction controller 60 controls the wave front correction part 34 in such a manner that an optical performance that is detected by the sensor 36 in the case in which a normal wave front is recovered when a laser beam is transmitted to the wave front correction part 34 and the wave front variation generating parts 32, 33, and 35 using a distortion of a wave front that may occur in the wave front variation generating parts 32, 33, and 35 as a known one is in a predetermined value.

Figure 20:
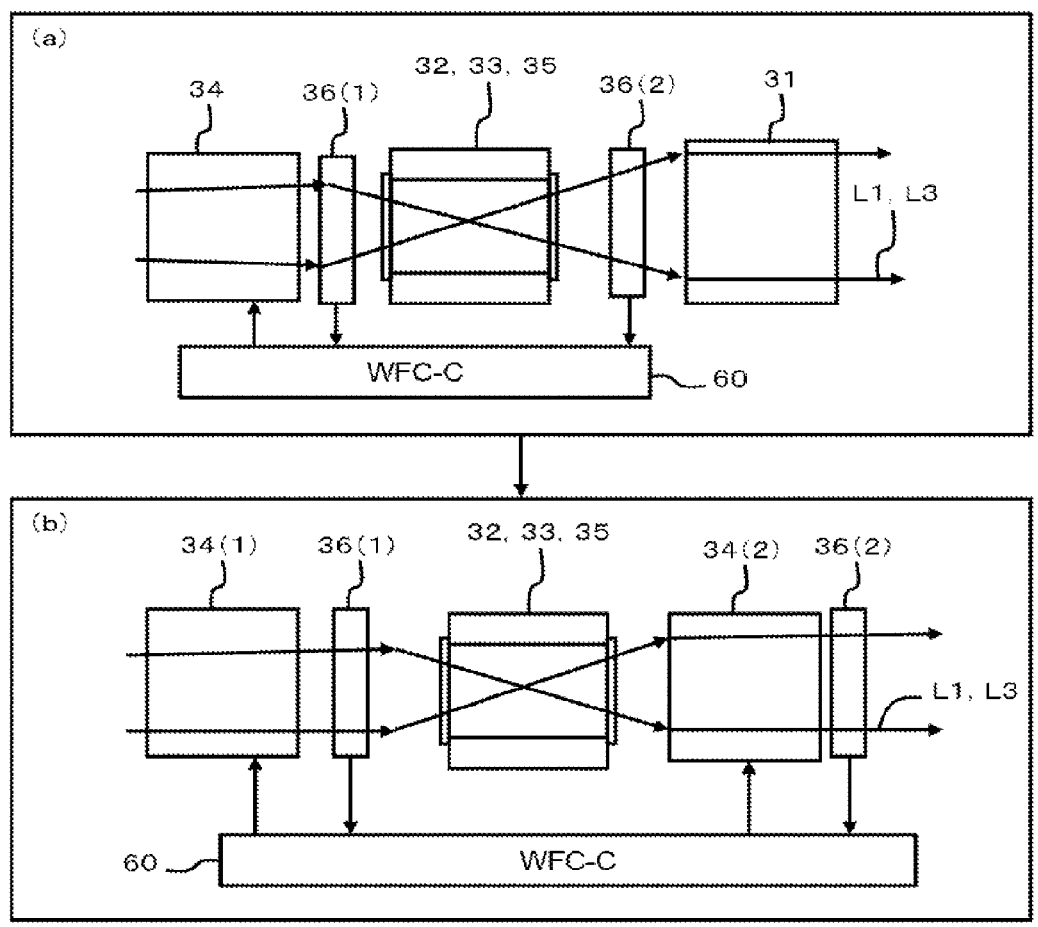
FIG. 20 is an explanatory diagram showing another example of an arrangement for a wave front correction part and a sensor.

As shown in FIG. 20, a plurality of wave front correction parts 34 or a plurality of sensors 36 can also be disposed. As shown in FIG. 20(a), the sensors 36 (1) and 36 (2) are disposed on an upstream side and a downstream side, respectively, of the wave front variation generating parts 32, 33, and 35, and a wave front correction part 34 is disposed on the most upstream side.

The wave front correction controller 60 controls the wave front correction part 34 in such a manner that a predetermined optical performance that can be measured in each of the sensors 36 (1) and 36 (2) based on an optical performance of a laser beam that is detected by the sensor 36 (1) and an optical performance of a laser beam that is detected by the sensor 36 (2).

In FIG. 20(b), the wave front correction part 34 and the sensors 36 are disposed on an upstream side and a downstream side of the wave front variation generating parts 32, 33, and 35. The wave front correction part 34 (1) and the sensor 36 (1) are disposed on an upstream side of the wave front variation generating parts 32, 33, and 35. The wave front correction part 34 (2) and the sensor 36 (2) are disposed on a downstream side of the wave front variation generating parts 32, 33, and 35.

After the laser beam L1 and the guide laser beam L3 that have passed through the sensor 36 (1) are transmitted to the wave front variation generating parts 32, 33, and 35, the laser beam L1 and the guide laser beam L3 are input to the wave front correction part 34 (2). The laser beam L1 and the guide laser beam L3 are then transmitted to the wave front correction part 34 (2) and are input to the sensor 36 (2). The wave front correction controller 60 controls the wave front correction parts 34 (1) and 34 (2) in such a manner that a laser beam characteristic that is measured at the respective position of the sensors 36 (1) and 36 (2) is a predetermined characteristic at the respective position.

Embodiment 7

Figure 21:
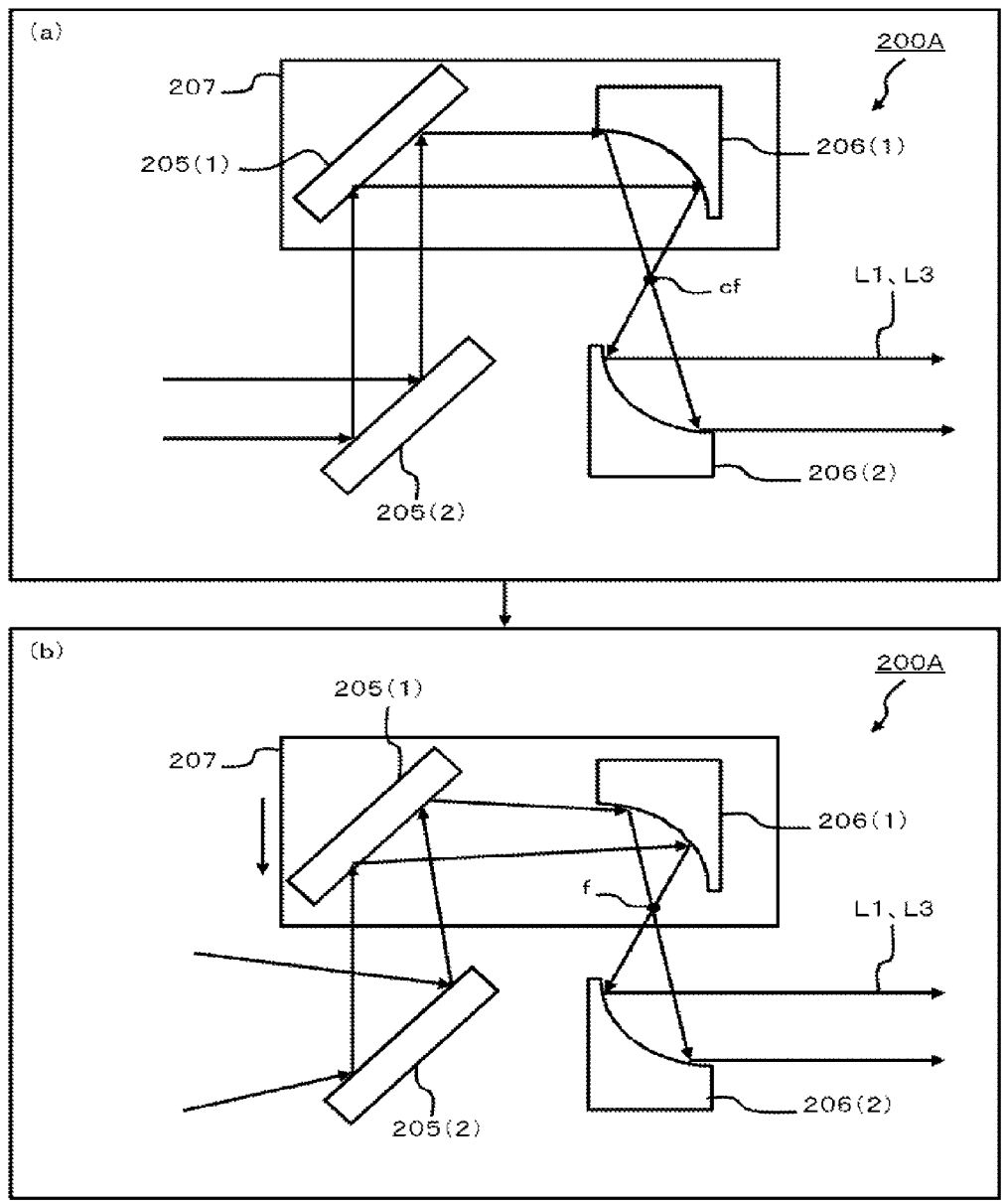
FIG. 21 is a block diagram showing a wave front curvature correction part in accordance with a seventh embodiment of the present invention.

A seventh embodiment of the present invention will be described in the following with reference to FIG. 21. In the present embodiment, an example of a wave front curvature correction part 200A that is configured as a reflection type optical system will be described. The wave front curvature correction part 200A is configured to be provided with two reflecting mirrors 205 (1) and 205 (2) and two off-axis parabolic concave mirrors 206 (1) and 206 (2). The reflecting mirror 205 (1) and the off-axis parabolic concave mirror 206 (1) that are positioned on upper side in FIG. 21 are attached to a plate 207. The plate 207 can be moved in a vertical direction in FIG. 21. The reflecting mirror 205 (1) and the off-axis parabolic concave mirror 206 (1) can also be moved in a vertical direction together with the plate 207.

FIG. 21(a) shows an arrangement in the case in which the laser beam L1 and the guide laser beam L3 that have been input as a parallel light (a plane wave) are output as they are parallel lights (plane waves). In this case, a focus position of the off-axis parabolic concave mirror 206 (1) and a focus position of the off-axis parabolic concave mirror 206 (2) are corresponded to each other to be in a state of a confocal cf.

The laser beam L1 and the guide laser beam L3 are incident to the reflecting mirror 205 (2) from a left side (an upstream side) in FIG. 21 to be reflected, and are incident to the other reflecting mirror 205 (1). The laser beam L1 and the guide laser beam L3 that have been reflected by the reflecting mirror 205 (1) are then incident to the off-axis parabolic concave mirror 206 (1).

The laser beam L1 and the guide laser beam L3 are reflected by the off-axis parabolic concave mirror 206 (1) at a reflecting angle of 45 degrees, and are focused into a focus position cf. The laser beams spread from the focus position cf, and are incident to the off-axis parabolic concave mirror 206 (2) to be reflected at a reflecting angle of 45 degrees.

FIG. 21(b) shows an arrangement in the case in which the laser beam L1 and the guide laser beam L3 that have been input as a converging light (a concave wave front) are converted into a parallel light (a plane wave) to be output. In this case, the laser beam L1 and the guide laser beam L3 are focused at a position of a light focusing point f on a front side of the focus position cf of the off-axis parabolic concave mirror 206 (1). By moving the plate 207 downward, the position of a light focusing point f is moved to a downstream side on an optical axis. By this configuration, the position of a light focusing point f of the off-axis parabolic concave mirror 206 (1) and the focus position of the off-axis parabolic concave mirror 206 (2) are corresponded to each other on an optical axis.

In the case in which the laser beam L1 and the guide laser beam L3 are input as a diverging light (a convex wave front), the plate 207 is moved upward in FIG. 21.

For the wave front curvature correction part 200A that is configured as described above, the reflecting mirror 205 (1) and the off-axis parabolic concave mirror 206 (1) are fixed to a plate 207, and the reflecting mirror 205 (1) and the off-axis parabolic concave mirror 206 (1) are moved simultaneously on an optical axis (in a vertical direction in FIG. 21). By this configuration, in the present embodiment, an optical axis of an input light and an optical axis of an output light are corresponded to each other, whereby a curvature of a wave front can be corrected.

Moreover, since the wave front curvature correction part 200A in accordance with the present embodiment is configured as a reflection type optical system, even in the case in which the laser beam L1 and the guide laser beam L3 pass through the wave front curvature correction part 200A, a wave front variation caused by a heat can be less. By this configuration, even in the case in which a laser beam of a high output power is used, a curvature of a wave front can be corrected with a high degree of accuracy.

Embodiment 8

Figure 22:
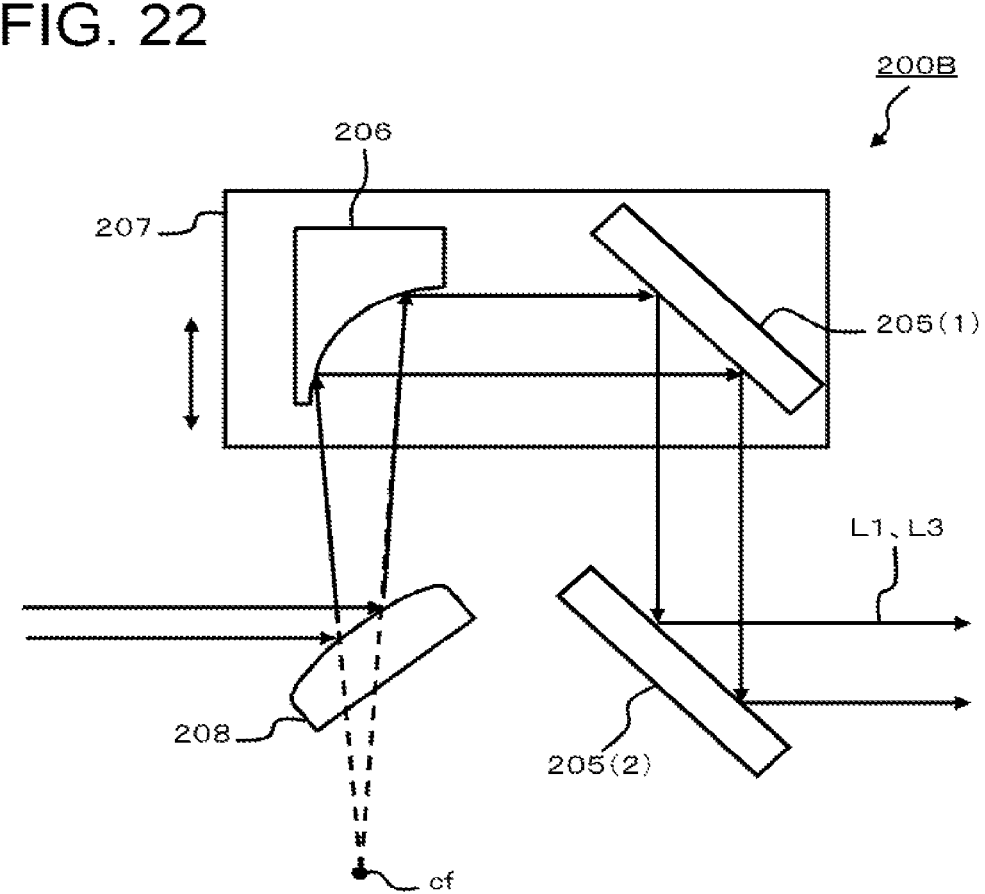
FIG. 22 is a block diagram showing a wave front curvature correction part in accordance with an eighth embodiment of the present invention.

An eighth embodiment of the present invention will be described in the following with reference to FIG. 22. A wave front curvature correction part 200B in accordance with the present embodiment is configured by a reflection type optical system that includes an off-axis parabolic concave mirror 206, an off-axis parabolic convex mirror 208, and two reflecting mirrors 205 (1) and 205 (2).

The off-axis parabolic concave mirror 206 and the reflecting mirror 205 (1) are attached to a plate 207 that can be moved in a vertical direction. Moreover, a focus position of the off-axis parabolic convex mirror 208 and a focus position of the off-axis parabolic concave mirror 206 are arranged to be corresponded to each other at a confocal cf.

The laser beam L1 and the guide laser beam L3 that have a parallel wave front are reflected by the off-axis parabolic convex mirror 208, and are incident to the off-axis parabolic concave mirror 206 as a diverging light to be converted into a plane wave. The laser beams of a plane wave are reflected by the reflecting mirrors 205 (1) and 205 (2) to be output. Similarly to the seventh embodiment, the wave fronts of the laser beam L1 and the guide laser beam L3 are corrected to be a plane wave by moving the plate 207 in a vertical direction, and the laser beam L1 and the guide laser beam L3 are output.

The present embodiment that is configured as described above has an operation effect equivalent to that of the seventh embodiment. Moreover, in the present embodiment, by combining a concave face of the off-axis parabolic concave mirror 206 and a convex face of the off-axis parabolic convex mirror 208, a distance between both the off-axis parabolic mirrors can be shortened. Consequently, the total dimensions can be miniaturized as compared with the seventh embodiment.

Embodiment 9

A ninth embodiment of the present invention will be described in the following with reference to FIGS. 23 and 24. In the present embodiment, the wave front curvature correction parts 200C and 200D are configured by an arrangement of a convex mirror 209 and a concave mirror 210 in a Z pattern.

Figure 23:
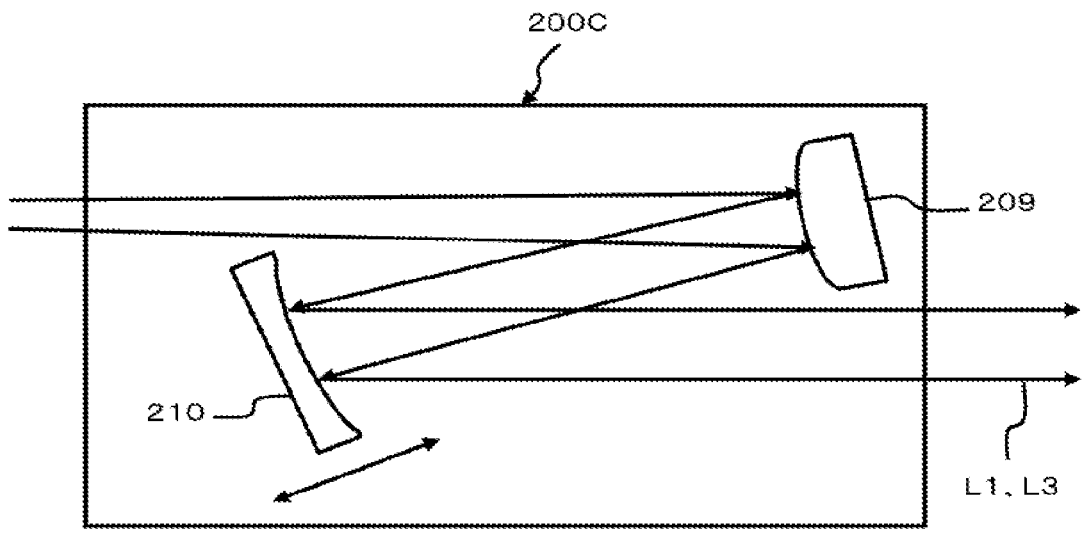
FIG. 23 is a block diagram showing a wave front curvature correction part in accordance with a ninth embodiment of the present invention.

FIG. 23 shows the wave front curvature correction part 200C that is configured by an arrangement of a spherical convex mirror 209 on an upstream side and a spherical concave mirror 210 on a downstream side in a Z pattern. For instance, in the case in which the laser beam L1 and the guide laser beam L3 that are a diverging light (a convex wave front) are incident to the convex mirror 209, the convex mirror 209 reflects the laser beam L1 and the guide laser beam L3 at a small incident angle α of 3 degrees or less. The laser beam L1 and the guide laser beam L3 that have been reflected are incident to the concave mirror 210 at an incident angle α, and are converted into a parallel light (a plane wave) to be output.

For instance, by moving a position of the concave mirror 210 along a reflecting optical axis of the convex mirror 209 as shown by an arrow in FIG. 23, a wave front of a laser beam can be converted into a plane wave.

Figure 24:
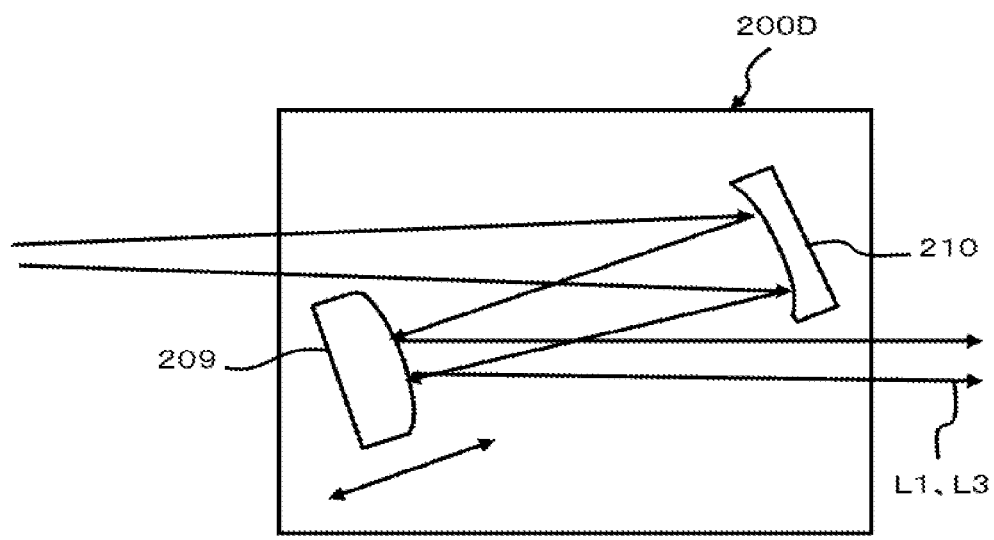
FIG. 24 is a block diagram that follows FIG. 23.

FIG. 24 shows the wave front curvature correction part 200D that is configured by an arrangement of a spherical concave mirror 210 on an upstream side and a spherical convex mirror 209 on a downstream side in a Z pattern. For instance, in the case in which the laser beam L1 and the guide laser beam L3 that are a diverging light (a convex wave front) are incident to the concave mirror 210, the concave mirror 210 reflects the laser beam L1 and the guide laser beam L3 at a small incident angle α (for instance, 3 degrees or less). The laser beam L1 and the guide laser beam L3 that have been reflected are incident to the convex mirror 209 at an incident angle α, and are converted into a parallel light (a plane wave). For instance, by moving a position of the convex mirror 209 along a reflecting optical axis of the concave mirror 210 as shown by an arrow in FIG. 24, a curvature of a wave front of the laser beam L1 and the guide laser beam L3 can be converted into that of a plane wave.

In the present embodiment as described above, since the wave front curvature correction part can be configured by the convex mirror 209 and the concave mirror 210, a production cost can be reduced. Moreover, since the present configuration is a reflecting optical system, a wave front variation that occurs in the case in which the laser beam L1 and the guide laser beam L3 pass through the wave front curvature correction part can also be reduced.

In the present embodiment, an optical axis of the laser beam L1 and the guide laser beam L3 that are output are moved in parallel from an optical axis of the laser beam L1 and the guide laser beam L3 that have been input. Consequently, an optical system that makes an optical axis of an output light correspond to an optical axis of an input light can also be configured additionally.

Embodiment 10

Figure 25:
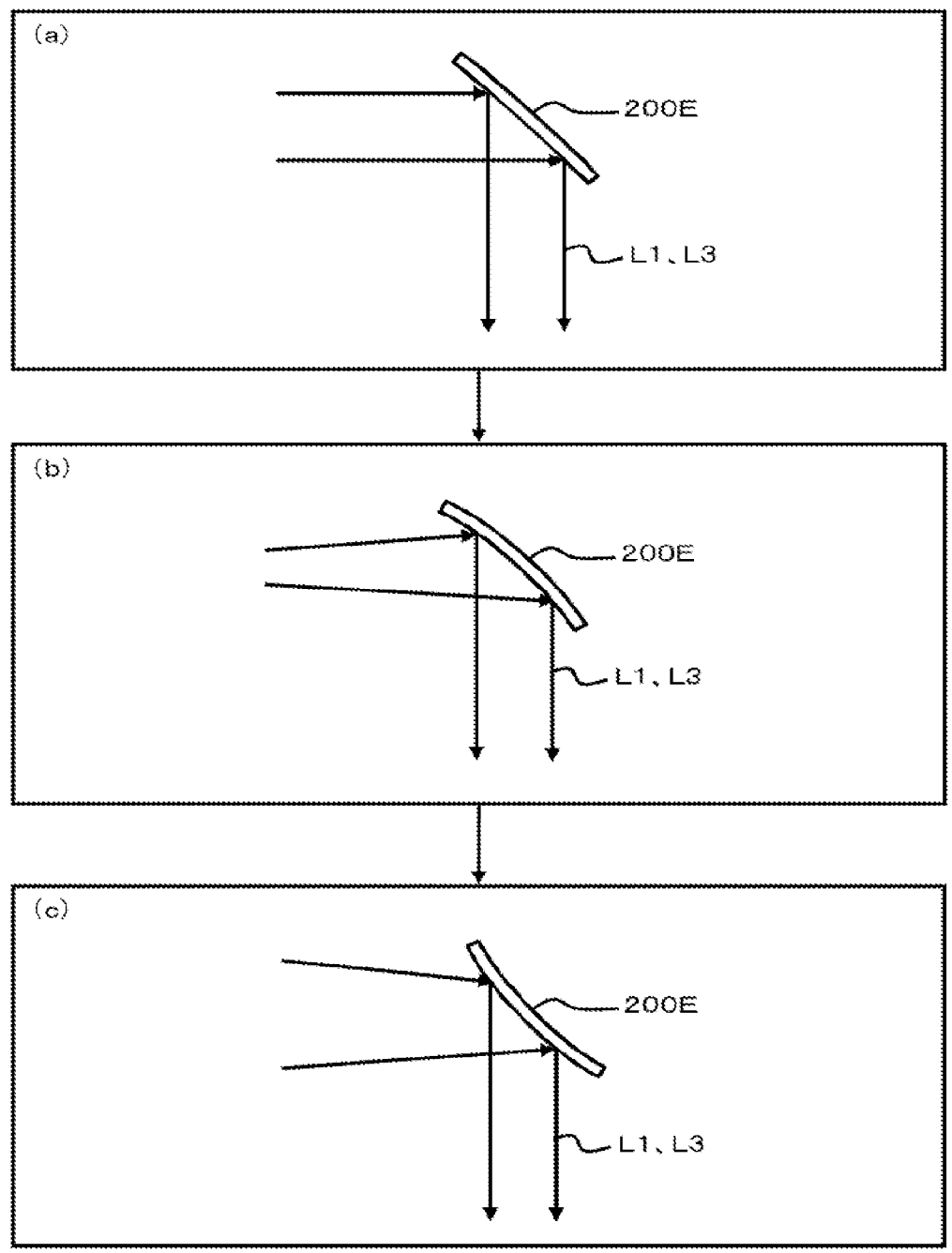
FIG. 25 is a block diagram showing a wave front curvature correction part in accordance with a tenth embodiment of the present invention.
Figure 26:
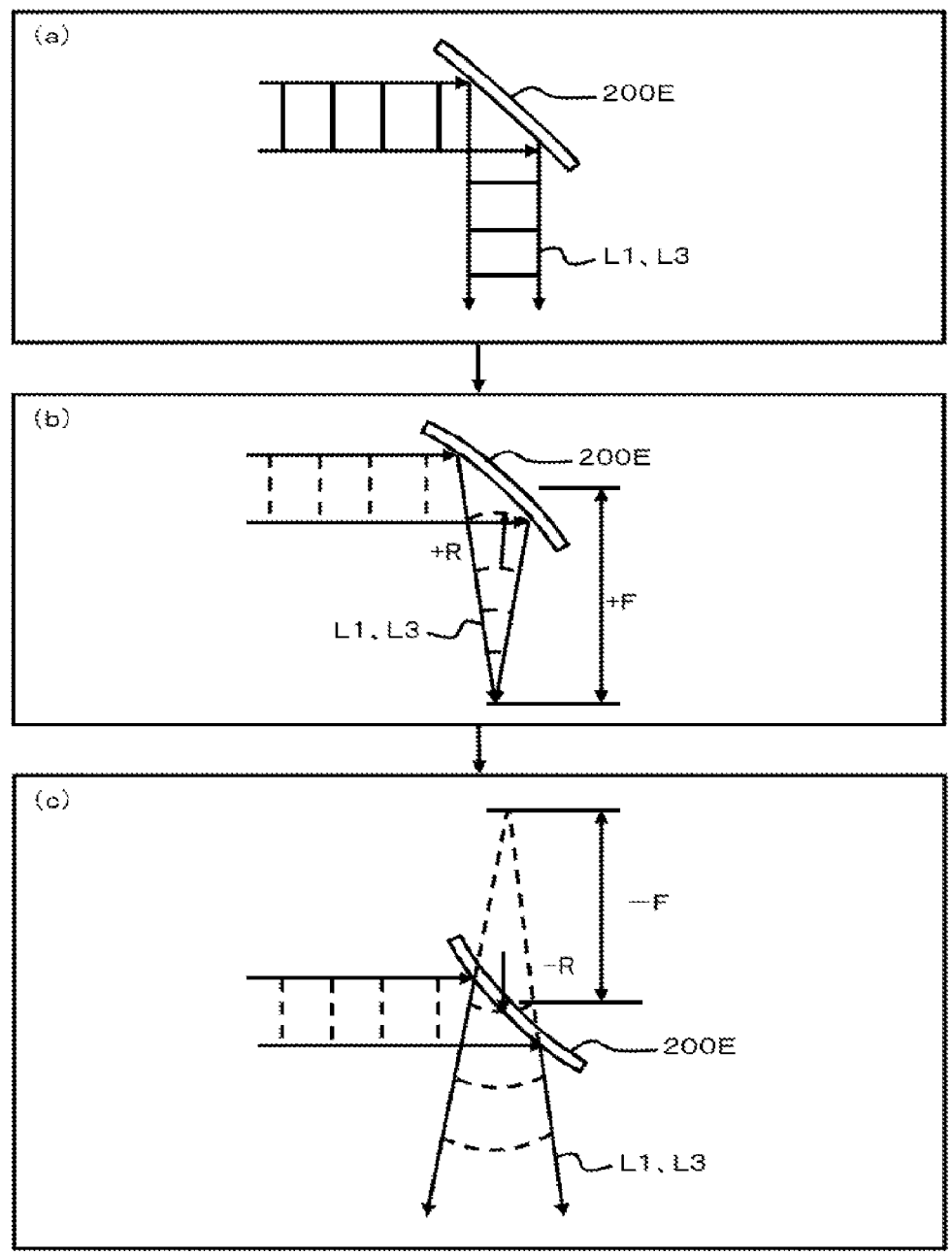
FIG. 26 is a block diagram that follows FIG. 25.

A tenth embodiment of the present invention will be described in the following with reference to FIGS. 25 and 26. The present embodiment uses a variable mirror in which a curvature of a reflecting face of the variable mirror can be controlled in a variable manner by a control signal that is transmitted from a wave front correction controller 60. In the present embodiment, such a variable mirror is referred to as a VRWM (Variable Radius Wave front Mirror).

The wave front curvature correction part 200E in accordance with the present embodiment is configured by the VRWM. FIGS. 25(a) and 26(a) show the case in which the laser beam L1 and the guide laser beam L3 that are incident as a plane wave (a parallel light) are emitted as a plane wave (a parallel light). In the case in which a plane wave is converted into a plane wave, a surface of the VRWM is controlled to be flat.

FIG. 25(b) shows the case in which the laser beam L1 and the guide laser beam L3 that have a convex wave front (a diverging light) are converted into a laser beam of a plane wave (a parallel light). In this case, a shape of the VRWM is controlled in such a manner that the VRWM has a concave face.

FIG. 25(c) shows the case in which the laser beam L1 and the guide laser beam L3 that have a concave wave front (a converging light) are converted into a laser beam of a plane wave (a parallel light). In this case, a shape of the VRWM is controlled in such a manner that the VRWM has a convex face.

FIG. 26(b) shows the case in which a plane wave is converted into a spherical wave of a concave wave front. To convert a plane wave into a spherical wave of a concave wave front, a surface of the VRWM is controlled to be in a toroidal form of a concave face (in the case in which an incident angle is approximately 45 degrees). By this configuration, a laser beam that has been reflected by the VRWM is focused into a focal distance F. A spherical wave immediately after being reflected the surface of the VRWM in a toroidal form is a spherical wave of a concave wave front having a curvature radius R. The focal distance F is equivalent to a curvature radius R of the spherical wave.

FIG. 26(c) shows the case in which a plane wave is converted into a spherical wave of a convex wave front. To convert a plane wave into a spherical wave of a convex wave front, a surface of the VRWM is controlled to be in a toroidal form of a convex face (in the case in which an incident angle is approximately 45 degrees). By this configuration, a convex face wave that has been reflected by the VRWM is a wave front that is emitted from a point light source of a position of a focal distance −F. A spherical wave immediately after being reflected the surface of the VRWM in a toroidal form is a spherical wave having a curvature radius −R. The focal distance −F is equivalent to a curvature radius −R of a wave front.

In the present embodiment that is configured as described above, since the wave front curvature correction part 200E can be configured by only the VRWM, the number of components can be reduced and the wave front curvature correction part 200E can be compactly formed. In addition, only one reflection enables a correction, thereby improving an efficiency of a correction.

Moreover, for the wave front curvature correction part 200E in accordance with the present embodiment, an optical axis of the laser beam L1 and the guide laser beam L3 that are incident can be varied at an angle of 45 degrees for an emission. Consequently, in the case in which the wave front curvature correction part 200E is used at the position in which a light path of the laser beam L1 and the guide laser beam L3 is varied at an angle of 45 degrees, a reflecting mirror 41 that reflects the beams at an angle of 45 degrees can be omitted. By this configuration, the structure of the present embodiment can be simplified and a production cost can be reduced.

Embodiment 11

Figure 27:
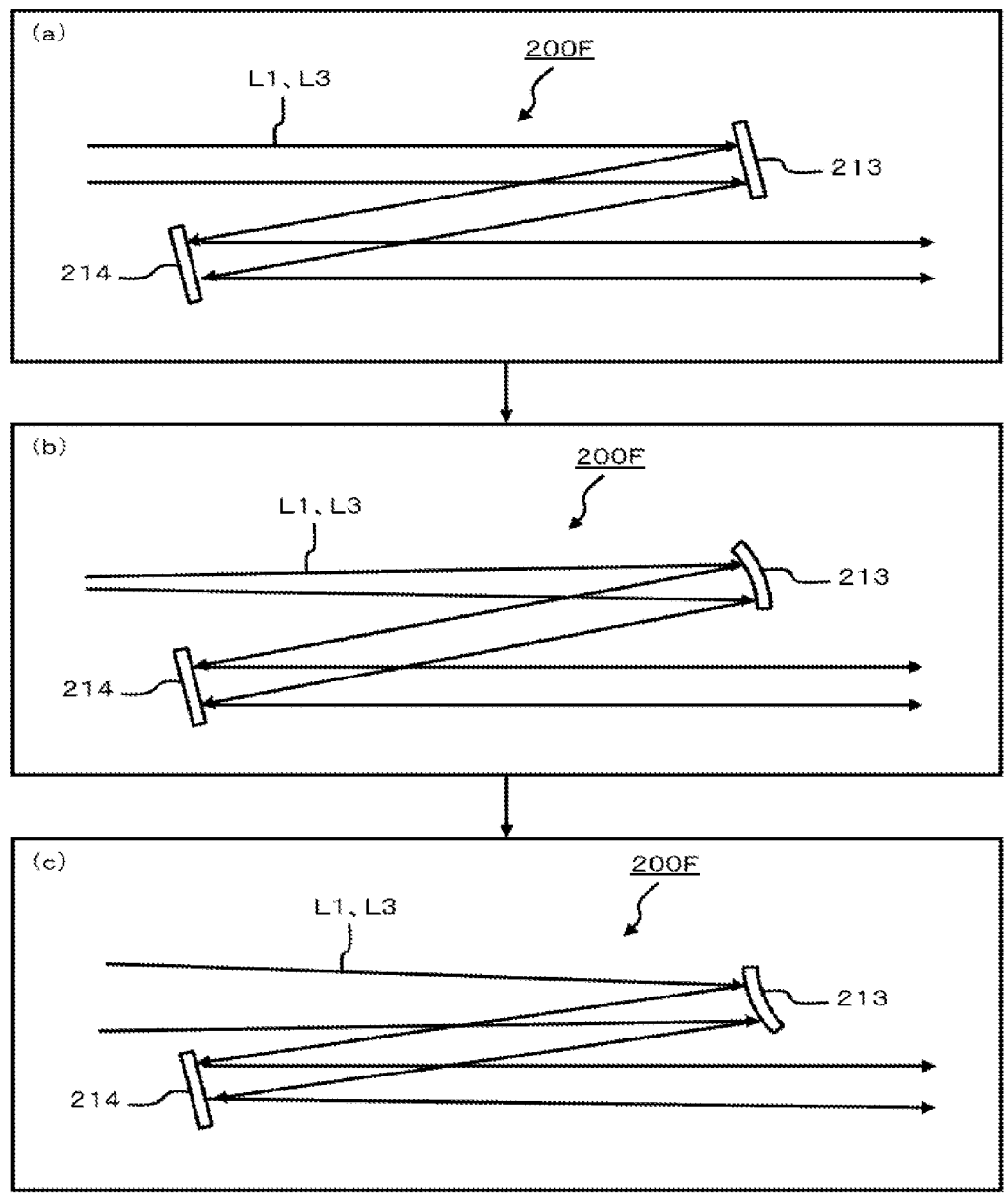
FIG. 27 is a block diagram showing a wave front curvature correction part in accordance with an eleventh embodiment of the present invention.

An eleventh embodiment of the present invention will be described in the following with reference to FIG. 27. In the present embodiment, the wave front curvature correction part 200F is configured by an arrangement of a VRWM 213 and a reflecting mirror 214 in a Z pattern.

As shown in FIG. 27(a), in the case in which the laser beam L1 and the guide laser beam L3 that are incident to the VRWM as a plane wave are emitted as a plane wave, a surface of the VRWM 213 is controlled to be in a flat shape. As shown in FIG. 27(b), in the case in which the laser beam L1 and the guide laser beam L3 that are incident to the VRWM as a convex face wave are converted into a plane wave, a shape of the VRWM 213 is specified to be in a spherical shape of a concave face. As shown in FIG. 27(c), in the case in which the laser beam L1 and the guide laser beam L3 that are incident to the VRWM as a concave face wave are converted into a plane wave, a shape of the VRWM 213 is specified to be in a spherical shape of a convex face.

The present embodiment that is configured as described above has an operation effect equivalent to that of the ninth embodiment. However, an incident optical axis and an outgoing optical axis of the laser beam L1 and the guide laser beam L3 are out of alignment in parallel from each other and are not corresponded to each other. Consequently, an optical system that makes an optical axis of an output light correspond to an optical axis of an input light can also be configured additionally.

Embodiment 12

A twelfth embodiment of the present invention will be described in the following with reference to FIG. 28. In the present embodiment, the wave front correction part 34A in which an angle correction part and a wave front curvature correction part can be used together with each other. The wave front correction part 34A is configured to be provided with by a VRWM 110 and a reflecting mirror 111.

FIG. 28(a) shows a case in which a heat load is less. The laser beam L1 and the guide laser beam L3 as a plane wave are incident to and reflected by the reflecting mirror 111 at an angle of 45 degrees, and are incident to the VRWM 110 at an incident angle of 45 degrees. The VRWM 110 is controlled to be in a flat shape. The laser beam L1 and the guide laser beam L3 are reflected by a flat mirror face of the VRWM 110, and are output in a state of a plane wave.

The present invention is not limited to the case in which an incident light of a plane wave is converted into an outgoing light of a plane wave. For instance, in such a manner that a laser beam that is input as a diverging light (a convex wave front) is output as the laser beam L1 and the guide laser beam L3 that are provided with a wave front of a desired curvature, a focal distance of the VRWM can be controlled to be a constant value.

Figure 28:
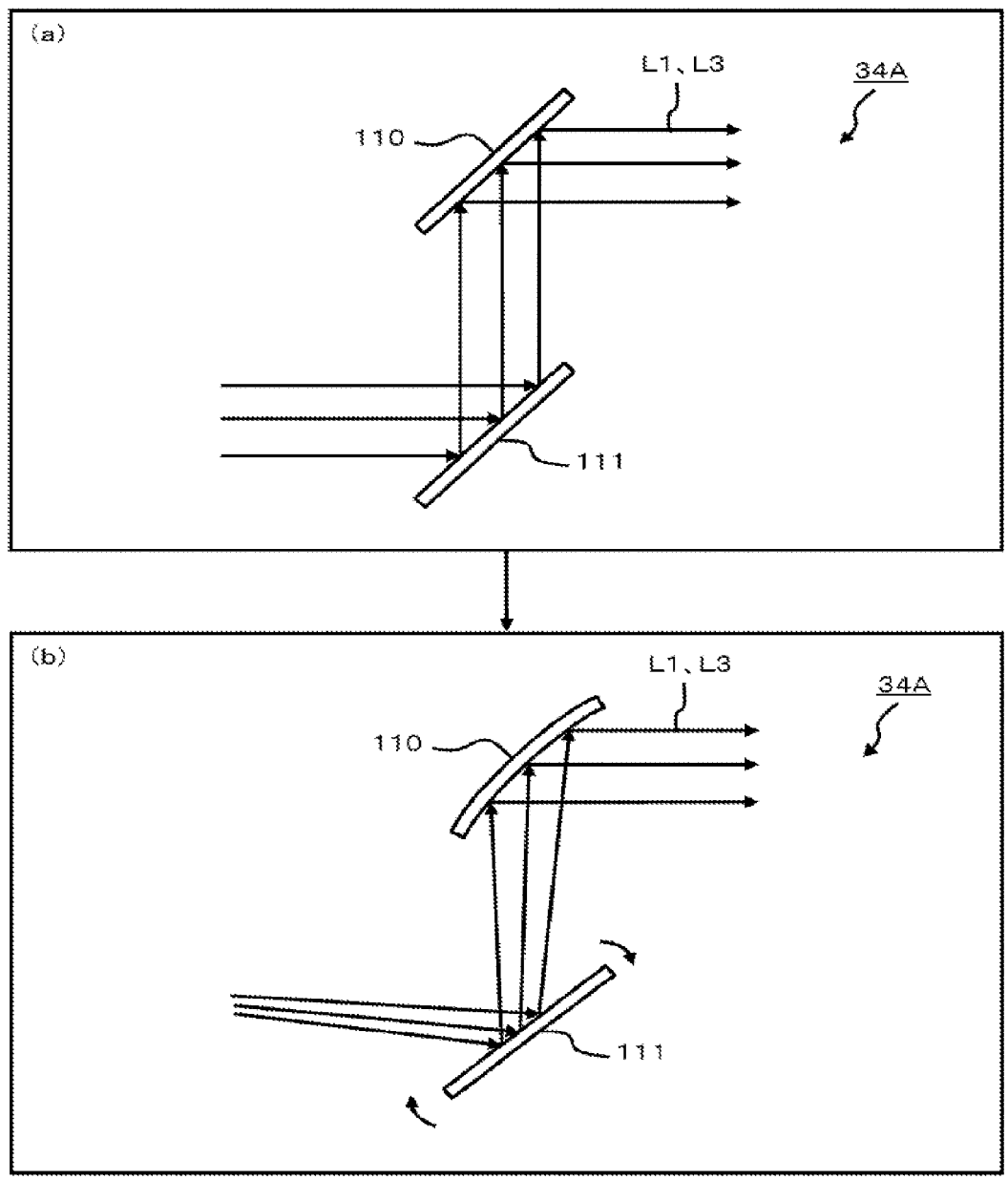
FIG. 28 is a block diagram showing a wave front correction part in accordance with a twelfth embodiment of the present invention.

FIG. 28(b) shows a case in which an angle (a direction) and a curvature of a wave front for the laser beam L1 and the guide laser beam L3 are varied. A direction of a wave front for the laser beam L1 and the guide laser beam L3 that are incident is tilted downward in FIG. 28 due to an influence of a heat load, and a wave front of the laser beam L1 and the guide laser beam L3 is varied to a diverging light (a convex wave front). In this case, an angle of the reflecting mirror 111 is controlled in such a manner that an optical axis of the laser beam L1 and the guide laser beam L3 that are reflected by the reflecting mirror 111 is corresponded to a standard optical axis.

The laser beam L1 and the guide laser beam L3 that are reflected by the reflecting mirror 111 are incident to the VRWM 110 at an incident angle of 45 degrees. In such a manner that the laser beam L1 and the guide laser beam L3 that are reflected by the VRWM 110 become a plane wave, a shape of the VRWM 110 is specified to be a concave face shape.

The case in which the laser beam L1 and the guide laser beam L3 as a convex face wave are converted into a plane wave has been described above. However, the present invention is not limited to the case. The laser beam L1 and the guide laser beam L3 as a concave face wave can also be converted into a plane wave, and an incident light as a convex face wave or a concave face wave can be converted into an outgoing light provided with a wave front of a desired curvature.

In the case of an incident angle within a permissible aberration, an optical axis of an outgoing light can be corresponded to a standard optical axis by controlling an angle of the two axes in a horizontal direction and in a vertical direction of the VRWM 110 (by controlling a tilt and a rolling) for instance.

Embodiment 13

A thirteenth embodiment of the present invention will be described in the following with reference to FIG. 29. In the present embodiment, the wave front correction part 34B in which an angle correction part and a wave front curvature correction part can be used together with each other is configured by an arrangement of a reflecting mirror 113 and a VRWM 112 in a Z pattern. An incident angle is 2.5 degrees.

Figure 29:
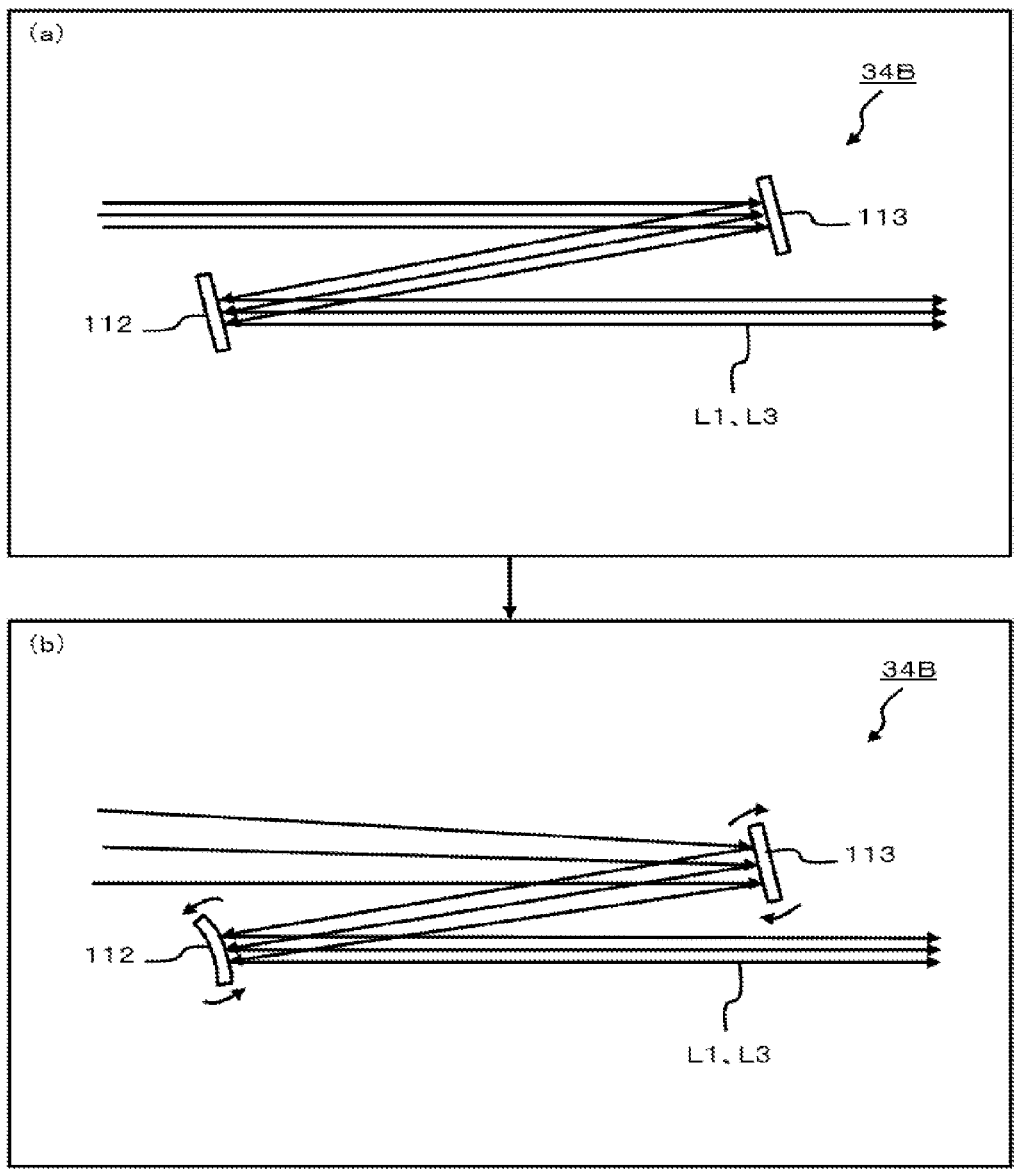
FIG. 29 is a block diagram showing a wave front correction part in accordance with a thirteenth embodiment of the present invention.

FIG. 29(*a*) shows a case in which a heat load is low. The laser beam L1 and the guide laser beam L3 as a plane wave are incident to and reflected by the reflecting mirror 113 at an incident angle of 2.5 degrees. The laser beam L1 and the guide laser beam L3 that have been reflected are incident to the VRWM 112 at an incident angle of 2.5 degrees. A shape of the VRWM 112 is controlled to be a flat shape. The laser beam L1 and the guide laser beam L3 are reflected in a state of a plane wave. Although the case of a plane wave has been described above, the present invention is not limited to the case. For instance, even in the case in which a convex face wave or a concave face wave is input, the convex face wave or the concave face can be output as the laser beam L1 and the guide laser beam L3 that is provided with a wave front of a predetermined curvature by varying a shape of the VRWM 112.

FIG. 29(*b*) shows a case in which a heat load is high. The following describes the case in which an angle of the laser beam L1 and the guide laser beam L3 that are incident is tilted downward in FIG. 29 and a wave front of the laser beam L1 and the guide laser beam L3 becomes a concave face. In this case, an angle of the reflecting mirror 113 is changed in such a manner that an optical axis of the laser beam L1 and the guide laser beam L3 that are reflected by the reflecting mirror 113 is corresponded to a standard optical axis (an optical axis shown in FIG. 29(*a*)).

The laser beam L1 and the guide laser beam L3 that have been reflected by the reflecting mirror 113 are incident to the VRWM 112 at an incident angle of 2.5 degrees. In such a manner that the laser beam L1 and the guide laser beam L3 that are reflected by the VRWM 112 become a plane wave, a shape of the VRWM 112 is changed to be a convex face shape and an angle thereof is adjusted. The present invention is not limited to the case of a conversion into a plane wave. A concave face and a convex face wave can also be converted into a wave front of desired curvature. This can be applied to the embodiments that will be described in the following.

Embodiment 14

A fourteenth embodiment of the present invention will be described in the following with reference to FIG. 30. In the present embodiment, the wave front correction part 34C in which an angle correction part and a wave front curvature correction part can be used together with each other is configured by using a deformable mirror 120 and a reflecting mirror 121.

Figure 30:
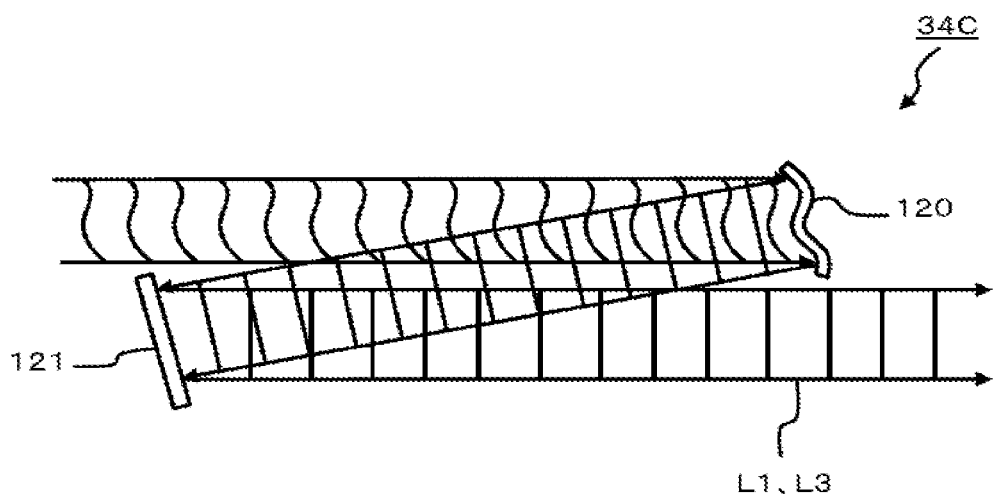
FIG. 30 is a block diagram showing a wave front correction part in accordance with a fourteenth embodiment of the present invention.

As shown in FIG. 30, the deformable mirror 120 and the reflecting mirror 121 are arranged in a Z pattern. A shape of a reflecting face of the deformable mirror 120 can be controlled in a variable manner according to a control signal that is transmitted from a wave front correction controller 60.

In the case in which a laser beam of a distorted wave front is incident to the deformable mirror 120, a shape of a reflecting face of the deformable mirror 120 is adjusted in accordance with the incident wave front. The deformable mirror 120 corrects a wave front of the incident laser beam L1 and the incident guide laser beam L3 to be a plane wave, and reflects the laser beam L1 and the guide laser beam L3. The laser beam L1 and the guide laser beam L3 that have been corrected to be a plane wave are reflected by the reflecting mirror 121 to be output.

By using the deformable mirror 120, a wave front that is not a spherical wave, such as a wave front in an S shape, can also be converted into a plane wave or a desired spherical wave. Moreover, a direction of the laser beam L1 and the guide laser beam L3 can also be corrected for a small angle. Furthermore, by controlling a tilt and a rolling for the reflecting mirror 121 and the deformable mirror 120, a direction of the laser beam L1 and the guide laser beam L3 can also be adjusted. This can be applied to an embodiment 15 that will be described in the following.

Embodiment 15

Figure 31:
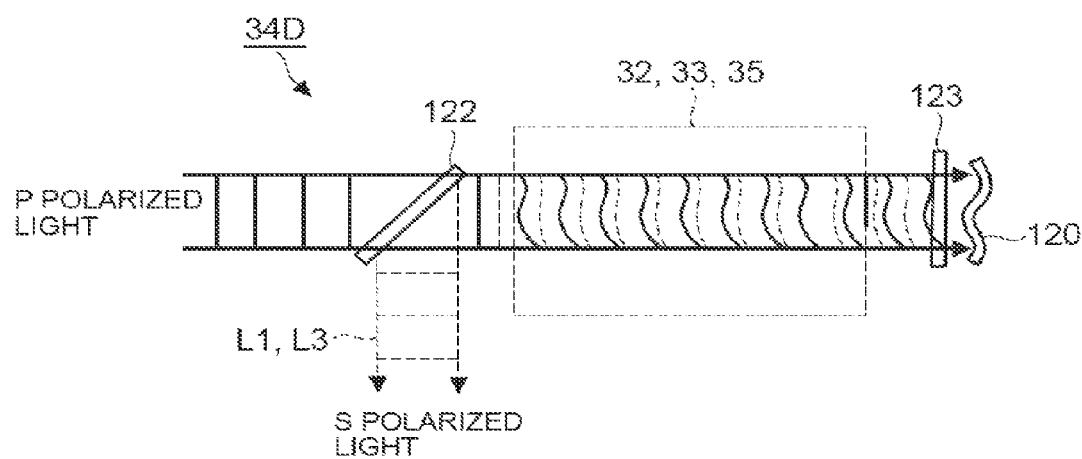
FIG. 31 is a block diagram showing a wave front correction part in accordance with a fifteenth embodiment of the present invention.

A fifteenth embodiment of the present invention will be described in the following with reference to FIG. 31. In the present embodiment, the wave front correction part 34D is configured by coupling a deformable mirror 120 with a polarization control. The wave front correction part 34D is configured to be provided with a deformable mirror 120, a beam splitter 122, and a λ/4 substrate 123 that shifts a phase by 90 degrees to the both wavelengths of the laser beam L1 and the guide laser beam L3. The wave front variation generating parts 32, 33, and 35 can be disposed between the beam splitter 122 and the λ/4 substrate 123.

For instance, a laser beam of a P polarized light (a wave front of polarization including a plane of the paper) is incident to the beam splitter 122 on which a coating that separates a P polarized light and an S polarized light to the both wavelengths of the laser beam L1 and the guide laser beam L3 has been formed. A wave front of the laser beam L1 and the guide laser beam L3 is input to the beam splitter 122 in a state of a plane wave. However, a wave front of the laser beam L1 and the guide laser beam L3 is distorted in an S shape since the laser beam L1 and the guide laser beam L3 pass through the wave front variation generating parts 32, 33, and 35 from the beam splitter 122.

The laser beam L1 and the guide laser beam L3 that have passed through the wave front variation generating parts 32, 33, and 35 are transmitted to the λ/4 substrate 123 to be a circularly polarized light. The wave front that has been distorted in an S shape is corrected to a predetermined wave front by the deformable mirror 120 that has been adjusted to be in a suitable shape.

The laser beam L1 and the guide laser beam L3 in which the wave front thereof has been corrected are transmitted to the λ/4 substrate 123 again to be converted into an S polarized light. The laser beam L1 and the guide laser beam L3 of an S polarized light are transmitted to the wave front variation generating parts 32, 33, and 35 to be converted from a predetermined wave front into a plane wave. The laser beam L1 and the guide laser beam L3 that have been converted into a plane wave are incident to the beam splitter 122.

The laser beam L1 and the guide laser beam L3 of an S polarized light are reflected by the beam splitter 122 to be output as a plane wave. By adjusting a shape of a surface of the deformable mirror 120, the laser beam L1 and the guide laser beam L3 can be output in a shape of a wave front other than a plane wave.

Embodiment 16

Figure 32:
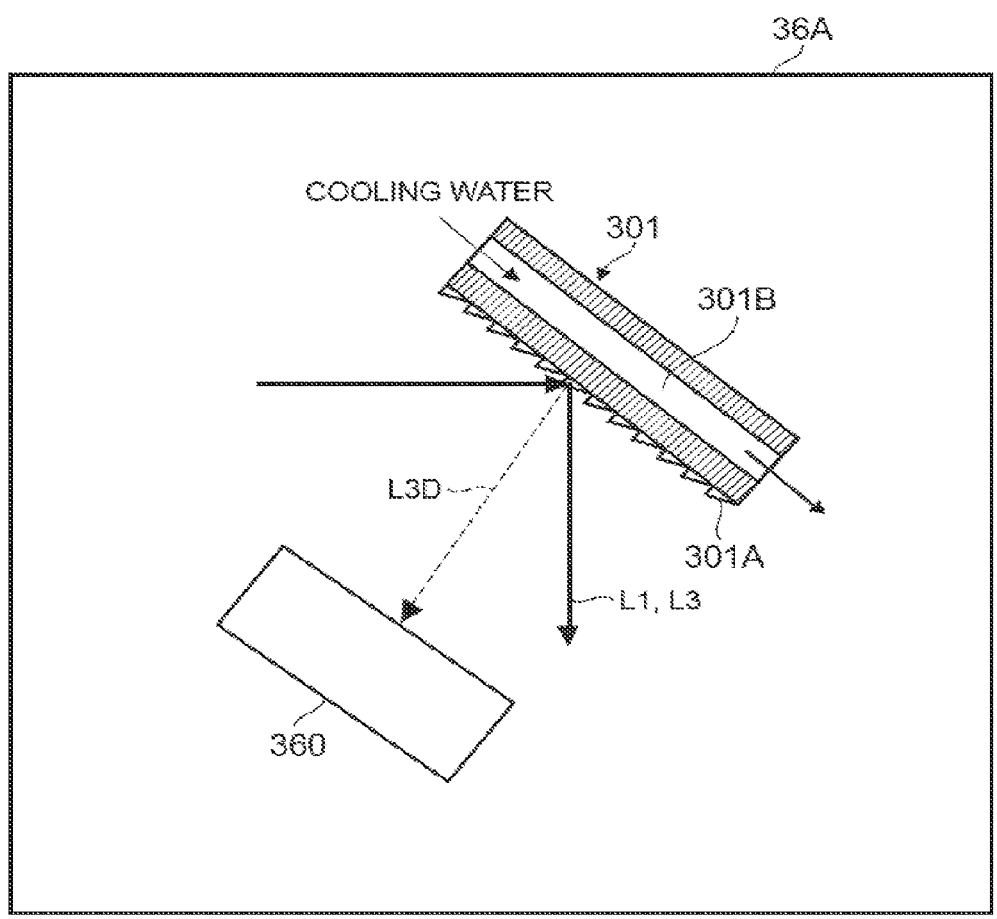
FIG. 32 is a block diagram showing a sensor in accordance with a sixteenth embodiment of the present invention.

A sixteenth embodiment of the present invention will be described in the following with reference to FIG. 32. In the present embodiment, a sensor 36A is configured by using a diffraction type mirror 301. A grating 301A is formed on the surface of the diffraction type mirror 301. Moreover, the diffraction type mirror 301 is provided with a cooling water flow path 301B in which a cooling water flows.

The diffraction type mirror 301 reflects an incident laser beam at an angle of 45 degrees. The reflecting light is a zero order light and has the highest intensity. The zero order light can highly reflect the laser beam L1 and the guide laser beam L3. A –(minus) 1st order light that is obtained by a diffraction of the guide laser beam L3 has a low intensity. An optical sensor part 360 receives the –(minus) 1st order light and measures the characteristics of the laser beam. Although the guide laser beam L3–(minus) 1st order light is a sample light in the present embodiment, lights of other orders other than a 0th order light can also be detected.

Embodiment 17

Figure 33:
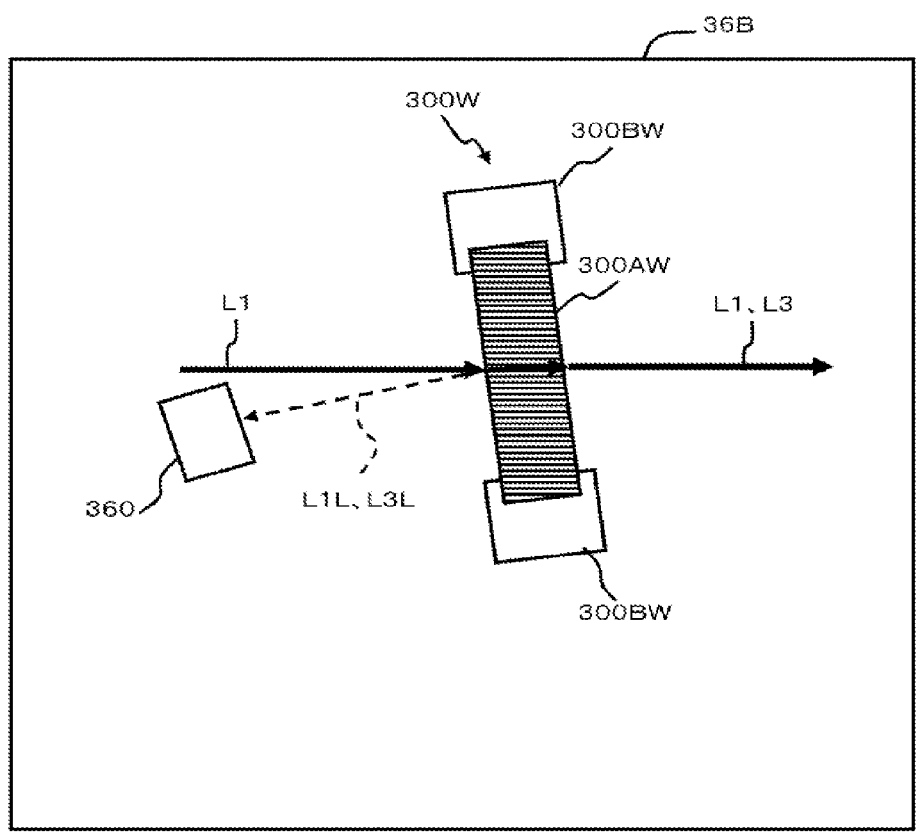
FIG. 33 is a block diagram showing a sensor in accordance with a seventeenth embodiment of the present invention.

A seventeenth embodiment of the present invention will be described in the following with reference to FIG. 33. In the present embodiment, a sensor 36B is configured by using a window 300W. The window 300W is configured to be provided with a window substrate 300AW and a holder 300BW that holds the window substrate 300AW. The holder 300BW is configured to be provided with a cooling water jacket, which is not shown.

The window 300W is disposed in a tilted state to a certain degree on an optical axis of a driver pulse laser. A slight laser beam L1 and a slight guide laser beam L3 that have been reflected by the surface of the window 300W are incident to the optical sensor part 360 as a sample light.

As the window 300W, a window of the amplifiers 32 and 35 and the window 13 of the EUV chamber 10 can also be used for instance. In this case, it is not necessary to dispose a window only for obtaining a sample light for a measurement, thereby reducing a production cost. The window substrate 300AW is made of a material, such as a diamond, having an excellent thermal conductivity for transmitting a CO2 laser beam.

For the parallel plane window 300W, a laser beam is reflected slightly on both of the surface and the rear face, and is incident to the optical sensor part 360 as a sample light. Consequently, the laser beam is not suitable for a measurement of a beam profile. However, a sample light can be focused into a focus position by using a light focusing lens, and a position of a focal image can be measured, whereby a direction of a laser beam can be measured. Moreover, in the case in which the driver pulsed laser beam L1L is measured, a duty of a beam line and a power for the laser can also be measured without inconvenience.

Embodiment 18

Figure 34:
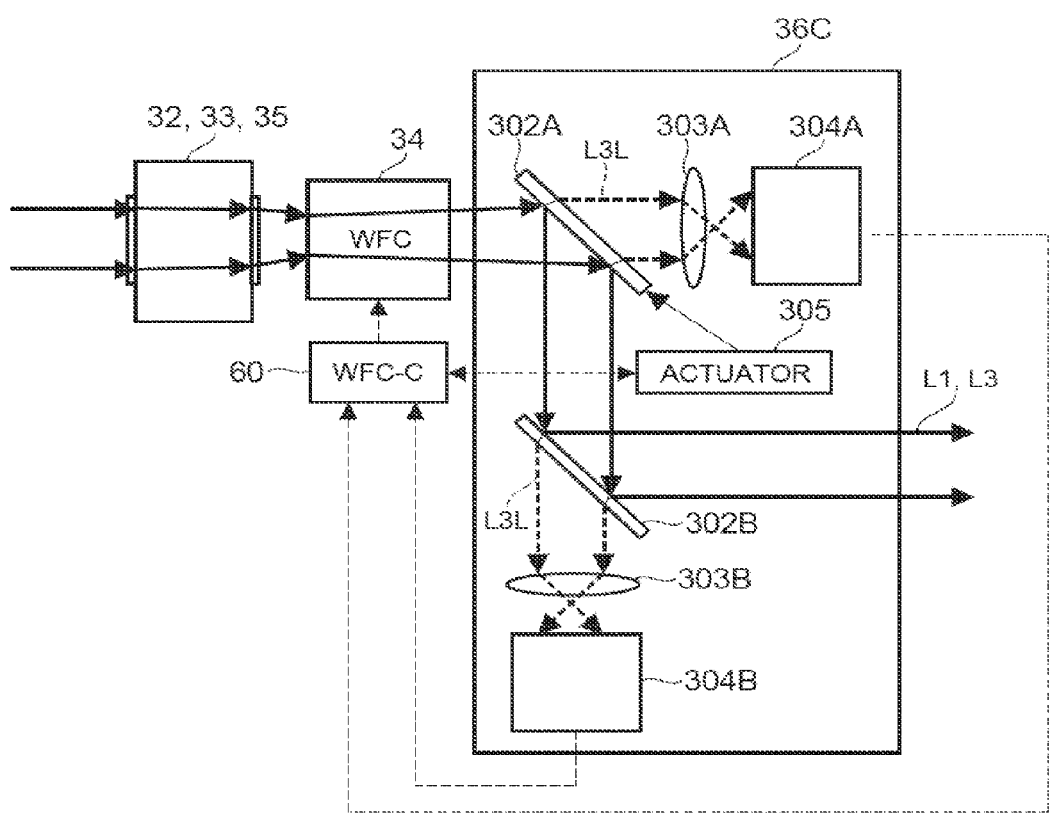
FIG. 34 is a block diagram showing a sensor in accordance with an eighteenth embodiment of the present invention.

An eighteenth embodiment of the present invention will be described in the following with reference to FIG. 34. In the present embodiment, a sensor 36C is configured by using the beam profilers 304A and 304B. The beam profiler 304A detects a transmitted light of a reflecting mirror 302A, and the beam profiler 304B detects a transmitted light of a reflecting mirror 302B. An angle of the reflecting mirror 302A is adjusted according to a measured result of the beam profiler.

A lens 303A is disposed between the rear face side of the reflecting mirror 302A and the beam profiler 304A. Similarly, a lens 303B is disposed between the rear face side of the reflecting mirror 302B and the beam profiler 304B.

In the case in which the laser beam L1 and the guide laser beam L3 of a plane wave is transmitted to a relay optical system 31 and the wave front variation generating parts 32, 33, and 35, a direction of the laser beam and a curvature of a wave front are varied. The laser beam L1 and the guide laser beam L3 in which a direction of the laser beams and a curvature of a wave front have been varied are incident to the wave front correction part 34. The wave front correction part 34 corrects a curvature of a wave front and a direction of the laser beam L1 and the guide laser beam L3, and outputs the laser beam L1 and the guide laser beam L3.

The laser beam L1 and the guide laser beam L3 that have been corrected by the wave front correction part 34 are reflected by the reflecting mirror 302A and are incident to the reflecting mirror 302B. On the other hand, a sample light L3L that is slightly transmitted to the reflecting mirror 302A is transcribed on a two-dimensional sensor that is included in the beam profiler 304A by a transcription lens 303A. A beam shape and a position of the guide laser beam L3 are measured by the two-dimensional sensor.

The data that has been measured by the beam profiler 304A is input to the wave front correction controller 60. The wave front correction controller 60 transmits a control signal to the wave front correction part 34 to control the wave front correction part 34 in such a manner that a position of the guide laser beam is set to be a standard position.

On the other hand, the guide laser beam L3L that has been slightly transmitted to the reflecting mirror 302B is transcribed on a two-dimensional sensor that is included in the beam profiler 304B by a transcription lens 303B. A beam shape and a position of the guide laser beam L3L are measured by the two-dimensional sensor.

The data that has been measured by the beam profiler 304B is input to the wave front correction controller 60. The wave front correction controller 60 transmits a control signal to an actuator 305 that adjusts an angle of the reflecting mirror 302A to control an angle of the reflecting mirror 302A in such a manner that a position of the guide laser beam that is measure by the beam profiler 304B is set to be a standard position. Moreover, the wave front correction controller 60 transmits a control signal to the wave front correction part 34 to control a curvature of a wave front of the guide laser beam in such a manner that a beam shape of the guide laser beam is set to be in a predetermined value.

In the present embodiment that is configured as described above, the beam profilers 304A and 304B are disposed on a side in which a guide laser is transmitted to the reflecting mirrors 302A and 302B (on a rear side of the reflecting mirror), whereby the sensor 36C can be compactly configured. Moreover, by an optical system for a measurement as shown in FIG. 34, a feedback control for a wave front of the guide laser beam are carried out and a wave front of the driver pulsed laser beam is controlled simultaneously, whereby a desired wave front and a desired direction of the driver pulsed laser beam can be stabilized.

Embodiment 19

Figure 35:
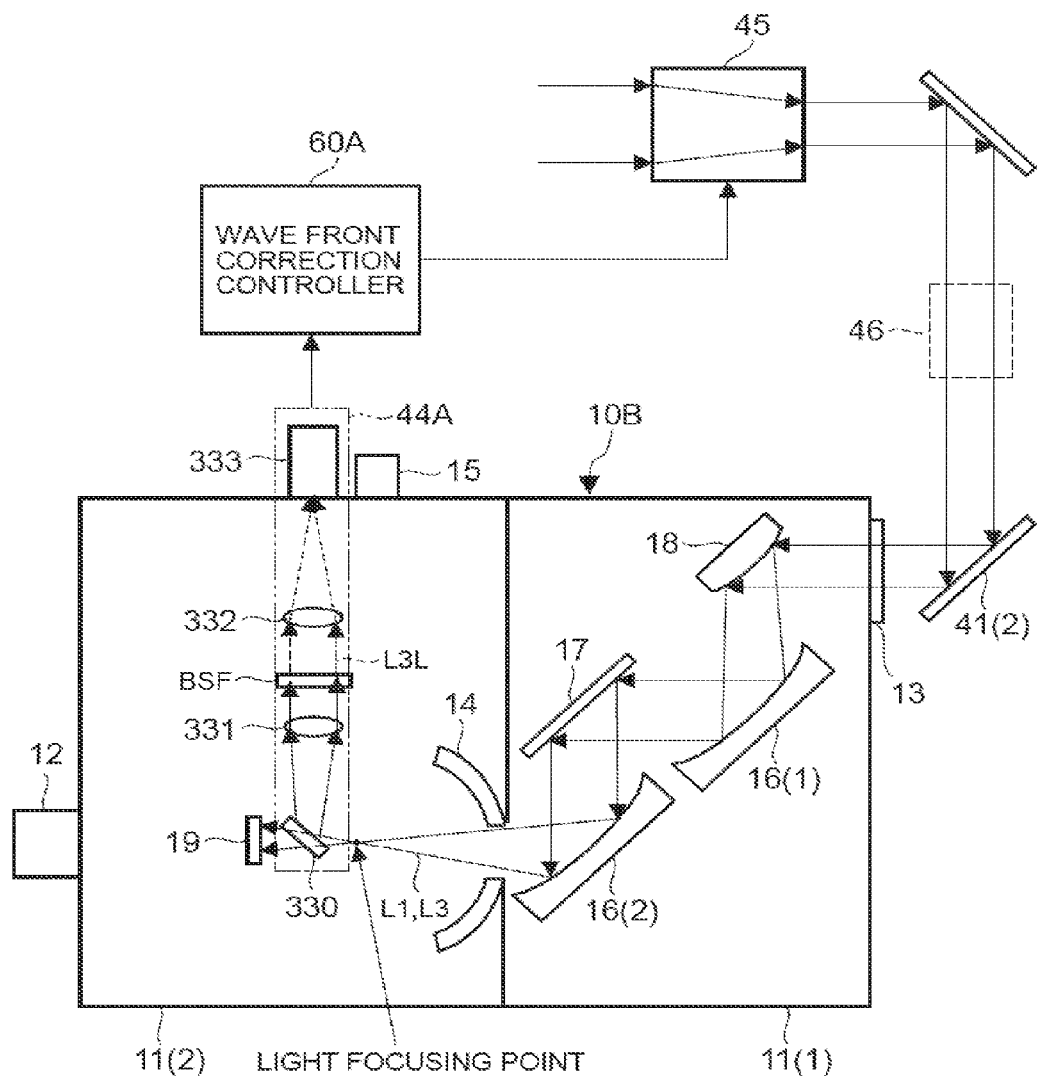
FIG. 35 is a block diagram showing a substantial part of a chamber in accordance with a nineteenth embodiment of the present invention.

A nineteenth embodiment of the present invention will be described in the following with reference to FIG. 35. In the present embodiment, an actual focused image of the driver pulsed laser beam in the EUV chamber 10B is measured to control the wave front correction part 45.

An EUV light emission region 11 (2) of the EUV chamber 10B is provided with a sensor 44A. The sensor 44A is configured to be provided with, for example, a beam splitter 330, the transcription lenses 331 and 332, and an imaging part 333. The imaging part 333 is configured to be provided with, for example, an element such as a normal semiconductor CCD (Charge Coupled Device) that has a sensitivity to the guide laser beam. As a result, the EUV light emission region 11 (2) can be formed at a lower price as compared with an infrared CCD and can be easily handled advantageously.

The beam splitter 330 reflects a part of the driver pulsed laser beam that is focused into a predetermined position toward the transcription lenses 331 and 332. The other part of the driver pulsed laser beam is absorbed into a dumper 19 and is converted into a heat.

The wave front correction controller 60A transmits a control signal to the wave front correction part 45 to control the wave front correction part 45 in such a manner that a shape and a position of the laser beam that has been focused into the chamber 10B are set to be a predetermined shape and a predetermined position.

It is not necessary to correct a wave front of the driver pulsed laser beam by only the wave front correction part 45. A wave front of the driver pulsed laser beam can also be corrected by adjusting a position and an orientation of each of the mirrors 16 (1), 16 (2), 17, and 18 in a light focusing region 11 (1).

In the present embodiment that is configured as described above, a final light focusing result of the guide laser beam is measured, and a wave front of the driver pulsed laser beam having a beam almost equivalent to that of the guide laser beam is controlled, whereby a light focusing characteristic can be stabilized with a high degree of accuracy.

Embodiment 20

Figure 36:
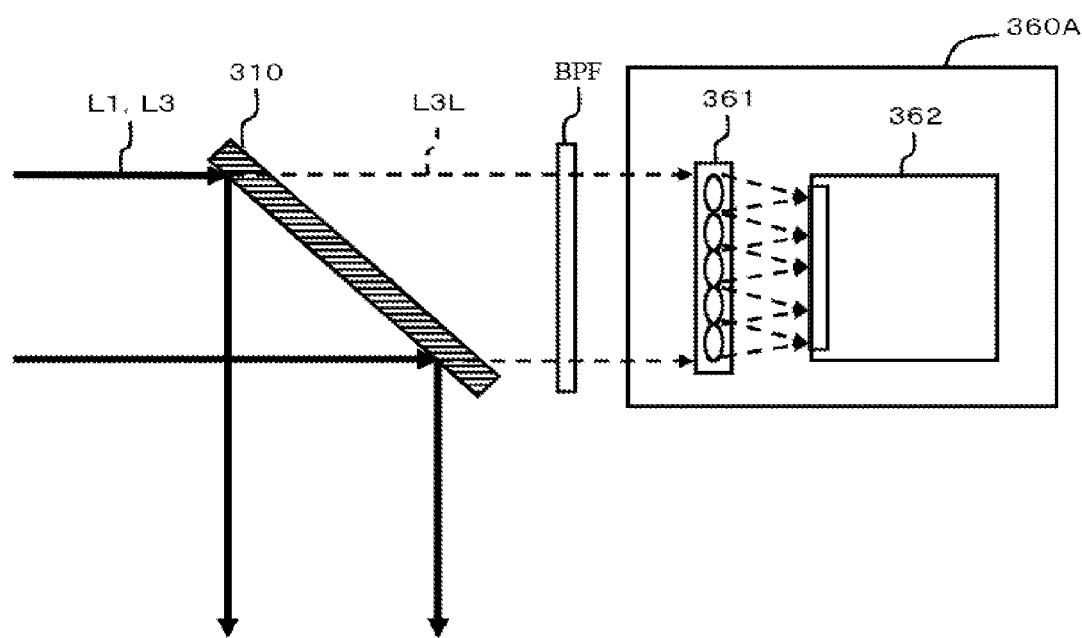
FIG. 36 is a block diagram showing an optical sensor part in accordance with a twentieth embodiment of the present invention.

A twentieth embodiment of the present invention will be described in the following with reference to FIG. 36. In the present embodiment, a Shack-Hartmann sensor is used as an optical sensor part 360A. The Shack-Hartmann sensor 360A is configured to be provided with, for example, a microlens array 361 composed of a large number of microlenses and an imaging element 362 such as a normal semiconductor CCD that has a sensitivity to the guide laser beam. A band-pass filter BPF that makes a guide laser beam to be transmitted is disposed on the incident side of the Shack-Hartmann sensor 360A.

The most part of the guide laser beam L3 is reflected by a reflecting mirror 310. The reflecting mirror 310 is configured to reflect the driver pulsed laser beam at a high degree of reflection and to partially reflect the guide laser beam. A laser beam L3L that is slightly transmitted to the reflecting mirror 310 is incident to the microlens array 361 via the band-pass filter BPF. An image of a light focusing point of each microlens is measured by the imaging part 362. A wave front of the laser beam can be measured by analyzing a position of a light focusing point of each microlens.

In the present embodiment that is configured as described above, a distortion of a wave front and an angle (a direction) for the guide laser beam can be simultaneously measured. As substitute for the microlens array, an array such as a pinhole array and a Fresnel lens array can also be used.

Embodiment 21

Figure 37:
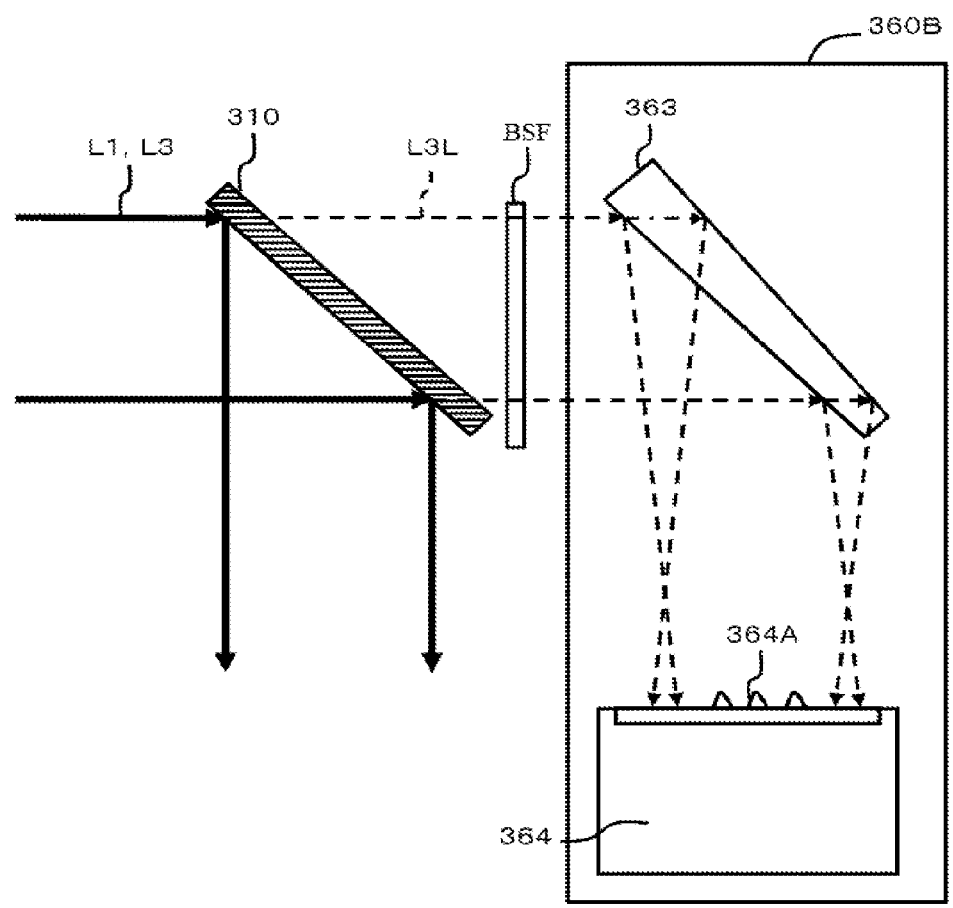
FIG. 37 is a block diagram showing an optical sensor part in accordance with a twenty-first embodiment of the present invention.

A twenty-first embodiment of the present invention will be described in the following with reference to FIG. 37. In the present embodiment, the characteristics of a laser beam is measured based on an interference fringe that is obtained by a wedge substrate 363. An optical sensor part 360B is configured to be provided with the wedge substrate 363 and a normal semiconductor CCD 364 that has a sensitivity to the guide laser beam. A band-pass filter BPF that makes a guide laser beam to be transmitted is disposed on the incident side of the optical sensor part 360B. The wedge substrate 363 makes a carbon dioxide laser to be transmitted.

The most part of the guide laser beam L3 is reflected by a reflecting mirror 310. A guide laser beam L3L that is slightly transmitted to the reflecting mirror 310 is incident to the wedge substrate 363, and is reflected on both of the surface and the rear face of the wedge substrate 363.

By superimposing the guide laser beams that have been reflected on both of the surface and the rear face of the wedge substrate 363 at a predetermined angle, an interference fringe is generated. An interference fringe that is obtained by the wedge substrate 363 is detected by a normal semiconductor CCD 364 that has a sensitivity to the guide laser beam. A variation of a curvature of a wave front of the guide laser beam can be detected based on a degree of a curve of an interference fringe. Moreover, a direction of the guide laser beam can be detected based on a direction of a flow of an interference fringe.

Embodiment 22

Figure 38:
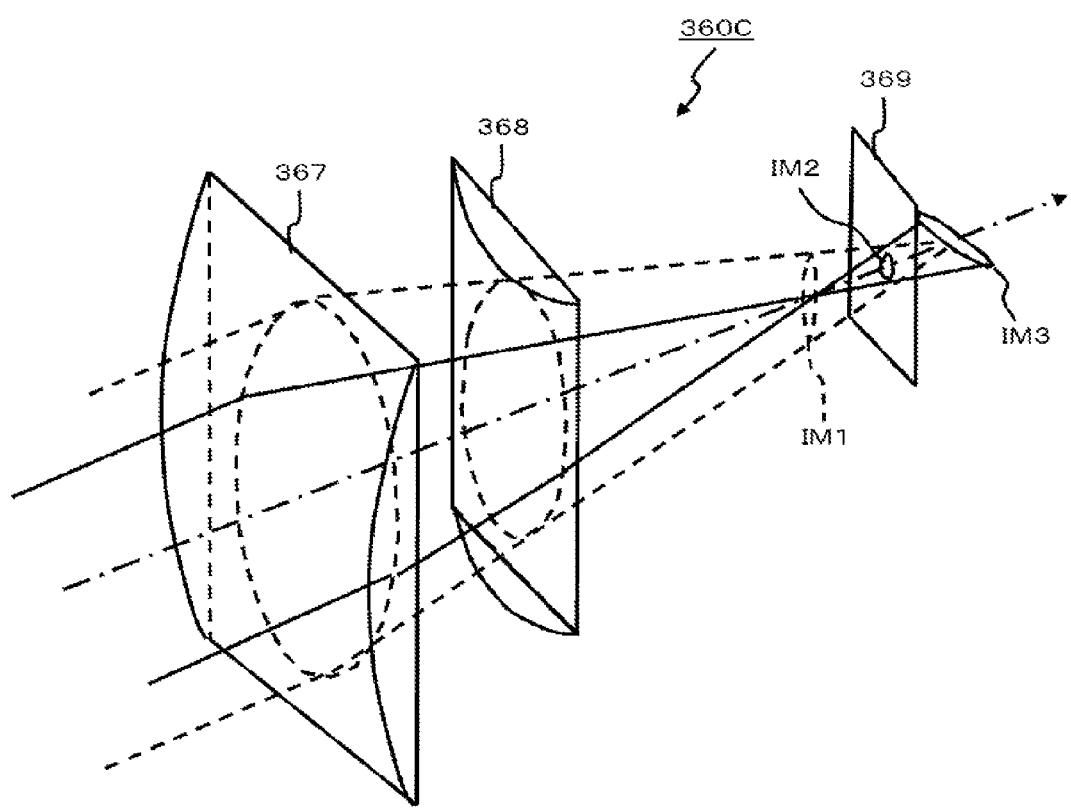
FIG. 38 is a block diagram showing an optical sensor part in accordance with a twenty-second embodiment of the present invention.

A twenty-second embodiment of the present invention will be described in the following with reference to FIGS. 38 to 40. In the present embodiment, an optical sensor part 360C is configured to be provided with a cylindrical lens 367 of a cylindrical concave face, a cylindrical lens 368 of a cylindrical concave face, and a quartering type light receiving element 369 in order to detect a wave front of the guide laser beam L3L. The bus lines of the both cylindrical lenses are disposed in such a manner that the bus lines are crossed at a right angle. A definition of a bus line will be described later.

Figure 39:
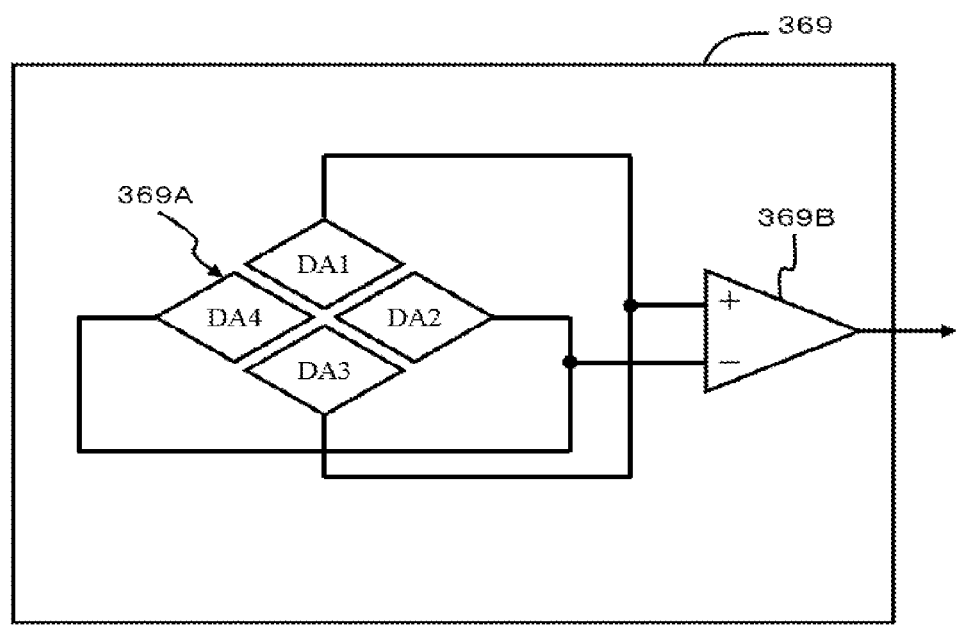
FIG. 39 is a block diagram showing a light receiving element.

As shown in FIG. 39, a light receiving face of the light receiving element 369 is divided into four regions DA1 to DA4 in a rhomboidal shape. A vertical output of the light receiving faces DA1 and DA3 and a horizontal output of the light receiving faces DA2 and DA4 that are disposed in a pattern orthogonal with the light receiving faces DA1 and DA3 are compared with each other by an operational amplifier 369B to be output.

Figure 40:
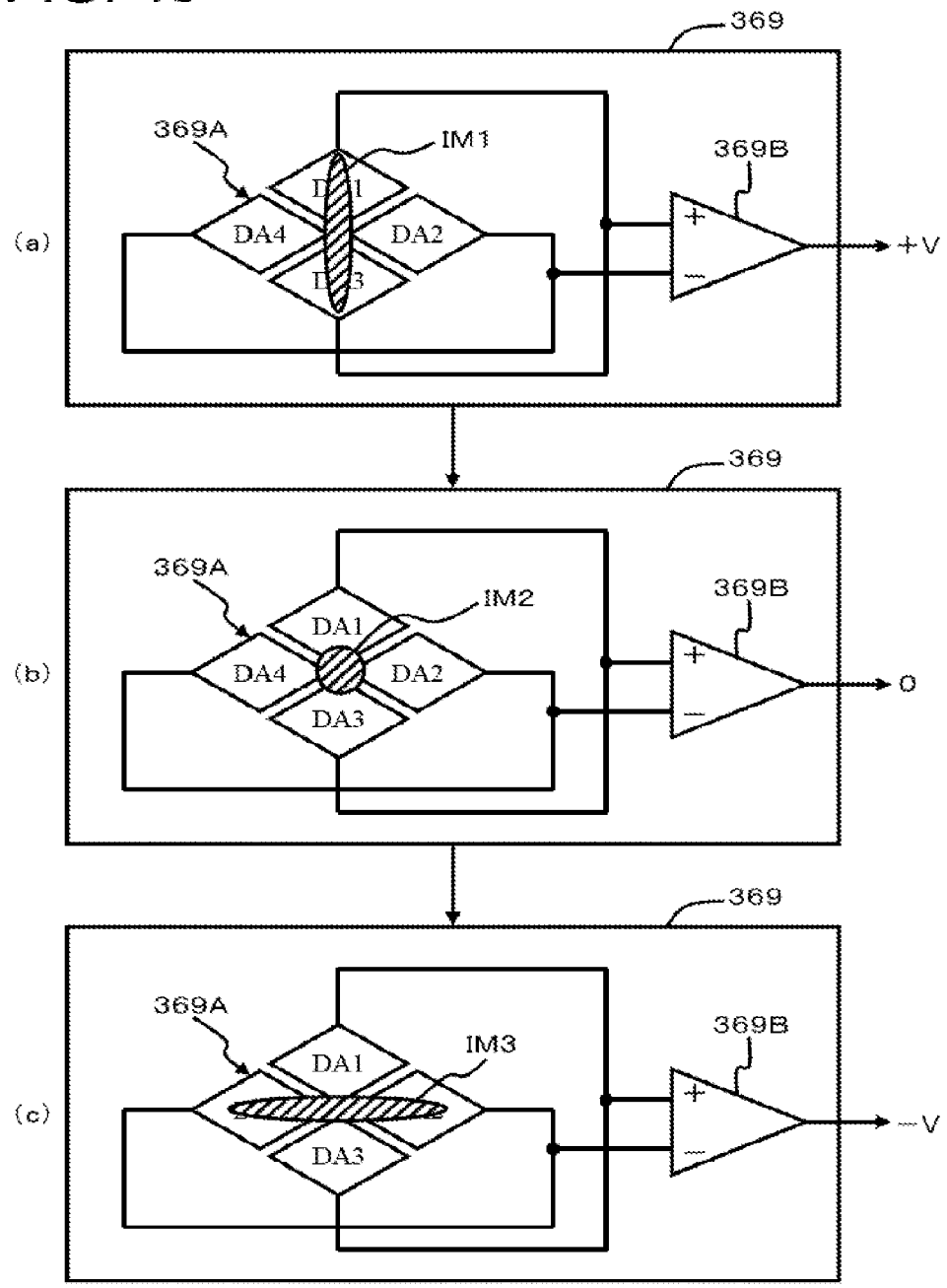
FIG. 40 is an explanatory diagram showing a relationship between a beam shape of a laser beam and an output power of a light receiving element.

As shown in FIG. 40($a$), in the case in which a guide laser beam of a concave face wave is transmitted to the lenses 367 and 368, the guide laser beam as a beam that is long in a vertical direction is incident to the light receiving element 369. The light receiving element 369 outputs a positive voltage.

As shown in FIG. 40($c$), in the case in which a guide laser beam of a convex face wave is transmitted to the lenses 367 and 368, the guide laser beam as a beam that is long in a horizontal direction is incident to the light receiving element 369. The light receiving element 369 outputs a negative voltage.

On the other hand, as shown in FIG. 40($b$), in the case in which a guide laser beam of a plane wave is transmitted to the lenses 367 and 368, the guide laser beam in a generally circular shape is incident to the light receiving element 369. An output of the light receiving element 369 is 0. As substitute for the light receiving element 369, a two-dimensional sensor can also be used.

Embodiment 23

Figure 41:
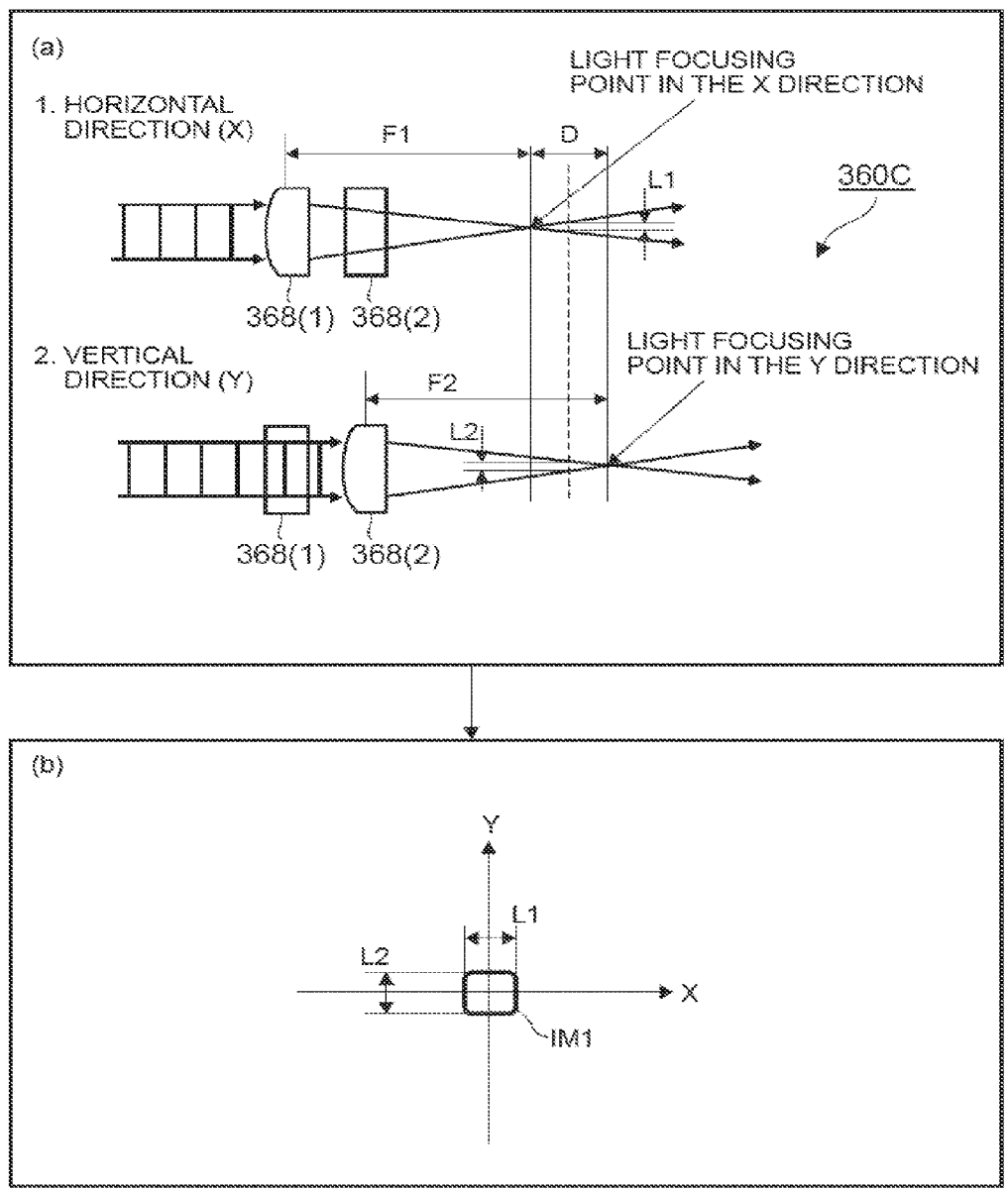
FIG. 41 is a block diagram showing an optical sensor part in accordance with a twenty-third embodiment of the present invention.

A twenty-third embodiment of the present invention will be described in the following with reference to FIGS. 41 to 43. For an optical sensor part 360C in accordance with the present embodiment, two cylindrical lenses 368 (1) and 368 (2) that have a focal distance of the equivalent length are disposed on the optical axis of the guide laser beam in such a manner that the bus lines of the cylindrical lenses are crossed at a right angle. The bus line of the cylindrical lens is a line that connects apexes of a concave face. Each of the two cylindrical lenses 368 (1) and 368 (2) is configured as a cylindrical lens of a cylindrical concave face.

A light receiving element is disposed at an intermediate position D of a focal distance F1 of the cylindrical lens 368 (1) and a focal distance F2 of the cylindrical lens 368 (2). As light receiving element, an element such as a quartering type light receiving element shown in FIG. 40 and a two-dimensional imaging element can be used. A position D on which a light receiving element is disposed is referred to as a sensor position D in the following.

FIG. 41(a) shows a light focusing state of a guide laser beam viewed in a horizontal direction (X) and in a vertical direction (Y) in the case in which a guide laser beam of a plane wave is transmitted to the two cylindrical lenses 368 (1) and 368 (2).

The upper side of FIG. 41(a) shows a state of a guide laser beam in the case in which the bus line of the first cylindrical lens 368 (1) is perpendicular to a horizontal direction (X) and the bus line of the second cylindrical lens 368 (2) is parallel to a horizontal direction (X). In this case, to an X direction, the first cylindrical lens 368 (1) functions as a convex lens, and the second cylindrical lens 368 (2) functions as a window.

Consequently, the guide laser beam is focused into a focus position F1 of the cylindrical lens 368 (1) in a linear shape parallel to a direction that is crossed perpendicularly to the X direction, and spreads as a diverging light. The guide laser beam spreads to a certain length L1 parallel to the X axis at a sensor position D shown by the dotted line.

The lower side of FIG. 41(a) shows a state of a guide laser beam in the case in which the bus line of the first cylindrical lens 368 (1) is parallel to a vertical direction (Y) and the bus line of the second cylindrical lens 368 (2) is perpendicular to a vertical direction (Y). In this case, to a Y direction, the first cylindrical lens 368 (1) functions as a window, and the second cylindrical lens 368 (2) functions as a convex lens.

Consequently, the guide laser beam is focused into a focus position F2 of the cylindrical lens 368 (2) in a linear shape parallel to a direction that is crossed perpendicularly to the Y direction. Since a sensor position D is on a front side of the focus position F2, the guide laser beam that has a certain length L2 parallel to the Y axis is detected.

FIG. 41(b) shows a shape IM1 on an XY plane for the guide laser beam that is measured at the sensor position D. A cross sectional shape IM1 on an XY plane for the guide laser beam is a generally rectangular shape that is provided with a width L1 in an X direction and a width L2 in a Y direction. In the case in which F1 is set to be equivalent to F2 and the sensor position D is disposed at the center of a focal distance of each of the cylindrical lenses 368 (1) and 368 (2), the cross sectional shape IM1 is a square shape of L1=L2.

FIG. 42 shows a light focusing state of a guide laser beam in the case in which a guide laser beam of a convex face wave is transmitted to the two cylindrical lenses 368 (1) and 368 (2). The upper side of FIG. 42(a) is corresponded to the upper side of FIG. 41(a). The lower side of FIG. 42(a) is corresponded to the lower side of FIG. 41(a). FIG. 43 is also corresponded to FIG. 41 similarly.

As shown in the upper side of FIG. 42(a), the guide laser beam of a convex face wave is focused into a position slightly far from a focus position F1 of the cylindrical lens 368 (1) (on the right side in FIG. 42) in a linear shape parallel to a direction that is crossed perpendicularly to the X direction. After that, the guide laser beam spreads as a diverging light. The guide laser beam spreads to a certain length L1a parallel to the X axis at a sensor position D.

As shown in the lower side of FIG. 42(a), the guide laser beam of a convex face wave is focused into a position far from a focus position F2 of the cylindrical lens 368 (2) in a linear shape parallel to a direction that is crossed perpendicularly to the Y direction. Since a sensor position D is on a front side of the light focusing point, the guide laser beam has a certain length L2a parallel to the Y axis.

FIG. 42(b) shows a shape IM2 on an XY plane for the guide laser beam of a convex face wave. The shape IM2 of the guide laser beam is provided with a width L1a in an X direction and a width L2a in a Y direction, and is a rectangular shape that is longer in a Y direction.

Figure 43:
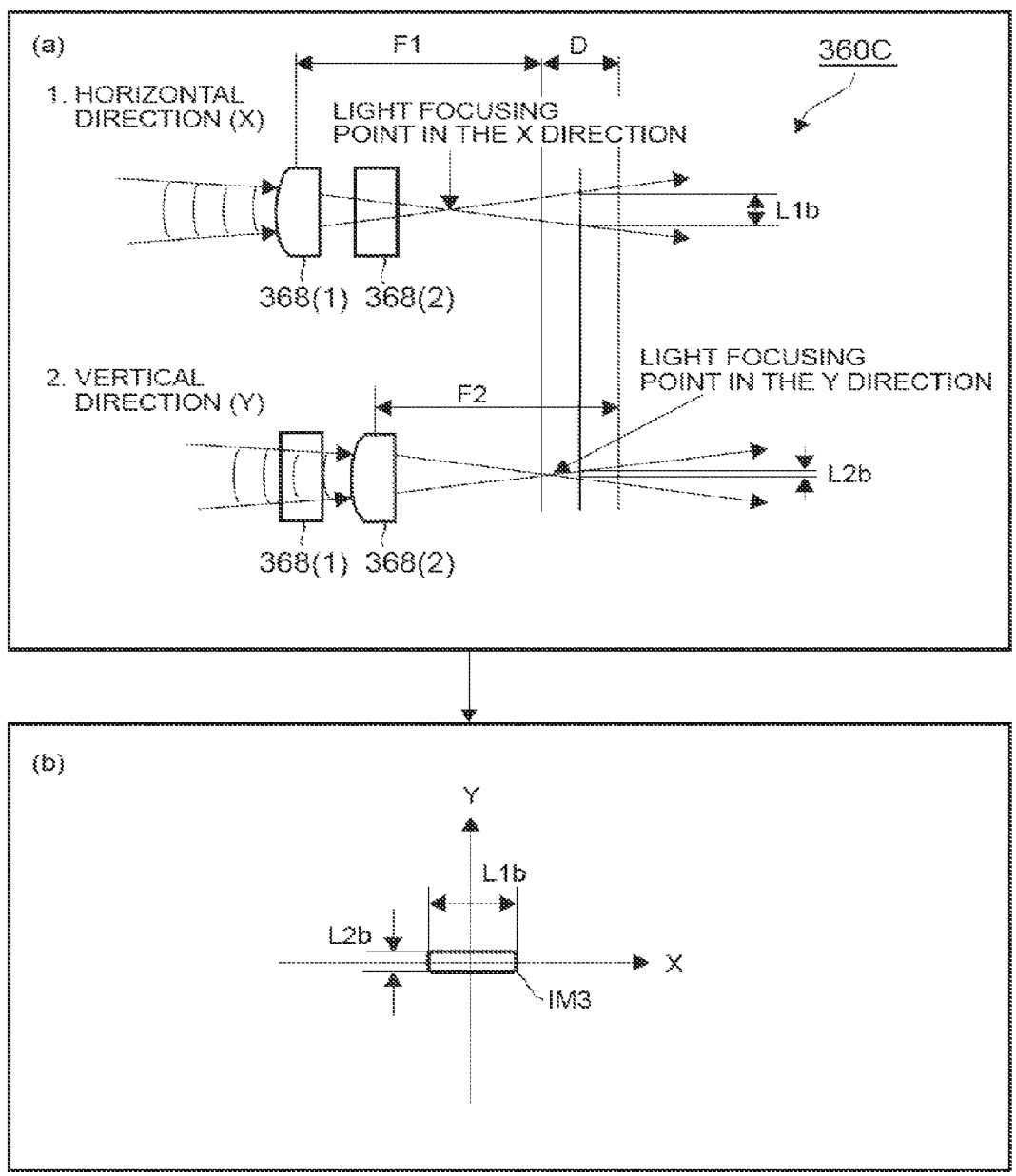
FIG. 43 is a block diagram that follows FIG. 42.

FIG. 43 shows a light focusing state of a guide laser beam in the case in which a guide laser beam of a concave face wave is transmitted to each of the two cylindrical lenses 368 (1) and 368 (2). As shown in the upper side of FIG. 43(a), the guide laser beam is focused into a position on a front side of a focus position F1 of the cylindrical lens 368 (1) in a linear shape parallel to a direction that is crossed perpendicularly to the X direction. After the light focusing, the guide laser beam spreads as a diverging light. The guide laser beam has a certain length L1b parallel to the X axis at a sensor position D.

As shown in the lower side of FIG. 43(a), the guide laser beam is focused into a position on a front side of a focus position F2 of the cylindrical lens 368 (2) in a linear shape parallel to a direction that is crossed perpendicularly to the Y direction. Since a sensor position D is on a front side of the light focusing point, the guide laser beam has a certain length L2b parallel to the Y axis.

FIG. 43(b) shows a shape IM3 on an XY plane for the guide laser beam of a concave face wave. The shape IM3 of the guide laser beam is provided with a width L1b in an X direction and a width L2b in a Y direction, and is a rectangular shape that is longer in an X direction.

Embodiment 24

Figure 44:
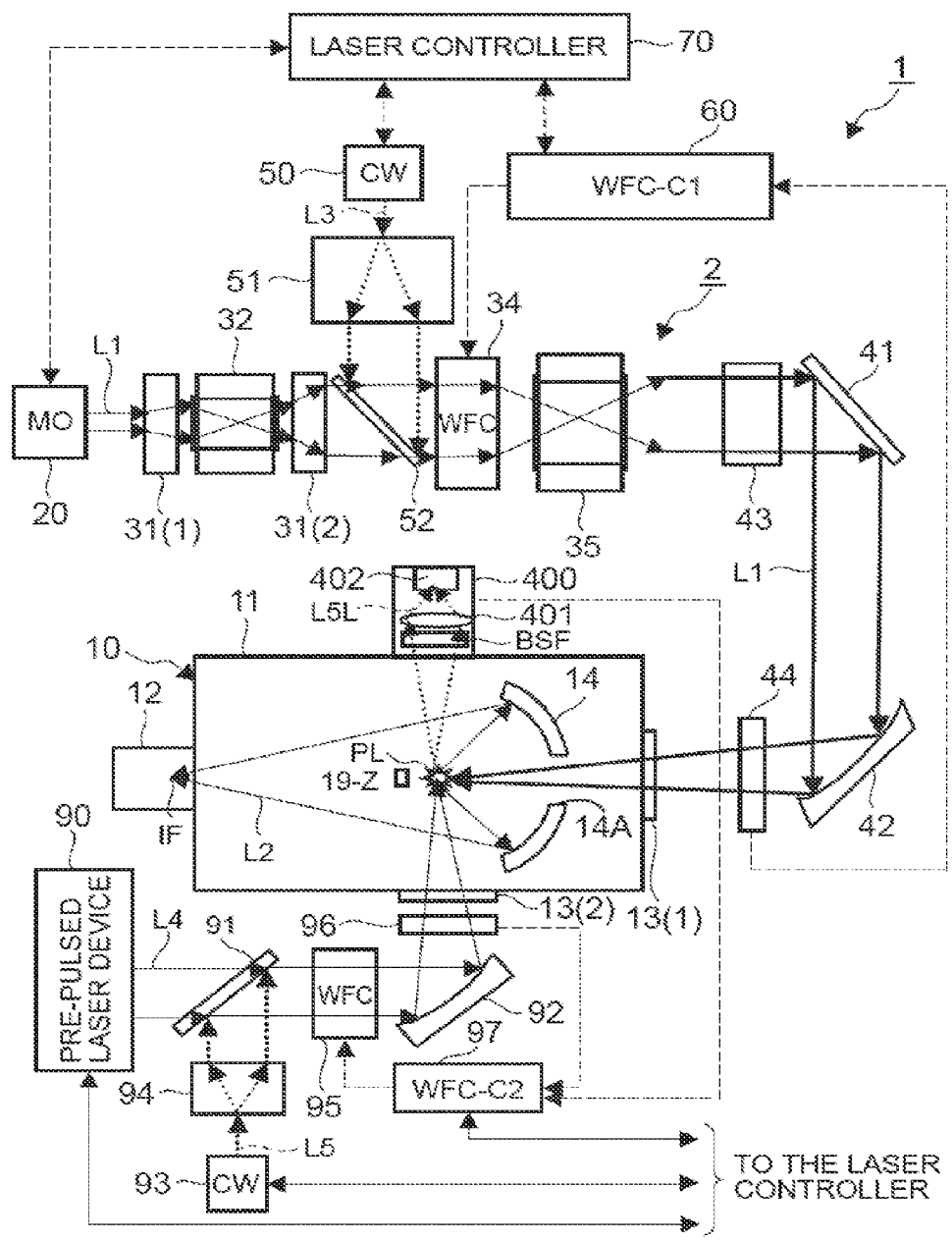
FIG. 44 is a block diagram showing an extreme ultraviolet light source device in accordance with a twenty-fourth embodiment of the present invention.

A twenty-fourth embodiment of the present invention will be described in the following with reference to FIG. 44. In the present embodiment, a configuration of a pre-pulse laser and a configuration that corrects an optical characteristic of a pre-pulse laser are added to the configuration shown in FIG. 1. In the case in which a droplet DP reaches a predetermined position, the droplet DP is irradiated with a pre-pulsed laser beam L4. By this configuration, a target material is expanded. Consequently, a density of a target material can be reduced to be a suitable value at the predetermined position which is irradiated with a driver pulsed laser beam L1, and a generation efficiency of an EUV light can be improved.

Consequently, the present embodiment is configured to be provided with a pre-pulsed laser device 90 and an off-axis parabolic convex mirror 92 that transmits a pre-pulsed laser beam to the chamber 10 via a window 13 (2). As a pre-pulsed laser beam, a fundamental wave, a double harmonic, a triple harmonic, and a quadruple harmonic for a YAG laser can be used for instance. Alternatively, a fundamental wave or a harmonic light of a titanium sapphire laser of a pulse oscillation can also be use as a pre-pulsed laser beam. In the present embodiment, although a target material supply unit that supplies a droplet DP is not shown, a droplet DP is supplied to a position of a light focusing point of a pre-pulsed laser beam on an axis perpendicular to a plane of the paper for instance.

A diameter of a tin droplet DP is 100 μm or less. Consequently, in order to directly hit the droplet DP with a pre-pulsed laser beam, it is necessary to manage a beam shape and a light focusing position with a high degree of accuracy. For the purpose, the present embodiment is configured to be provided with a mechanism that automatically corrects an optical performance of the pre-pulsed laser beam L4.

A guide laser beam introduction mirror (a guide laser beam introduction part) 91 that introduces a guide laser beam L5 is disposed between the pre-pulsed laser device 90 and the off-axis parabolic convex mirror 92. A wave front correction part 95 is disposed on a downstream side of the guide laser beam introduction mirror 91. A sensor 96 is disposed between the off-axis parabolic convex mirror 92 and the window 13 (2).

The guide laser beam L5 that is output from a guide laser device 93 is incident to the guide laser beam introduction mirror 91 via a laser collimator 94, and is reflected by the guide laser beam introduction mirror 91.

The guide laser beam L5 is then incident to the off-axis parabolic convex mirror 92 via the wave front correction part 95, and is reflected toward the window 13 (2). The sensor 96 detects an optical performance of the guide laser beam L5 that travels to the chamber 10, and outputs the optical performance to a wave front correction controller 97. The wave front correction controller 97 controls the wave front correction part 95 in such a manner that the optical performance of the guide laser beam L5 is in a predetermined value.

Moreover, the present embodiment is configured to be provided with a guide laser beam focusing point measuring instrument 400 that directly measures a shape and a position of a light focusing point of the guide laser beam L5 on the chamber body 11 for an example. The measuring instrument 400 is positioned at the end of the optical axes of the pre-pulsed laser beam L4 and the guide laser beam L5, and is disposed on the chamber body 11.

The guide beam focusing point measuring instrument 400 is configured to be provided with a band-pass filter (BSF) that makes only the guide laser beam L5 to be transmitted, a transcription lens 401 that carries out a transcription and an image formation of a light focusing point, and a CCD 402 that has a sensitivity to the guide laser beam L5 for detecting a transcription image.

The guide laser beam is focused into a plasma luminous point PLZ, and then spreads to be incident to the BSF. The BSF makes only the guide laser beam to be transmitted. The guide laser beam is transmitted to the transcription lens 401, and is incident to the CCD 402. The CCD 402 detects a light focusing point image of the guide laser beam. The wave front correction controller 97 controls the wave front correction part 95 based on a shape and a position of a light focusing point of the guide laser beam that has been detected. By this configuration, a shape and a position of a light focusing point of the pre-pulsed laser beam can be stabilized with a high degree of accuracy.

In the present embodiment that is configured as described above, the characteristics of a light path through which the pre-pulsed laser beam passes can be modified on a steady basis by using the guide laser beam L5 that is output in an asynchronous manner with the pre-pulsed laser beam L4. Consequently, a light focusing position and an output power of the pre-pulsed laser beam can be stabilized, whereby a droplet DP can be directly hit with the pre-pulsed laser beam stably and can be expanded.

Embodiment 25

Figure 45:
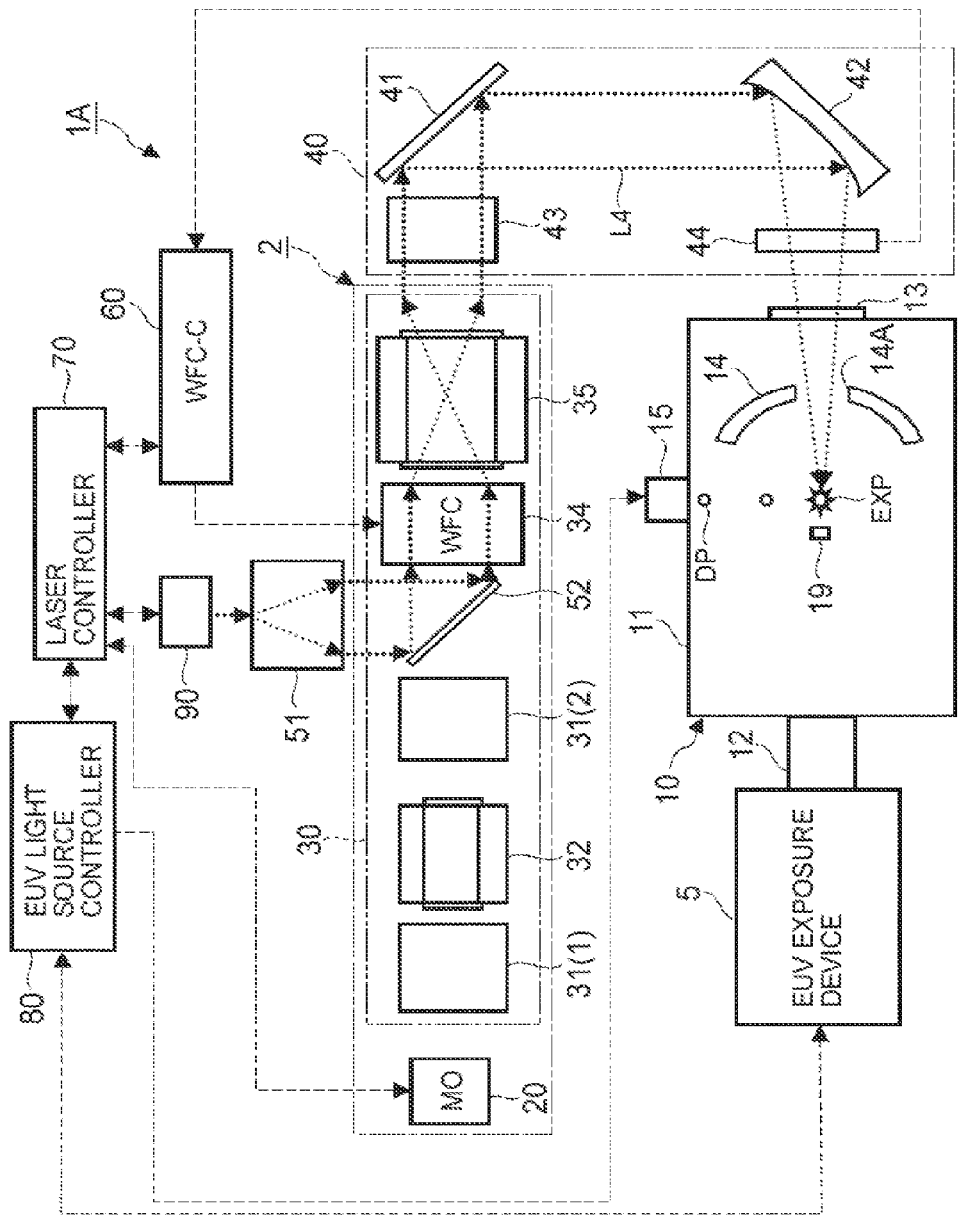
FIG. 45 is a block diagram showing an extreme ultraviolet light source device in accordance with a twenty-fifth embodiment of the present invention.

A twenty-fifth embodiment of the present invention will be described in the following with reference to FIGS. 45 to 49. In the present embodiment described in the following (except for a twenty-ninth embodiment shown in FIG. 53), a pre-pulsed laser beam that is used for expanding a target material in advance is used as a guide laser beam. An extreme ultra-violet light source device 1A shown in FIG. 45 is common in a number of respects with the extreme ultraviolet light source device 1 shown in FIG. 1. Although a guide laser beam of a continuous light or a pseudo continuous light is used in the example shown in FIG. 1, a pre-pulsed laser beam is also used as a guide laser beam in each of the following embodiments that include the present embodiment. More specifically, a pre-pulsed laser beam has two functions composed of a function as a guide laser beam for correcting an optical performance and a function for heating and expanding a droplet DP.

The extreme ultraviolet light source device 1A shown in FIG. 45 is configured to be provided with a pre-pulsed laser device 90 as substitute for the guide laser device 50 shown in FIG. 1. A pre-pulsed laser beam L4 that has been output from the pre-pulsed laser device 90 is introduced to an inlet side of a main amplifier 35 (an upstream side in a direction of travel of the laser beam) via a laser collimator 51. The pre-pulsed laser beam is incident to a chamber 10 via a light focusing system 40. As described later in FIG. 47, the pre-pulsed laser beam L4 and the driver pulsed laser beam L1 are multiplexed in such a manner that the both beams have the same axis.

The guide laser beam introduction mirror 52 is configured as a beam splitter by forming a thin coating that makes a driver pulsed laser beam to be transmitted and that makes a pre-pulsed laser beam to be reflected at a relatively high degree of reflection on a diamond substrate. Since a diamond has a high coefficient of thermal conductivity, an occurrence of a distribution of temperature can be suppressed. As a result, even in the case in which a laser beam is transmitted or reflected, a distortion of a wave front of a laser beam can be suppressed.

In the case in which a droplet DP is irradiated with the pre-pulsed laser beam L4, the droplet DP is expanded due to a heat, and a density of the droplet DP is reduced. A state in which the droplet DP is expanded to reduce a density of the droplet DP is referred to as an expanded state EXP in the embodiment.

Figure 46:
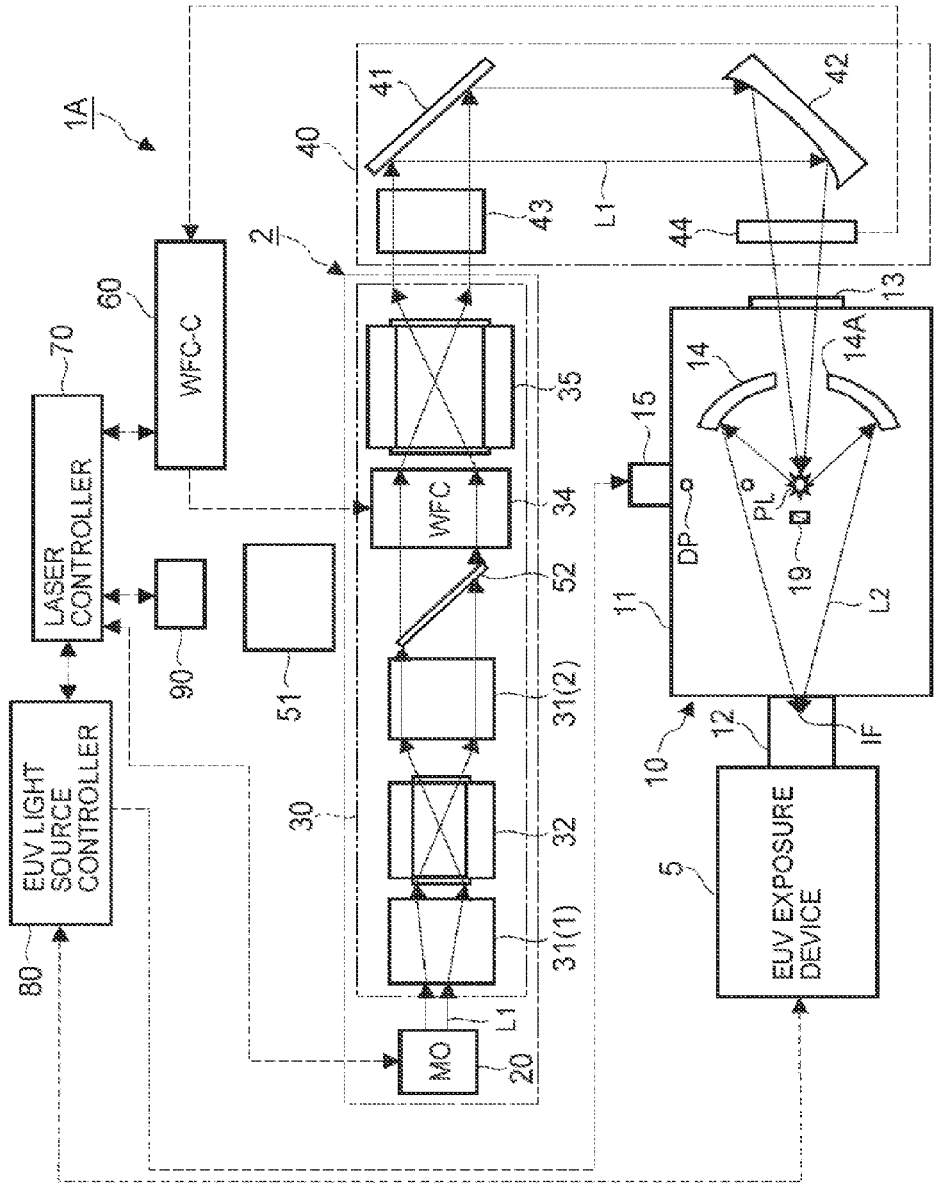
FIG. 46 is a view showing the state in which only a driver pulsed laser beam is output.

FIG. 46 shows a state in which a droplet DP is irradiated with the pre-pulsed laser beam L4 to prepare an expanded state EXP and then the driver pulsed laser beam L1 is irradiated. In the case in which tin having a suitable density in an expanded state EXP is irradiated with the driver pulsed laser beam L1, tin becomes in a plasma state PLZ. By this configuration, an EUV light L2 is generated, and is supplied to the EUV exposure device 5.

Figure 47:
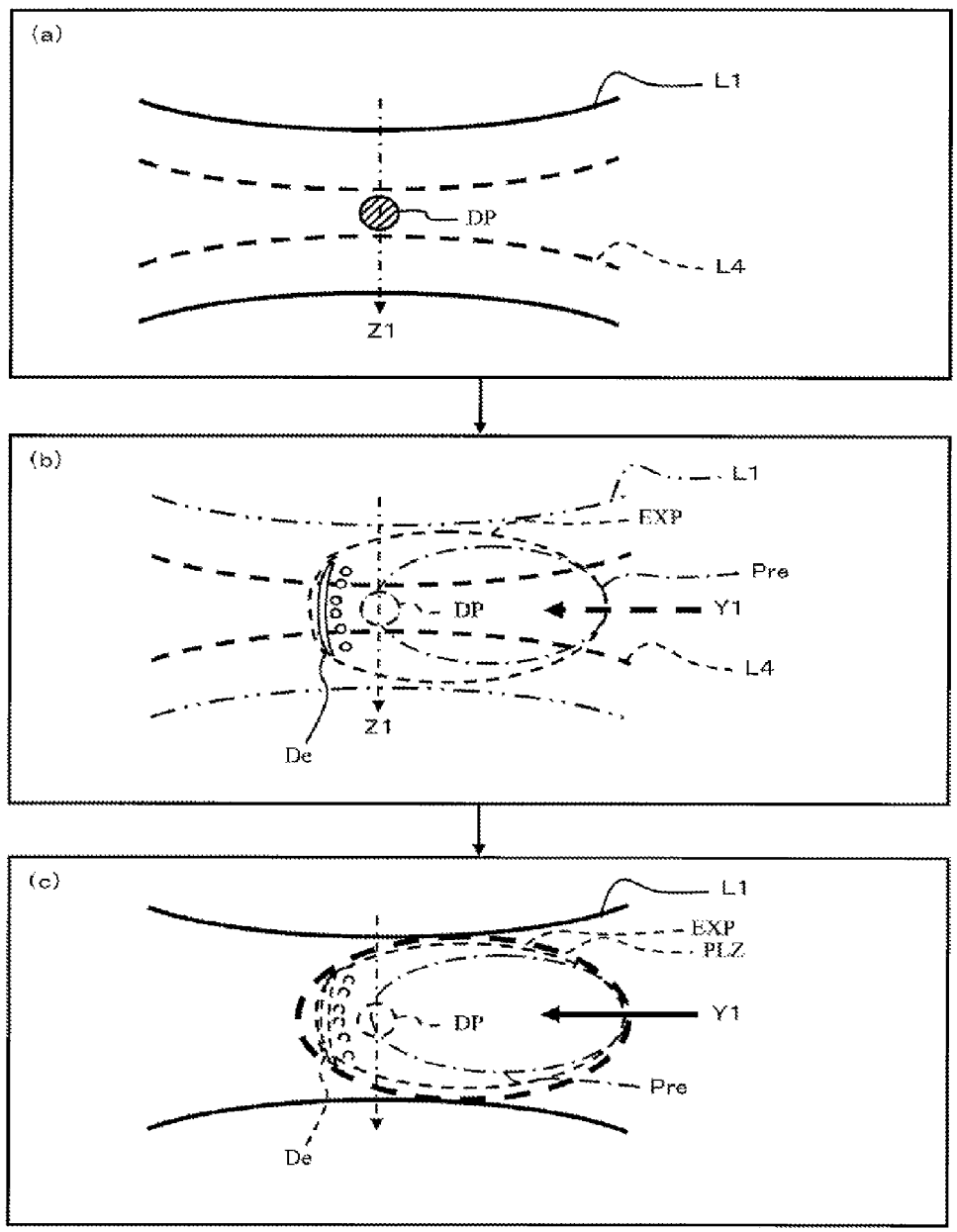
FIG. 47 is a schematic explanatory diagram showing a relationship among a driver pulsed laser beam, a pre-pulsed laser beam, and a target material.

FIG. 47 is a schematic explanatory diagram showing a relationship among a driver pulsed laser beam L1, a pre-pulsed laser beam L4, and a droplet DP. As shown in FIG. 47(a), the pre-pulsed laser beam L4 and the driver pulsed laser beam L1 are set in such a manner that the both beams have the same axis. A beam diameter of the pre-pulsed laser beam L4 is set to be slightly larger than a diameter of a droplet DP. Since a wavelength of the driver pulsed laser beam L1 is larger than that of the pre-pulsed laser beam L4, a beam diameter of the driver pulsed laser beam L1 is larger than that of the pre-pulsed laser beam L4 to a satisfactory extent. While a droplet DP moves along an axis Z1 in the chamber 10, the droplet DP is irradiated with the pre-pulsed laser beam L4.

FIG. 47(b) shows a state immediately after the droplet DP is irradiated with the pre-pulsed laser beam L4. In the case in which the droplet DP is irradiated with the pre-pulsed laser beam L4, a part of the droplet DP is separated from the droplet DP and is dispersed in all directions due to the impact to be a dispersed material De and a pre-plasma state Pre. It is supposed that the pre-plasma state Pre is a mixed state of a metal vapor and plasma. In the case in which the droplet DP is irradiated with the pre-pulsed laser beam L4, the droplet DP is expanded due to a heat, and becomes in an expanded state EXP. The expanded state EXP is adjusted to be a value in such a manner that a generation efficiency of an EUV light is increased.

FIG. 47(c) shows a state in which a target material (Sn) in an expanded state EXP is irradiated with a driver pulsed laser beam L1. A beam diameter of the driver pulsed laser beam L1 is large to a satisfactory extent as described above, a target material in a pre-plasma state Pre and a target material De that has been dispersed in all directions are irradiated with a driver pulsed laser beam L1, and become in a plasma state PLZ.

Figure 48:
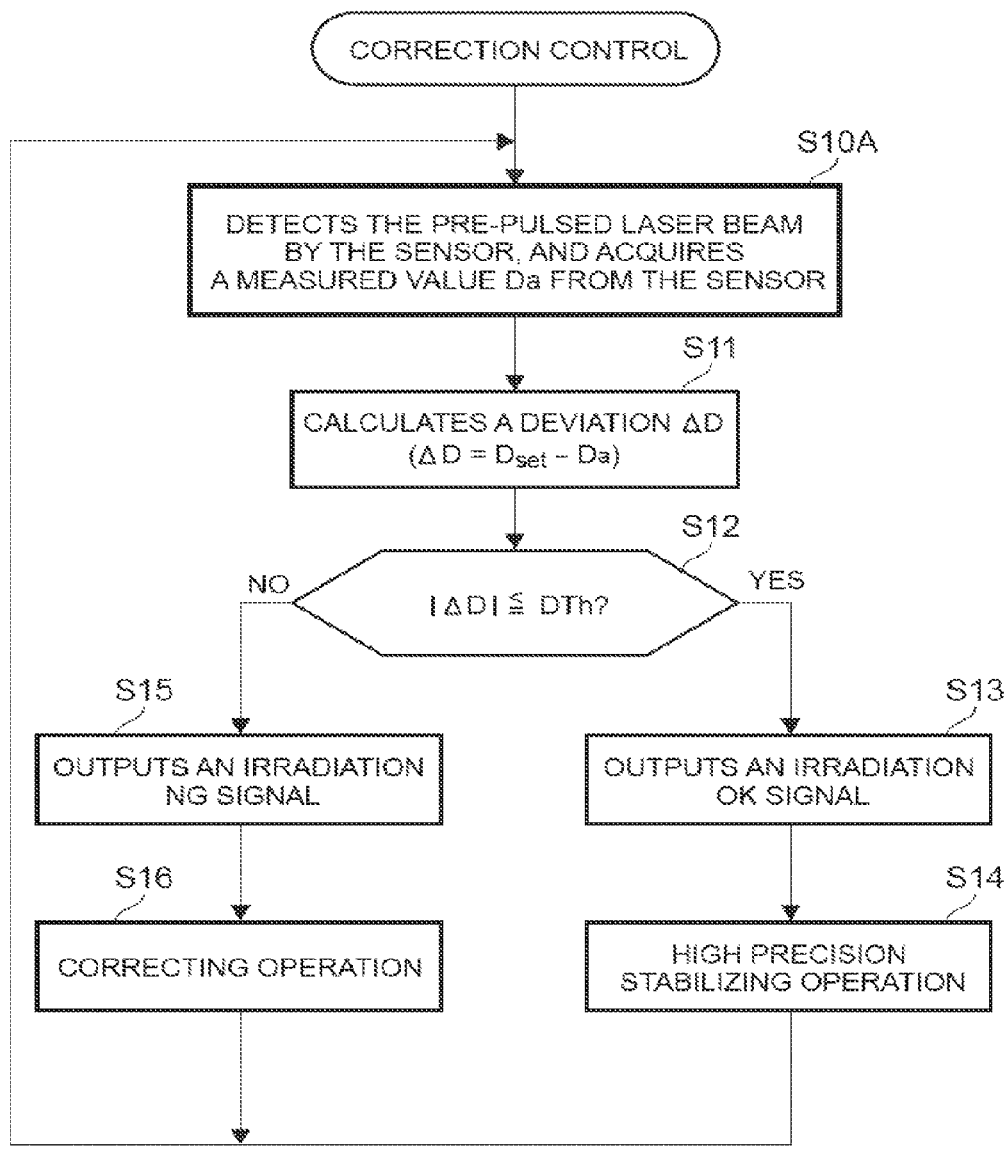
FIG. 48 is a flowchart of a wave front correction processing.

FIG. 48 is a flowchart of a processing for carrying out a wave front correction. The present processing is carried out by the wave front correction controller 60. The processing shown in FIG. 48 is provided with the steps S11 to S14 that are common with the processing shown in FIG. 3. The processing shown in FIG. 48 and the processing shown in FIG. 3 are different from each other in the step S10A.

In the present embodiment, the wave front correction controller 60 detects the pre-pulsed laser beam L4 by the sensor 44, and acquires a measured value Da of the pre-pulsed laser beam L4 from the sensor 44 (S10A). The subsequent steps are equivalent to those described in FIG. 3, and the descriptions thereof are omitted.

Figure 49:
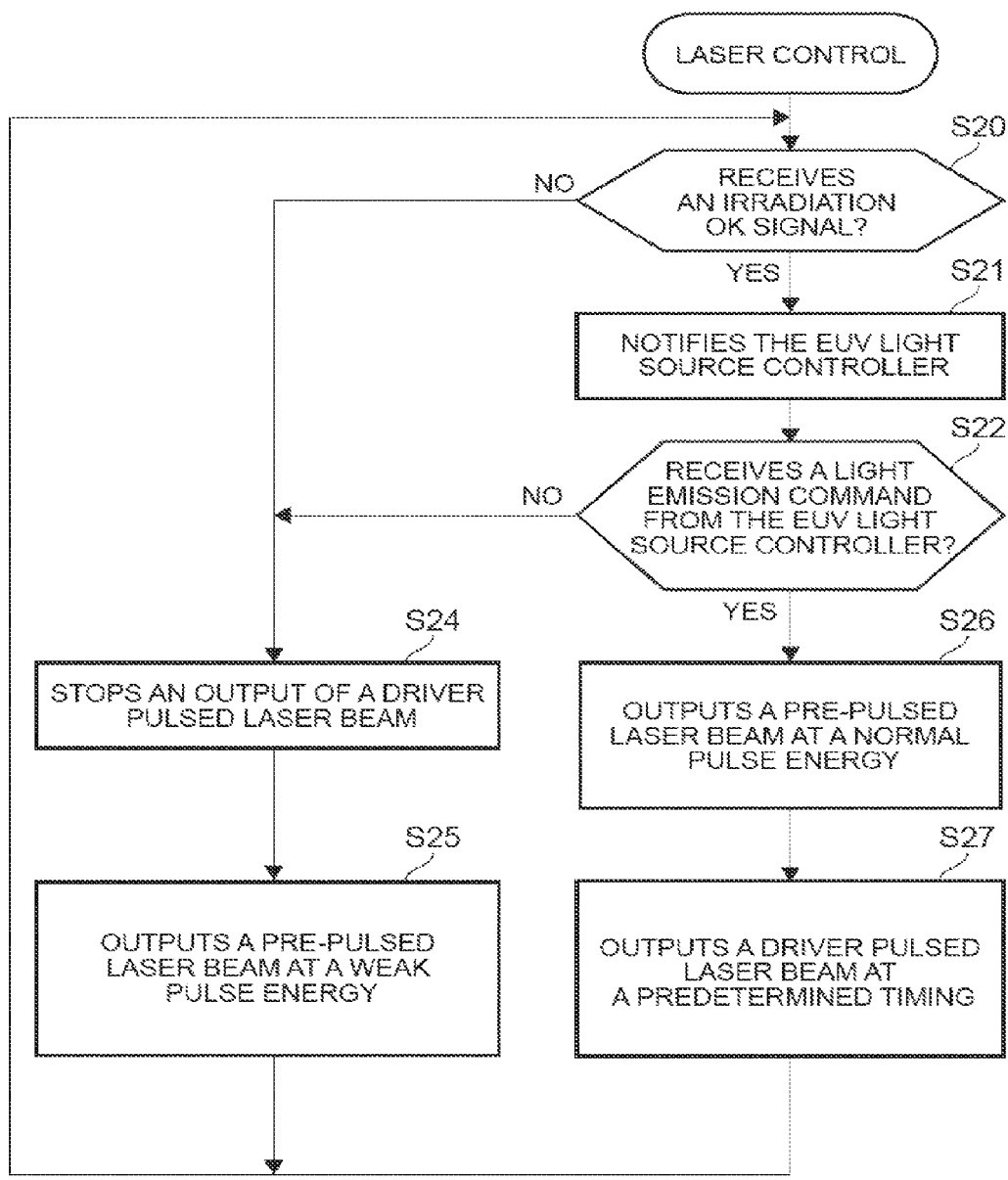
FIG. 49 is a flowchart of a processing in which a laser controller notifies an EUV light source controller of an adjustment completion.

FIG. 49 is a flowchart that shows an operation of a laser controller 70 and an EUV light source controller 80. The flowchart shown in FIG. 49 is provided with the steps S20 to S22 and S24 that are common with the flowchart described in FIG. 4. The different points are that the S23 in FIG. 4 is replaced by the S27 and that the S25 and S26 are added newly.

In the case in which the laser controller 70 receives an irradiation OK signal from the wave front correction controller 60 (S20: YES), the laser controller 70 notifies the EUV light source controller 80 of that an adjustment of the driver pulse laser light source device 2 has been completed (S21). In the case in which the EUV light source controller 80 receives an adjustment completion notice from the laser controller 70, the EUV light source controller 80 outputs a light emission command to the laser controller 70.

The laser controller 70 stops an output of a driver pulsed laser beam and stands by until a light emission command is output from the EUV light source controller 80 (S22: NO, S24). While an output of a driver pulsed laser beam is stopped, the pre-pulsed laser device 90 outputs a pre-pulsed laser beam, and a correction of an optical system is carried out by the processing described in FIG. 48 (S25).

In the S25, a pre-pulsed laser beam is output at a weak pulse energy that is specified in advance in such a manner that a physical change is not applied to a droplet DP. The weak pulse energy is corresponded to a "first output".

That a physical change is not applied to a droplet DP means that a shape of a droplet DP is not changed from a state before a pre-pulsed laser beam is irradiated to a state after a pre-pulsed laser beam is irradiated. More specifically, an output of a pre-pulsed laser beam is specified to be weak in such a manner that a droplet DP is not expanded due to a heat and that a part of the droplet DP is not dispersed for instance after an irradiation of a pre-pulsed laser beam. In other words, a pre-pulsed laser beam having a low intensity by which an optical performance can be corrected is output.

On the other hand, in the case in which the laser controller 70 receives a light emission command from the EUV light source controller 80 (S22: YES), the laser controller 70 makes the pre-pulsed laser device 90 to output a pre-pulsed laser beam at a normal pulse energy as a "second output" (S26). The normal pulse energy is an energy that can expand a droplet DP due to a heat to make the droplet DP to have a predetermined density.

The laser controller 70 makes the driver laser oscillator 20 to output a driver pulsed laser beam at a predetermined timing, and makes a target material in an expanded state to be irradiated with the driver pulsed laser beam (S27). By this configuration, an EUV light is generated, and supplied to the EUV exposure device 5.

The present embodiment that is configured as described above has an operation effect equivalent to that of the first embodiment since a pre-pulsed laser beam can be used as a guide laser beam whereby a performance of an optical system can be adjusted. Moreover, in the present embodiment, a pre-pulsed laser beam that is used for improving a generation efficiency of an EUV light can also be used as a guide laser beam that is used for adjusting a performance of an optical system. Consequently, in the present embodiment, a reliability can be improved without complicating the configuration.

Embodiment 26

Figure 50:
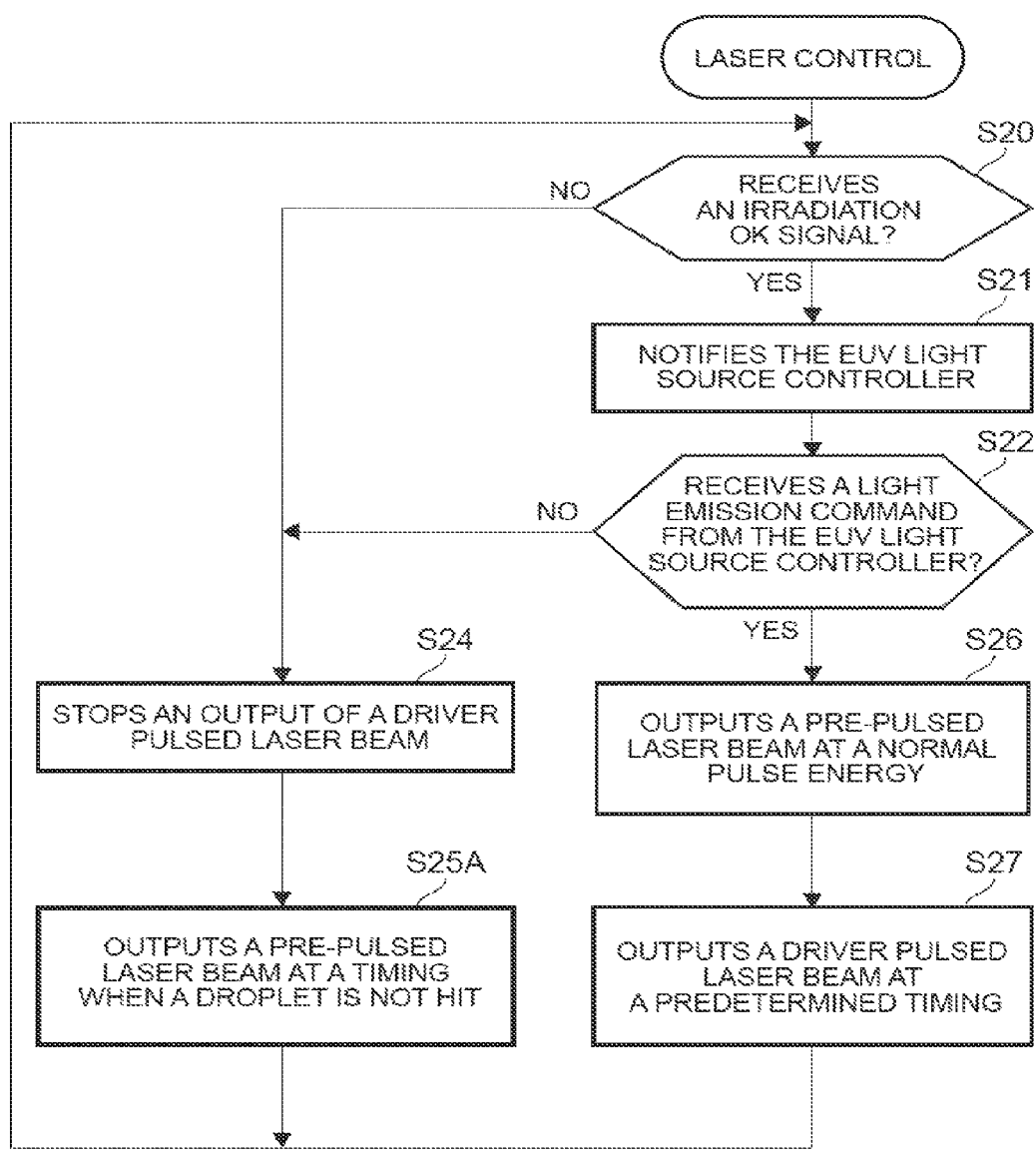
FIG. 50 is a block diagram showing an extreme ultraviolet light source device in accordance with a twenty-sixth embodiment of the present invention.

A twenty-sixth embodiment of the present invention will be described in the following with reference to FIG. 50. In the present embodiment, a modified example of the processing described in FIG. 49 will be described. FIG. 50 is a flowchart that shows an operation of a laser controller 70 and an EUV light source controller 80. The flowchart shown in FIG. 50 is provided with the steps S20 to S24, S26, and S27 that are common with the flowchart described in FIG. 49. The different point is that the S25 in FIG. 49 is replaced by the S25A. Consequently, the different point will be described in the following.

In the present embodiment, in a period when an output of a driver pulsed laser beam is stopped (S24), a pre-pulsed laser beam is output from the pre-pulsed laser device 90 at a timing when a droplet DP is not hit (S25A).

A droplet DP is supplied from a target material supply part 15 to the chamber 10 at a constant frequency. As well as in the period when a driver pulsed laser beam is output, even in the period when a driver pulsed laser beam is not output, a droplet DP is supplied from the target material supply part 15 at a constant frequency during an operation of the extreme ultraviolet light source device 1.

The laser controller 70 outputs a pre-pulsed laser beam at a predetermined timing in such a manner that the pre-pulsed laser beam passes through a space between droplets DP. An optical performance of an optical system is adjusted by using the pre-pulsed laser beam. The present embodiment that is configured as described above has an operation effect equivalent to that of the twenty-fifth embodiment.

Embodiment 27

Figure 51:
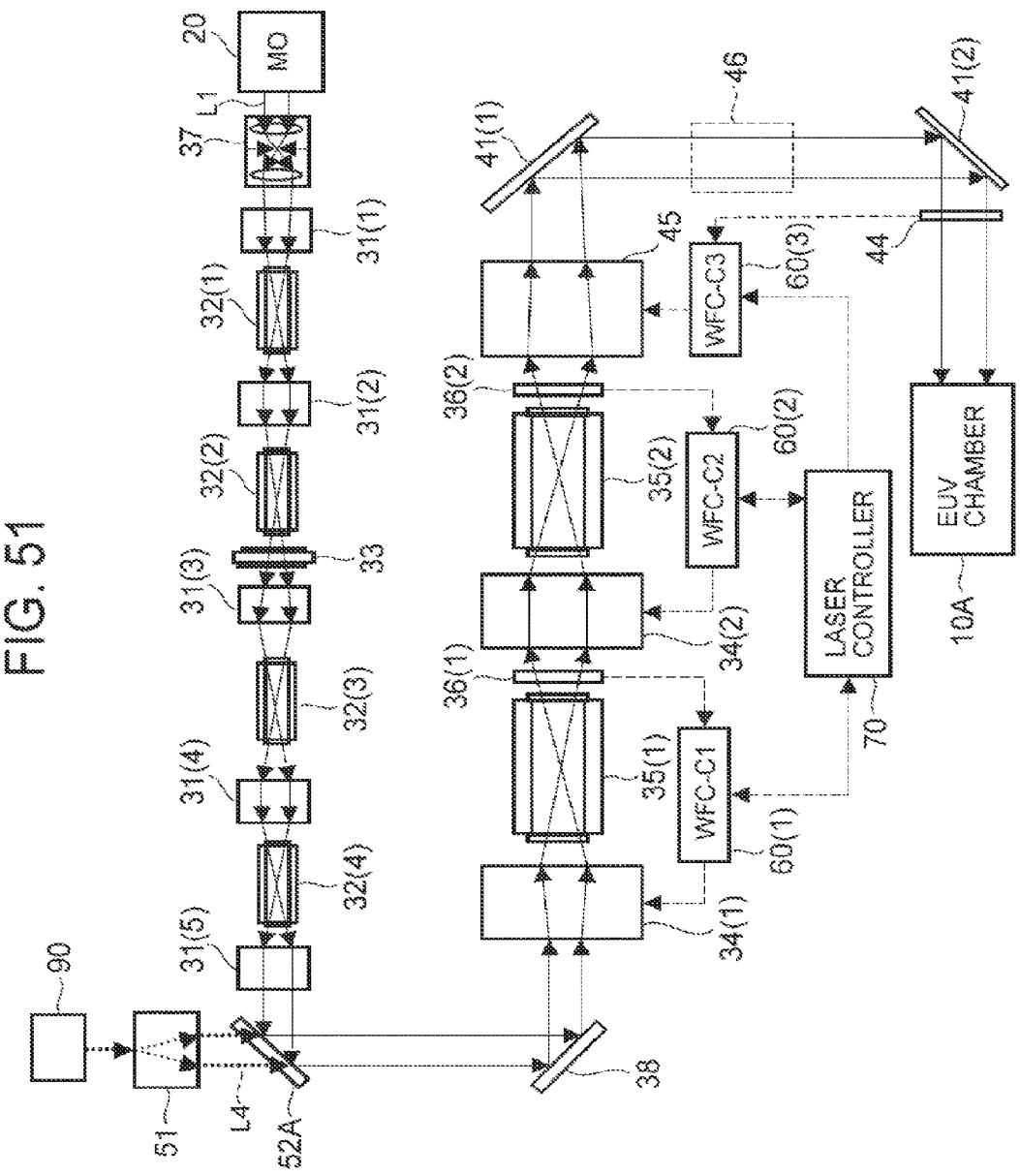
FIG. 51 is a block diagram showing an extreme ultraviolet light source device in accordance with a twenty-seventh embodiment of the present invention.

A twenty-seventh embodiment of the present invention will be described in the following with reference to FIG. 51. In the present embodiment, a pre-pulsed laser beam L4 is introduced to the optical system and is multiplexed with the driver pulsed laser beam L1 on a front side of the main amplifier 35 (1). As shown in the general block diagram of FIG. 51, a guide laser beam introduction mirror 52A is disposed between the last preamplifier 32 (4) of a plurality of preamplifiers 32 and the first main amplifier 35 (1) of a plurality of main amplifiers 35.

The guide laser beam introduction mirror 52A is configured as a beam splitter by forming a thin coating on a diamond substrate for instance. A thin coating that makes a pre-pulsed laser beam to be transmitted and that makes a driver pulsed laser beam to be reflected at a relatively high degree of reflection is formed on the guide laser beam introduction mirror 52A. The present embodiment that is configured as described above has an operation effect equivalent to that of the twenty-fifth embodiment.

Embodiment 28

Figure 52:
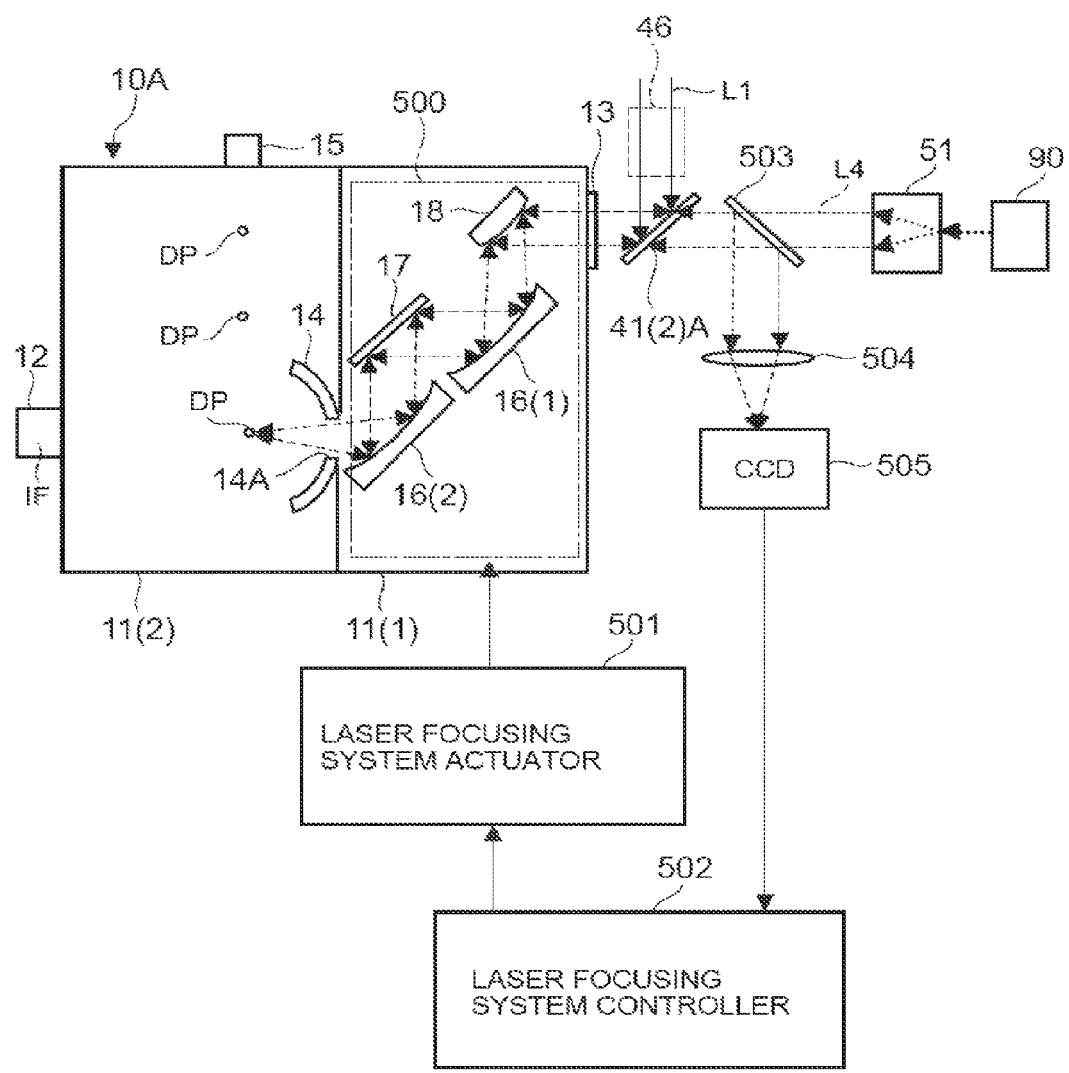
FIG. 52 is a block diagram showing an extreme ultraviolet light source device in accordance with a twenty-eighth embodiment of the present invention.

A twenty-eighth embodiment of the present invention will be described in the following with reference to FIG. 52. The present embodiment is applied to the case in which a laser focusing system (a laser focusing optical system) that focuses a laser beam into a predetermined point is disposed in the chamber 10A or close to the chamber 10A. In the case in which a laser focusing system 500 is disposed in the chamber 10A or close to the chamber 10A, each optical component that configures the laser focusing system 500 is greatly affected by a heat. This is because a heat from not only a driver pulsed laser beam but also the chamber 10A is applied to the laser focusing system 500. Consequently, the present embodiment maintains an optical performance of the laser focusing system 500 that is easy to be affected by a heat as described in the following.

The chamber 10A is configured to be provided with, for example, a light focusing region 11 (1) that arranges a driver pulsed laser beam that is incident from the driver pulse laser light source device 2 and an EUV light emission region 11 (2) that generates an EUV light by irradiating a droplet DP with a driver pulsed laser beam. As described in FIG. 8, the two regions 11 (1) and 11 (2) are partitioned by a wall. The light focusing region 11 (1) and the EUV light emission region 11 (2) are communicated with each other via a small hole that has been formed in the partition wall that partitions the regions 11 (1) and 11 (2).

The light focusing region 11 (1) is provided with the laser focusing system 500 that is configured to be provided with a plurality of optical elements. The laser focusing system 500 is configured by disposing, for example, the off-axis parabolic convex mirrors 16 (1) and 16 (2), a reflecting mirror 17, and an off-axis parabolic concave mirror 18 at the predetermined positions.

A driver pulsed laser beam L1 is reflected by a reflecting mirror (a beam splitter) 41(2)A, and is incident to the laser focusing system 500 via a diamond window 13. The driver pulsed laser beam L1 is reflected by the off-axis parabolic concave mirror 18, and is incident to the off-axis parabolic convex mirror 16 (1). A beam diameter of the driver pulsed laser beam L1 is expanded by being reflected on the off-axis parabolic concave mirror 18 and the off-axis parabolic convex mirror 16 (1).

In the third embodiment shown in FIG. 8, the purpose of the reflecting mirror 41(2) is to make a driver pulsed laser beam L1 to be reflected. However, the reflecting mirror 41(2)A in accordance with the present embodiment is configured as a beam splitter that makes a driver pulsed laser beam L1 to be reflected and that makes a pre-pulsed laser beam L4 to be transmitted. The beam splitter 41(2)A is configured by forming a thin coating on a diamond substrate for instance.

A driver pulsed laser beam L1 that is specified to have a predetermined beam diameter is incident to and reflected by a high reflection plane mirror 17, and is incident to another off-axis parabolic convex mirror 16 (2). The driver pulsed laser beam L1 that has been reflected by the off-axis parabolic convex mirror 16 (2) is irradiated to a droplet DP via a hole part 14A of the EUV light collector mirror 14.

A pre-pulsed laser beam L4 that has been output from the pre-pulsed laser device 90 is incident to the beam splitter 41(2)A via another beam splitter 503. The beam splitter 503 is configured by forming a coating that reflects a pre-pulsed laser beam L4 at a degree of reflection in the range of 4% to 50% for instance on a diamond substrate.

The pre-pulsed laser beam L4 is incident to the laser focusing system 500 via the beam splitter 41(2)A and the diamond window 13. Similarly to the driver pulsed laser beam L1, the pre-pulsed laser beam L4 is transmitted to the laser focusing system 500, whereby a beam diameter of the pre-pulsed laser beam L4 is adjusted. The pre-pulsed laser beam L4 is then irradiated to a droplet DP.

A part of the pre-pulsed laser beam L4 that has been irradiated to a droplet DP is reflected on the surface of the droplet DP, and returns on a light path that has been used when the pre-pulsed laser beam L4 was incident to the droplet DP. A laser beam that is reflected by the droplet DP to be returned is referred to as a return light in the embodiments.

A return light of the pre-pulsed laser beam L4 is incident to the beam splitter 503 via the laser focusing system 500 and the beam splitter 41(2)A. A part of the return light is reflected by the beam splitter 503. The return light that has been reflected by the beam splitter 503 passes through a light focusing lens 504, and is incident to a CCD sensor 505. By this configuration, an image formation of a transcription image of a droplet DP is carried out in the CCD sensor 505.

A laser focusing system controller 502 controls the laser focusing system 500 by outputting a control signal to a laser focusing system actuator 501 based on a transcription image of a droplet DP that is detected by the CCD sensor 505. The laser focusing system actuator 501 is a device that adjusts a position and/or an orientation of each of the optical components 16 (1), 16 (2), 17, and 18 that are disposed in the laser focusing system 500.

For instance, the laser focusing system controller 502 controls an optical axis of the laser focusing system 500 in such a manner that a position and/or a size of a transcription image of a droplet DP become a target position and/or a target size. Moreover for instance, the laser focusing system controller 502 controls a focus position of the laser focusing system 500 in such a manner that a size of a transcription image of a droplet DP becomes a minimum size.

The present embodiment that is configured as described above has an operation effect equivalent to that of the twenty-fifth embodiment. Moreover, in present embodiment, an optical performance of the laser focusing system 500 that is affected by a heat from not only a driver pulsed laser beam L1 but also the chamber 10A can also be controlled by using the pre-pulsed laser beam L4.

Embodiment 29

Figure 53:
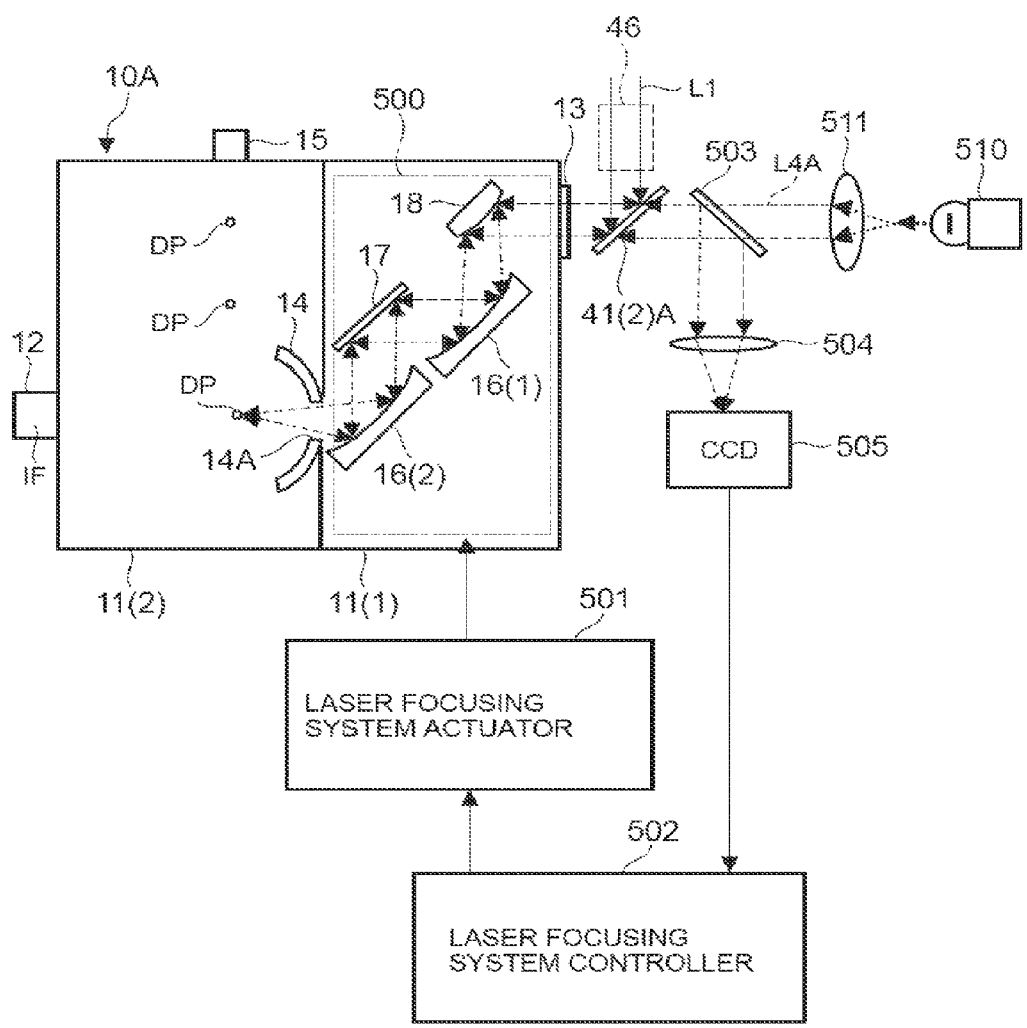
FIG. 53 is a block diagram showing an extreme ultraviolet light source device in accordance with a twenty-ninth embodiment of the present invention.

A twenty-ninth embodiment of the present invention will be described in the following with reference to FIG. 53. The present embodiment is corresponded to a modified example of the twenty-eighth embodiment described in FIG. 52. In present embodiment, a visible light lamp 510 and a collimate lens 511 are used as substitute for the pre-pulsed laser device 90. In present embodiment, an expansion of a droplet DP due to a heat with a pre-pulsed laser beam is not carried out.

A visible light that spreads as a diverging light from the visible light lamp 510 passes through the collimate lens 511, and is converted into a parallel guide beam L4A. A part of the guide beam L4A is reflected by a droplet DP, and is incident to the CCD sensor 505.

Embodiment 30

Figure 54:
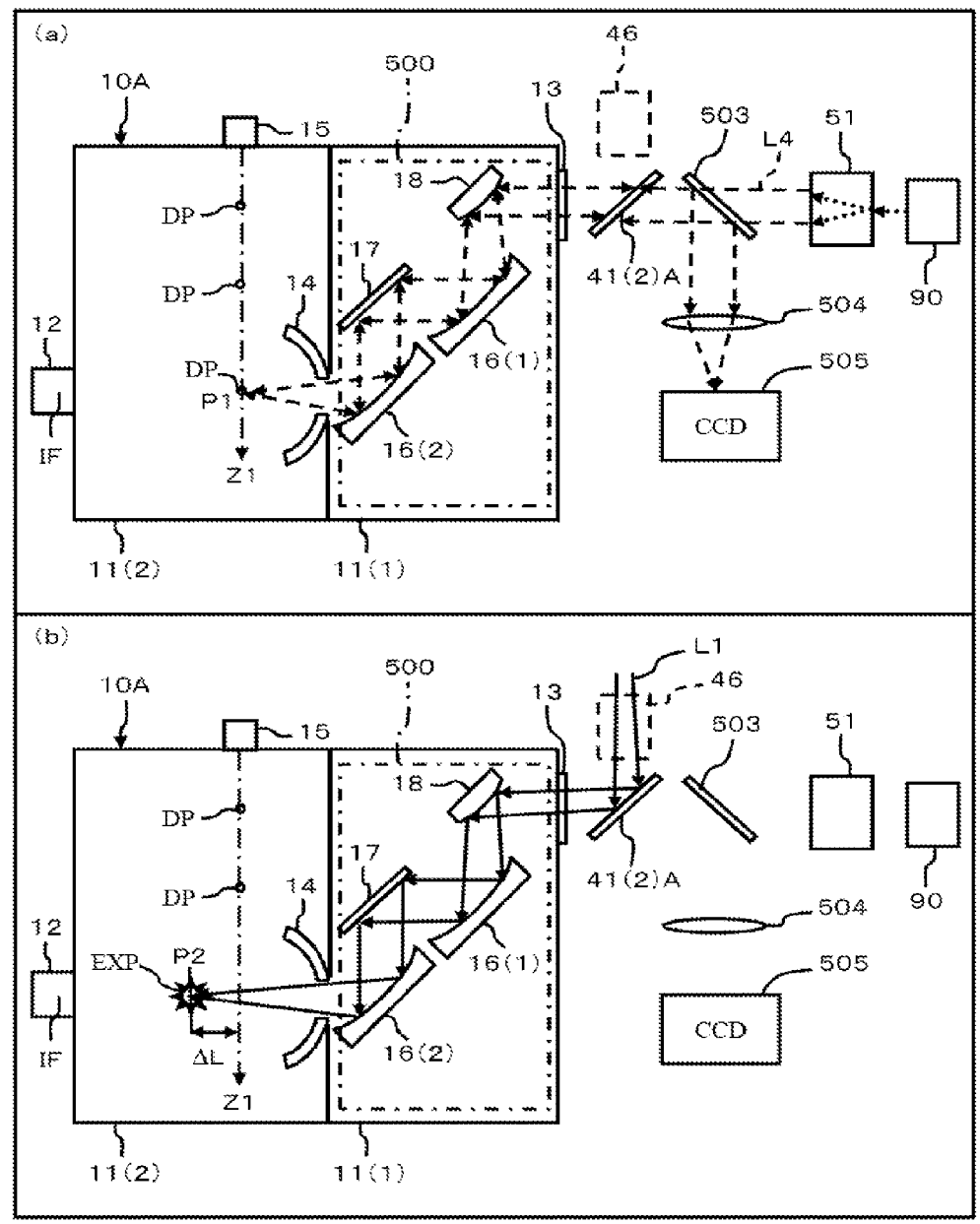
FIG. 54 is a block diagram showing an extreme ultraviolet light source device in accordance with a thirtieth embodiment of the present invention.

A thirtieth embodiment of the present invention will be described in the following with reference to FIG. 54. In present embodiment, a light focusing position P1 of a pre-pulsed laser beam and a light focusing position P2 of a driver pulsed laser beam are different from each other. FIG. 54(*a*) shows a light focusing position P1 of a pre-pulsed laser beam L4, and FIG. 54(*b*) shows a light focusing position P2 of a driver pulsed laser beam L1.

A light focusing position P2 of a driver pulsed laser beam L1 is specified to be shifted from a light focusing position P1 of a pre-pulsed laser beam L4 by a distance ΔL on a downstream side in a direction of travel of a laser beam. As shown in FIG. 54(*b*) for instance, the light focusing position P2 can be shifted in the back from the light focusing position P1 by a distance ΔL by adjusting a divergence of the driver pulsed laser beam L1 that is incident to the beam splitter 41(2)A in advance.

The present embodiment that is configured as described above has an operation effect equivalent to that of the twenty-fifth embodiment. Moreover, in the present embodiment, a light focusing position P1 of a pre-pulsed laser beam and a light focusing position P2 of a driver pulsed laser beam can be different from each other. A dispersing speed of a dispersed material De is high and a dispersed material De is dispersed in a wide range in some cases depending on an irradiation condition of the pre-pulsed laser beam L4. In this case, in the present embodiment, a dispersed material De that has been dispersed in a wide range and a target material in an expanded state can be irradiated with a driver pulsed laser beam in an effective manner, whereby a generation efficiency of an EUV light can be improved.

While the preferred embodiments in accordance with the present invention have been described above, the present invention is not limited to the embodiments described above. Those skilled in the art can carry out various changes, modifications, and functional additions without departing from the scope of the present invention. Moreover, the scope of the present invention includes a configuration in which the embodiments described above are combined properly as needed.

For instance, in the embodiment in which a guide laser beam is introduced to an optical system of a pre-pulsed laser beam, a guide laser beam is also introduced to an optical system of a driver pulsed laser beam. However, the present invention is not limited to the embodiment, and a configuration in which only the characteristics of an optical system of a pre-pulsed laser beam is corrected can also be adopted. More specifically, the configurations (50, 51, and 52) for a guide laser beam corresponded to a driver pulsed laser beam can also be removed.

Moreover, in the case in which a correction of a chromatic aberration is enabled according to a relationship between a wavelength of a pre-pulsed laser beam and a wavelength of a guide laser beam, an optical system which a pre-pulsed laser beam and a guide laser beam that is corresponded to the pre-pulsed laser beam pass through can be configured by an optical system of a refracting type. Furthermore, a pre-pulsed laser device can be configured to be provided with an oscillator that oscillates a pre-pulsed laser beam and at least one amplifier that amplifies a pre-pulse laser or an amplified laser.

Moreover, while a laser device that is used for an extreme ultraviolet light source device has been described above as an example, the present invention is not limited to the example. For instance, a laser device can also be used for other applications such as a laser processing.

EXPLANATION OF REFERENCE

1: Extreme ultraviolet light source device
2: Driver pulse laser light source device
5: EUV exposure device
10, 10A, 10B: Chambers
11: Chamber body
11 (1): Light focusing region
11 (2): EUV light emission region
12: Connection part
13: Window
14: EUV light collector mirror
14A: Hole part
15: Target material supply part
16: Off-axis parabolic concave mirror
17: Reflecting mirror
18: Mirror
19: Dumper
20: Driver laser oscillator
21: Laser chamber
22: Rear mirror
23: Plane output mirror
30: Amplification system
31: Relay optical system
32: Preamplifier
33: Saturable absorber
34, 34A, 34B, 34C, 34D: Wave front correction parts
35: Main amplifier
36, 36A, 36B, 36C: Sensors
37: Spatial filter
38: Reflecting mirror
40: Light focusing system
41: Reflecting mirror
41(2)A: Beam splitter
42: Off-axis parabolic concave mirror
43: Relay optical system
44, 44A: Sensors
45: Wave front correction part
46: Isolator
50: Guide laser device
51: Laser collimator
52, 52A: Guide laser beam introduction mirrors
60, 60A: Wave front correction controller
70: Laser controller
80: EUV light source controller
90: Pre-pulsed laser device
91: Guide laser beam introduction mirror
92: Off-axis parabolic convex mirror
93: Guide laser device for a pre-pulsed laser beam
94: laser collimator
95: Wave front correction part
96: Sensor
97: Wave front correction controller
100, 100A: Angle correction parts
110: VRWM
111: Reflecting mirror
200, 200A, 200B, 200C, 200D, 200E, 200F: Wave front curvature correction parts
300: Reflecting mirror
301: Diffraction type mirror
360, 360A, 360B, 360C, 360D: Optical sensor parts

400: Guide laser beam focusing point measuring instrument
401: Transcription lens
402: CCD
500: Laser focusing system
501: Laser focusing system actuator
502: Laser focusing controller
503: Beam splitter
504: Light focusing lens
505: CCD sensor
L1: Driver pulsed laser beam
L2: EUV light
L3: Guide laser beam
L4: Pre-pulsed laser beam
L5: Guide laser beam for a pre-pulsed laser beam

The invention claimed is:

1. An extreme ultraviolet light source apparatus that generates an extreme ultraviolet light by irradiating a target material with a driver pulsed laser beam for turning the target material into plasma, comprising:
a chamber;
a prepulse laser device configured for outputting a prepulse laser beam;
a prepulse guide laser device configured for outputting a prepulse guide laser beam;
a first delivering mirror configured for synchronizing traveling directions of the prepulse laser beam and the prepulse guide laser beam;
a driver pulsed laser device configured for outputting the driver pulsed laser beam;
a driver pulsed guide laser device configured for outputting a driver pulsed guide laser beam;
a second delivering mirror configured for synchronizing traveling directions of the driver pulsed laser beam and the driver pulsed guide laser beam;
a mirror configured for reflecting the prepulse laser beam passing through the first delivering mirror and transmitting the driver pulsed laser beam passing through the second delivering mirror;
a focusing system configured for guiding the prepulse laser beam reflected by the mirror and the driver pulsed laser beam passing through the mirror to the target material;
a first correction part located between the first delivering mirror and the focusing system, including a first optical element where the prepulse laser beam enters, and configured for rotating, moving or transforming the first optical element;
a second correction part located between the second delivering mirror and the focusing system, including a second optical element where the driver pulsed laser beam enters, and configured for rotating, moving or transforming the second optical element;
a sensor located between the mirror and the chamber; and
a controller configured for controlling at least one of the first correction part and the second correction part based on a detection result of the sensor.

2. The apparatus according to claim 1, wherein the sensor includes one of a beam profiler, a calorimeter or a pyroeletric sensor as being a power sensor, and a wave front sensor.

3. The apparatus according to claim 1, wherein the mirror include a diamond substrate.

4. The apparatus according to claim 1, wherein at least one of the first delivering mirror and the second delivering mirror includes a diamond substrate.

5. An extreme ultraviolet light source apparatus that generates an extreme ultraviolet light by irradiating a target material with a driver pulsed laser beam for turning the target material into plasma, comprising:
a prepulse laser device configured for outputting a prepulse laser beam;
a prepulse guide laser device configured for outputting a prepulse guide laser beam;
a delivering mirror configured for synchronizing traveling directions of the prepulse laser beam and the prepulse guide laser beam;
a driver pulsed laser device configured for outputting the driver pulsed laser beam;
a mirror configured for reflecting the prepulse laser beam passing through the delivering mirror and transmitting the driver pulsed laser beam;
a focusing system configured for guiding the prepulse laser beam reflected by the mirror and the driver pulsed laser beam passing through the mirror to the target material;
a correction part located between the delivering mirror and the focusing system, including a first optical element where the prepulse laser beam enters, and configured for rotating, moving or transforming the first optical element;
a sensor configured for detecting at least one of the prepulse laser beam and the prepulse guide laser beam; and
a controller configured for controlling the correction part based on a detection result of the sensor.

6. The apparatus according to claim 5, wherein the sensor includes one of a beam profiler, a calorimeter or a pyroeletric sensor as being a power sensor, and a wave front sensor.

7. The apparatus according to claim 5, wherein the mirror include a diamond substrate.

8. An extreme ultraviolet light source apparatus that generates an extreme ultraviolet light by irradiating a target material with a driver pulsed laser beam for turning the target material into plasma, comprising:
a chamber;
a prepulse laser device configured for outputting a prepulse laser beam;
a prepulse guide laser device configured for outputting a prepulse guide laser beam;
a first delivering mirror configured for synchronizing traveling directions of the prepulse laser beam and the prepulse guide laser beam;
a driver pulsed laser device configured for outputting the driver pulsed laser beam;
a driver pulsed guide laser device configured for outputting a driver pulsed guide laser beam;
a second delivering mirror configured for synchronizing traveling directions of the driver pulsed laser beam and the driver pulsed guide laser beam;
a mirror configured for transmitting the prepulse laser beam passing through the first delivering mirror and reflecting the driver pulsed laser beam passing through the second delivering mirror;
a focusing system configured for guiding the prepulse laser beam passing through the mirror and the driver pulsed laser beam reflected by the mirror to the target material;
a first correction part located between the first delivering mirror and the focusing system, including a first optical element where the prepulse laser beam enters, and configured for rotating, moving or transforming the first optical element;
a second correction part located between the second delivering mirror and the focusing system, including a second optical element where the driver pulsed laser beam enters, and configured for rotating, moving or transforming the second optical element;

a sensor located between the mirror and the chamber; and a controller configured for controlling at least one of the first correction part and the second correction part based on a detection result of the sensor.

9. The apparatus according to claim 8, wherein the sensor includes one of a beam profiler, a calorimeter or a pyroeletric sensor as being a power sensor, and a wave front sensor.

10. The apparatus according to claim 8, wherein the mirror include a diamond substrate.

11. The apparatus according to claim 8, wherein at least one of the first delivering mirror and the second delivering mirror includes a diamond substrate.

* * * * *